(12) United States Patent
Kanada et al.

(10) Patent No.: US 7,107,599 B2
(45) Date of Patent: Sep. 12, 2006

(54) RECORDING MEDIUM DRIVING DEVICE

(75) Inventors: Tokio Kanada, Kanagawa (JP);
Mikinori Matsuda, Kanagawa (JP)

(73) Assignee: Sony Corporation, (JP)

( * ) Notice: Subject to any disclaimer, the term of this patent is extended or adjusted under 35 U.S.C. 154(b) by 34 days.

(21) Appl. No.: 10/974,929

(22) Filed: Oct. 27, 2004

(65) Prior Publication Data
US 2005/0083603 A1    Apr. 21, 2005

Related U.S. Application Data

(62) Division of application No. 10/258,993, filed as application No. PCT/JP02/02383 on Mar. 13, 2002, now Pat. No. 6,934,957.

(30) Foreign Application Priority Data
Mar. 13, 2001   (JP) .............................. 2001-071134

(51) Int. Cl.
*G11B 17/04* (2006.01)

(52) U.S. Cl. ..................................... 720/638

(58) Field of Classification Search ................ 720/638, 720/636, 640; 369/75.1, 75.11, 75.2, 75.21, 369/77.1, 77.11, 77.2, 77.21
See application file for complete search history.

(56) References Cited

U.S. PATENT DOCUMENTS 4,360,174 A * 11/1982 Tomita et al. ............... 242/339
5,504,730 A * 4/1996 Kanada ....................... 720/640

* cited by examiner

*Primary Examiner*—Allen Cao
(74) *Attorney, Agent, or Firm*—Lerner, David, Littenberg Krumholz & Mentlik, LLP

(57) ABSTRACT

A driving device includes a holder movably carried by a chassis and adapted for transporting a disc cartridge that the holder holds between an insertion/ejection position and a loading position, and an ejection lever for ejecting the disc cartridge from the holder. The driving device also includes a slider movable in a direction of inserting the disc cartridge into the holder and in a direction of ejecting the disc cartridge from the holder. The slider causes the holder to be moved to the loading position when the slider is moved in the disc cartridge inserting direction, while causing the holder to be moved to the insertion/ejection position when the slider is moved in the disc cartridge ejecting direction.

5 Claims, 59 Drawing Sheets

RECORDING MEDIUM DRIVING DEVICE

CROSS-REFERENCE TO RELATED APPLICATIONS

This application is a divisional application of application Ser. No. 10/258,993 filed Oct. 31, 2002, now U.S. Pat. No. 6,934,957, the disclosure of which is hereby incorporated by reference herein, which is a national phase entry under 35 USC § 371 of International Application No. PCT/JP02/02383 filed Mar. 13, 2002, published in Japanese, which claims priority from Japanese Application No. 2001-071134 filed Mar. 13, 2001.

TECHNICAL FIELD

The present invention relates to a recording medium driving device for recording information signals and for reproducing the signals for a recording medium. More particularly, the present invention relates to a recording medium driving device in which a recording medium held by a holder is ejected by an ejection lever.

BACKGROUND ART

There are recording medium driving devices for reproducing information signals recorded on the disc-shaped recording mediums. In certain ones of the recording medium driving devices, a slider held by a holder is moved in one direction when a recording medium is held on the holder to lower the holder to load the recording medium on the loading unit, while the slider is moved in the opposite direction to elevate the holder to eject the recording medium from the holder by an ejection lever.

As typical of this sort of the recording medium driving device, there is known a device shown in FIGS. 1 to 5. With this driving device, upwardly opened guide grooves 102, 102 are formed in both lateral sides of a chassis 101. In these guide grooves 102, 102, there are slidably supported a pair of rearwardly positioned support pins 104, 104 provided on both lateral surfaces of a holder 123, there being another pair of forwardly positioned similar support pins provided on both lateral surfaces of the holder 123.

On the holder 123, there is mounted a slider 105 for sliding in the fore-and-aft direction. The slider 105 includes lateral surface sections 106, 106 and a connecting portion 107 interconnecting the lateral surface sections 106, 106. In the lateral surface sections 106, 106, there are cam grooves 108, 108 which are spaced apart from each other in the in the fore-and-aft direction. In the cam grooves 108, 108, the support pins 104, 104 of the holder 123 are supported for sliding movement. A slider biasing spring 109 is mounted under tension between the lateral surfaces 106, 106 of the slider 104 and a rearward portion of the chassis 101 for biasing the slider 105 rearwards.

At the rear end of the chassis 101, there is mounted a lever supporting lug 110, and an ejection lever 111 is rotatably mounted at the foremost part of the supporting lug 110. A lever biasing spring 112 is mounted under tension between the ejection lever 111 and the holder 123 for biasing the ejection lever 111 in a direction indicated by arrow R1 in FIG. 1. The foremost part of the ejection lever 111 is provided with an operating piece 113 which is bent downwards.

Before insertion of the recording medium into the holder 123, the ejection lever 111 includes a control edge 114 engaged with a mating control edge 116 of the slider 105 so that the slider 105 is held at its foremost movement stroke end (see FIGS. 1 and 2).

When a recording medium 117 is inserted from the forward side into the holder 123, the operating piece 113 of the ejection lever 111 is thrust rearwards by the recording medium 117, so that the ejection lever 111 is rotated in the direction indicated by arrow R2 against the bias of the lever biasing spring 112 (see FIG. 3). When the ejection lever 111 is rotated in the direction indicated by arrow R2 in FIG. 3, the control edge 114 is disengaged from the mating control edge 116, so that the slider 105 is slid rearwards by the slider biasing spring 109 (see FIG. 4).

When the slider 105 is moved rearwards, the positions of the support pins 104, 104 of the holder 123 in the cam grooves 108, 108 are changed, such that the rearward side support pins 104, 104 are moved within the guide grooves 102 of the chassis 101 to cause descent of the holder 123 (see FIG. 5). With the descent of the holder 123, the recording medium 117 which it holds is loaded on a loading unit, not shown, thereby setting up a state enabling the reproducing operation of information signals for the recording medium 117. The slider 105 is moved rearwards at this time as the mating control edge 116 has a sliding contact with a portion of the ejection lever 111. The ejection lever 111 has its portion engaged with the mating control edge 116 of the slider 105, moved rearwards, so that the ejection lever is held at the end of the rotation indicated by arrow R2.

When the reproducing operation comes to a close, such that an ejection button, not shown, is actuated, a driving motor, not shown, is rotated to cause forward movement of the slider 105 under the driving force of the motor against the biasing force of the slider biasing spring 109.

When the slider 105 is moved forwards, the positions of the support pins 104, 104 of the holder 123 in the cam grooves 108, 108 are changed, such that the holder 123 is lifted by the rearward side support pins 104, 104 being moved in the guide groove 102b of the chassis 101.

When the slider 105 has been moved forwards by the ejection lever 111, the ejection lever 111 is rotated by the lever biasing spring 112 in a direction indicated by arrow R1. Consequently, the recording medium 117 is thrust forwards and ejected out of the holder 123 by the operating piece 113 of the ejection lever 111.

When the slider 105 is moved to a forward side preset position, the rotation of the driving motor ceases. The slider 105 is moved rearwards, under the force of the slider biasing spring 109, and the mating control edge 116 is engaged with the control edge 114 of the ejection lever 111, which is positioned at the end of the movement stroke in the direction R1. The slider 105 again is held at the forward end in the range of movement.

In the above-described recording medium driving device of the related art, described above, the lever biasing spring 112 for biasing the ejection lever 111 and the slider biasing spring 109 for biasing the slider 105 are required, with the consequence that the number of components is correspondingly increased. When inserting the recording medium 117 into the holder 123, the slider 105, moved towards rear, has a sliding contact with the ejection lever 111. Since the lever biasing spring 112 at this time is in the fully stretched state, the frictional resistance between the slider 105 and the ejection lever 111 is large, with the result that the slider 105 and the ejection lever 111 are lowered in durability. Moreover, the load imposed on the driving motor for ejecting the recording medium 117 is increased in an amount corresponding to the increased frictional resistance between the slider 105 and the ejection lever 111, thus increasing the power consumption.

Another instance of the recording medium driving device is a recording and/or reproducing apparatus for recording and/or reproducing information signals for the recording medium. In a certain type of this recording and/or reproducing apparatus, there is such an apparatus in which, when the recording medium is held by the holder, the slider held by the holder is moved in one direction to lower the holder to load the recording medium on the loading unit, and in which, when the slider is moved in the opposite direction, the holder is elevated, at the same time as the recording medium is ejected by the ejection lever from the holder.

As this sort of the recording and/or reproducing apparatus, there is such apparatus constructed as shown in FIGS. 6 and 7.

The recording and/or reproducing apparatus, shown in FIGS. 6 and 7, includes a holder 201 movable vertically relative to the chassis.

The holder 201 is movable vertically relative to the chassis, not shown. A cam lever 202 is supported by the holder 201 for sliding in the fore-and-aft direction. The cam lever 202 includes a cam 203 and a vertically extending support leg 204, which support leg 204 is supported for movement in the up-and-down direction in a support opening 205 formed in the chassis.

A supporting piece 206 is provided on the upper surface of the holder 201. The supporting piece 206 rotationally supports a head shift lever 207. The head shift lever 207 is provided with a mating operating portion 208 that is in sliding contact with the cam 203 of the cam lever 202.

A pickup includes a mounting portion 209. On the upper surface of the mounting portion 209, there is mounted a rear end of a head mounting plate 211, the distal end of which carries a magnetic head 210. The head mounting plate 211 is formed of an elastic material.

The above-described holder 201 and the chassis etc are arranged within an outer casing of the recording and/or reproducing apparatus. A top plate 213 of the outer casing is provided on top of the holder 201.

FIG. 6 shows the state in which the magnetic head 210 is at a first retreat position. During reproduction of information signals from a recording medium, for example, the magnetic head 210 is not in use, so that the magnetic head 210 is retreated from the recording medium held on the holder 201, and is at the first retreat position. At this time, the mating operating portion 208 of the head shift lever 207 is engaged with the uppermost end of the cam 203 of the cam lever 202, with the head mounting plate 211 being lifted by the head shift lever 207 in a forwardly descending state. The magnetic head 210 is at a position of being retreated from the recording medium held by the holder 201 right above the upper surface of the holder 201.

When the information signal reproducing operation for the recording medium has been finished, such that the recording medium is ejected forwards from the holder 201, the holder 201 is moved upwards from the state of FIG. 58, while the cam lever 102 is also moved upwards in unison with the holder 201 (see FIG. 7).

When the holder 201 and the cam lever 202 are moved upwards, the relative position between the head shift lever 207 and the cam 203 is not changed. However, since the cam 203 is at substantially the same height level as the mounting portion 209, the magnetic head 210 is moved to a second retreat position with a rising gradient in the forward direction, so that the magnetic head 210 is at a higher height level than the above-mentioned first retreat position (see FIG. 7).

In the above-described recording and/or reproducing apparatus of the related art, the head mounting plate 211, which has been lifted with the forwardly descending gradient, is lifted with a forwardly rising gradient when the recording medium is ejected from the holder 201. As a consequence, in the recording and/or reproducing apparatus of the related art, there is required a large space between the upper surface of the holder 201 and the outer casing 213 of the outer casing, in order to permit the magnetic head 210 to be moved between the first and second retreat positions, thus increasing the overall thickness of the recording and/or reproducing apparatus.

Moreover, the recording medium driving device is designed for recording and/or reproducing information signals for the disc-shaped recording medium loaded on the disc table. This sort of the disc recording and/or reproducing apparatus includes an ejection mechanism for ejecting the disc-shaped recording medium loaded on the disc table on completion of the recording and/or reproduction of the information signals, and a head movement mechanism for causing movement of the magnetic head, adapted for applying the magnetic field to the disc-shaped recording medium during recording, in a direction into contact with or away from the disc-shaped recording medium.

In certain versions of this sort of the recording medium driving device, both the operations of the ejection mechanism and the head movement mechanism are operated by the driving power of a sole driving motor, in order to make common use of the sole driving motor. In a disc recording and/or reproducing apparatus of the related art, in which a sole driving motor is used in common, a slider is supported for movement on a holder holding a disc-shaped recording medium, and is moved a first movement amount in one direction with respect to the holder. On completion of the loading, the slider is moved by a second movement amount relative to the holder in the same sole direction by the driving motor to actuate the head movement mechanism, and the magnetic head is moved in a direction of contacting with the so loaded disc-shaped recording medium to set up the recording mode.

Consequently, when the recording of the information signals has come to a close, the driving motor is rotated in reverse, while the slider is moved relative to the holder in a direction opposite to the aforementioned one direction by a second amount of movement, with the magnetic head being moved in a direction away from the disc-shaped recording medium to cancel the setting of the recording mode. When the disc-shaped recording medium is to be ejected in the canceled state of the setting of the recording mode, rotation of the driving motor is continued to cause the slider to be moved relative to the holder by the first amount of movement in an opposite direction to the aforementioned one direction to cause the operation of the ejection mechanism.

In the above-described driving device of the related art, when the recording of the information signals has come to a close and the disc-shaped recording medium is to be ejected, the slider is moved in the same direction to actuate the ejection mechanism or the head movement mechanism, so that a movement stroke corresponding to the sum of the first and second amounts of movement is required.

As a consequence, the recording medium driving device is increased in size by an amount corresponding to the increased amount of the slider movement stroke.

There is also a recording medium driving device adapted for driving a disc cartridge in a casing member of which a disc-shaped recording medium is rotatably mounted and in which a shutter is also supported for sliding on the casing member.

In such driving device, the shutter is slid by a shutter opening/closing mechanism, usually at the time of inserting the disc cartridge into the holder to open a through-hole formed in the casing member to permit the laser light to be illuminated from a light source of the optical pickup to the disc-shaped recording medium contained in the casing member.

The shutter slid is held at an open position, however, if the shutter is vibrated in this case to produce resonant vibrations, it may be impossible to maintain optimum reproducing operations for the disc-shaped recording medium of the disc driving device.

In order to combat this inconvenience, a certain disc driving device of the related art includes retention means, such as a spring plate, on a portion of an outer casing, in the inside of which a holder or a chassis is mounted, such that, when the disc-shaped recording medium is loaded on the disc table, the shutter is retained by this retention means to suppress the vibrations which will otherwise be produced.

In the recording medium driving device of the related art, in which the retention means are provided at a portion of the outer casing thereof, the vibrations transmitted from outside to the disc driving device tends to be transmitted to the shutter through the retention means, with the result that vibrations cannot be suppressed sufficiently.

DISCLOSURE OF THE INVENTION

It is an object of the present invention to provide a novel recording medium driving device which overcomes the problems the above-described recording medium driving device of the related art suffers.

It is another object of the present invention to provide a recording medium driving device in which it is possible to reduce the number of components and to improve durability of the respective components as well as to reduce the power consumption.

It is still another object of the present invention to provide a recording medium driving device in which collision between a recording medium inserted into or ejected from the holder and the magnetic head may be avoided to reduce the size of the apparatus itself.

It is a further object of the present invention to provide a recording medium driving device in which the operations of the ejection mechanism and the head movement mechanism are carried out by a sole driving motor to reduce the size of the apparatus itself.

It is yet another object of the present invention to provide a recording medium driving device in which vibrations of the shutter ma be efficiently suppressed to assure n optimum operation.

For accomplishing the above object, the present invention provides a recording medium driving device including a loading unit for loading a recording medium thereon, and a holder movably carried by a chassis, with the holder holding the recording medium and transporting the recording medium between an insertion/ejection position of inserting or ejecting the recording medium and a loading position of loading the recording medium on the loading unit. The recording medium driving device also includes an ejection lever for ejecting the recording medium from the holder, a slider movable in a direction of inserting the recording medium into the holder and in a direction of ejecting the recording medium from the holder, with the slider causing the holder to be moved to the loading position when the slider is moved in the inserting direction, with the slider causing the holder to be moved to the insertion/ejection position when the slider is moved in the ejecting direction. The recording medium driving device also includes a spring member provided between the ejection lever and the slider for biasing the ejection lever in a direction of ejecting the slider from the holder and for biasing the slider in the inserting direction.

Preferably, the ejection lever is rotatably mounted at a corner of the chassis and includes at its one end an operating portion for ejecting the recording medium from the holder, while including at its other end a control portion for controlling the slider towards the ejecting direction. When the recording medium is not loaded on the recording medium driving device, the slider is arranged in the ejecting direction and the operating portion of the ejection lever is biased and rotated in the ejecting direction, the controlling portion engaging with a controlled portion of the slider to control the slider in the ejecting direction.

In the recording medium driving device according to the present invention, when the recording medium is introduced into the holder, the operating portion of the ejection lever thrusting the forward end of the recording medium is inserted so that the operating portion is rotated in the inserting direction. The controlling portion is rotated with such rotation to be disengaged from the controlled portion so that the slider is moved in the inserting direction under the bias of the spring member. The slider has a portion thereof engaged with a portion of the other end of the ejection lever to hold the ejection lever at the inserting direction. The holder is moved to the loading position with movement of the slider in the inserting direction for loading the recording medium inserted in the holder to the loading position.

Preferably, the recording medium driving device further includes ejection controlling means for causing the slider to be moved in the ejecting direction responsive to a user's command. The slider is moved in the ejecting direction under control by the ejection controlling means to cause the holder to be moved to the insertion/ejection position and to extend the spring member. The operating portion of the ejection lever is moved in the ejecting direction to eject the recording medium by a portion of the slider being disengaged from a portion of the opposite end of the ejection lever with movement of the slider. The controlling portion of the ejection lever is re-engaged with the controlled portion of the slider to control the slider at the ejecting direction.

The present invention also provides a recording medium driving device including a loading unit for loading a recording medium thereon, and a holder for holding the recording medium, which holder is movable between an insertion/ejection position inserting/ejecting the recording medium and a loading position loading the recording medium on the loading unit. The recording medium driving device also includes an ejection lever for ejecting the recording medium from the holder at the inserting/ejecting position, and a slider movable in a direction of inserting the recording medium into the holder and in a direction of ejecting the recording medium from the holder. When the slider is moved in the inserting direction, the slider causes the holder to be moved from the inserting/ejecting position towards the loading position. When the slider is moved in the ejecting direction, it causes the holder to be moved from the loading position to the insertion/ejection position. The recording medium driving device also includes a head for recording information signals on the recording medium, a head shift lever for causing the head to be moved in a direction of contacting with and separating from the recording medium, and a cam lever carried by the holder for movement in the inserting direction and in the ejecting direction. The cam lever operates the head shift lever. The head is retreated to a first retreat position receded from the recording medium as held by the holder, when the recording medium is ejected from the holder positioned at the insertion/ejection position under the driving force of the driving motor. The head is also retreated to a second retreat position receded from the recording medium when information signals are reproduced from the recording medium at the loading position. The holder is moved to the insertion/ejection position when the recording medium is ejected from the holder by a manual operation by a user during the recording of information signals on the recording medium in the loading unit. Also, the head is retreated to a third retreat position receded from the recording medium ejected from the holder. In the first, second and third retreat positions, the relative position between the head and the holder relative to the contacting or separating direction is substantially the same.

In this recording medium driving device, the cam lever includes a first cam portion for operating the head shift lever to cause the head to be receded to the first retreat position receded from the recording medium held by the holder when the recording medium is ejected from the holder at the insertion/ejection position, under the driving force of the driving motor, a second cam portion for operating the head shift lever so that, when the information signals are reproduced at the loading unit from the recording medium, the head will be receded to the second retreat position receded from the recording medium, and a third cam portion for operating the head shift lever so that, when the recording medium is ejected by a manual operation of the user when information signals are being recorded on the recording medium in the loading unit, the holder will be moved to the insertion/ejection position, the head being receded to the third retreat position in which the head is receded from the recording medium.

The present invention also provides a recording medium driving device including a loading unit for loading a disc thereon, a head movement mechanism for causing a recording head, recording the information signals on a disc loaded on the loading unit, to be moved in a direction of contacting with or separating from the disc, an ejection mechanism for ejecting the disc loaded on the loading unit to outside, a driving gear rotated in one direction or in the other direction by a driving motor, a joint lever which, when the driving gear is rotated in one direction, is moved through the driving gear to operate the ejection mechanism, and a driving lever which, when the driving gear is rotated in the other direction, is moved through the driving gear to operate the head movement mechanism.

Preferably, the recording medium driving device further includes a driving power transmitting portion provided to the driving gear for transmitting the driving power of the driving motor, and an operating lever which, when the driving gear is rotated in the other direction, is thrust by the driving power transmitting portion to impart the driving power of the driving motor to the driving lever, and which, when the driving gear is rotated in the one direction, is thrust by the driving power transmitting portion to be receded from the trajectory of the driving power transmitting portion.

The present invention also provides a recording medium driving device for driving a disc cartridge including a disc and a cartridge having the disc held therein, with the disc cartridge opening/closing an information recording surface of the disc by a shutter movably mounted in the cartridge. The recording medium driving device includes readout means movable along the radius of the disc for reading out the information from the information recording surface of the disc, a chassis on which the readout means is mounted for movement radially of the disc, a holder movably mounted on the chassis for holding the disc cartridge, a disc table for loading a disc in the disc cartridge as held by the holder, a shutter opening/closing mechanism for opening/closing the shutter, and retention means provided on the chassis or the holder for holding the shutter opened by the shutter opening/closing mechanism when the disc is loaded on the disc table.

The retention means may be a spring plate member having one end mounted to the chassis and having retention means at the other end. The retention means is resiliently contacted with the shutter.

The retention means may be a detection switch having a mating operating shaft resiliently contacted with the shutter when the holder is moved. By the mating operating shaft being operated by resilient contact with the shutter, the detection switch detects whether or not writing on an information recording surface of the disc is inhibited.

Other objects, features and advantages of the present invention will become more apparent from reading the embodiments of the present invention as shown in the drawings.

BEST MODE FOR CARRYING OUT THE INVENTION

In the following, certain preferred embodiments of the present invention will be explained with reference to the drawings. The following embodiments are directed to a disc recording and/or reproducing apparatus in which information signals are recorded on or reproduced from a magneto-optical disc having a diameter of approximately 64 mm, such as Mini-Disc.

Figure 8:
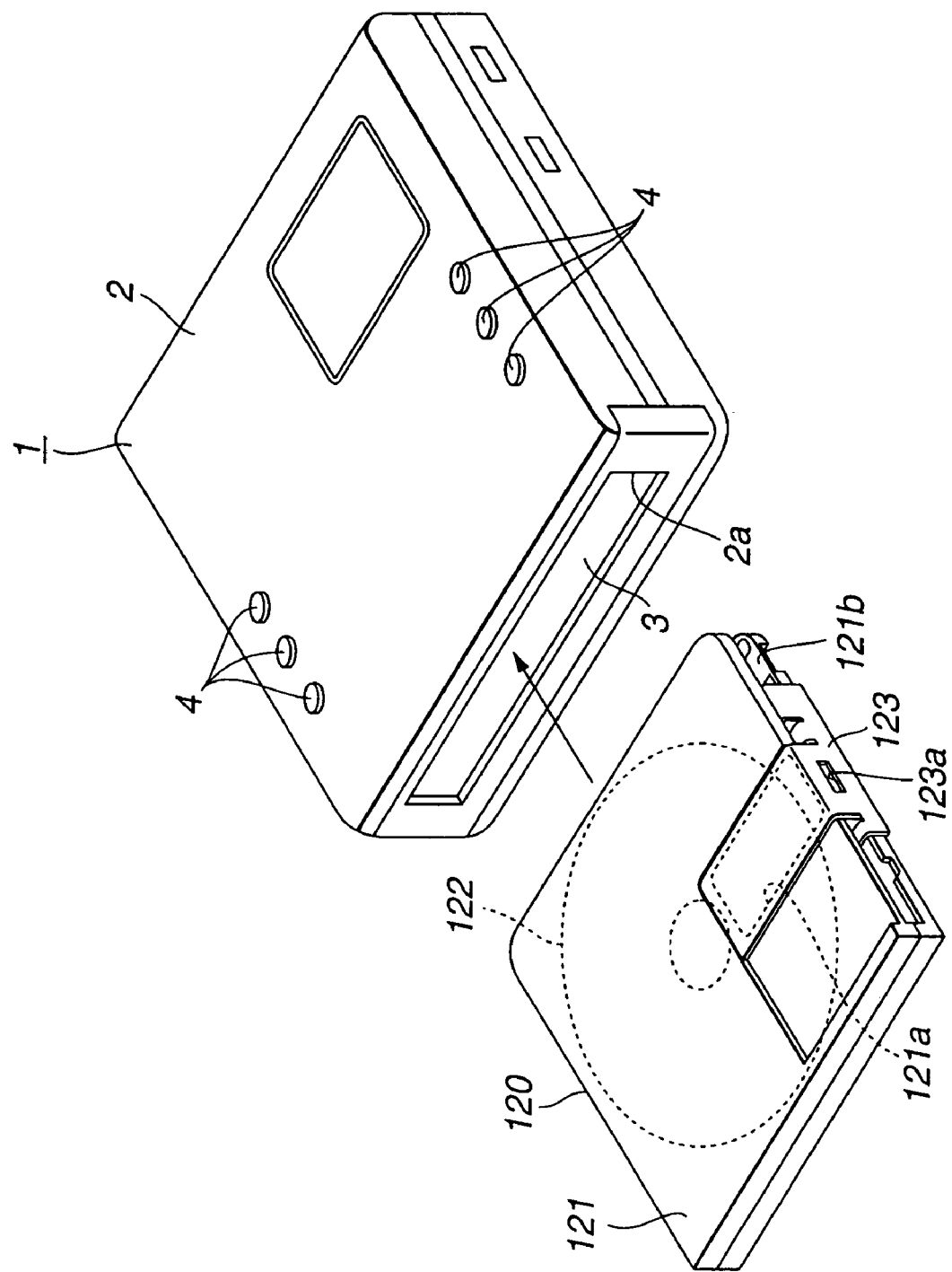
FIG. 8 is a perspective view showing the recording and/or reproducing apparatus to which the present invention is applied, and a disc cartridge.

A recording and/or reproducing apparatus 1, according to the present invention, has an outer casing 2 of a thin box shape, within which respective members and mechanisms as required are accommodated, as shown in FIG. 8. A horizontally elongated rectangular insertion/ejection opening 2a is formed in the front surface of the outer casing 2. The outer casing 2 carries a door 3 for opening/closing the insertion/ejection opening 2a. If, in introducing the disc cartridge, as later explained, into the outer casing 2, the disc cartridge is ejected from the outer casing 2, the door 3 is actuated to open the insertion/ejection opening 2a. At a preset location of the outer casing 2 are arranged plural operating buttons 4 for performing various functions, as shown in FIG. 8. The reproducing operation, the recording operation, cessation of the operation, change of sound volume, ejection of the disc cartridge from the outer casing 2 and various editing functions may be carried out by actuating these operating buttons 4.

Figure 9:
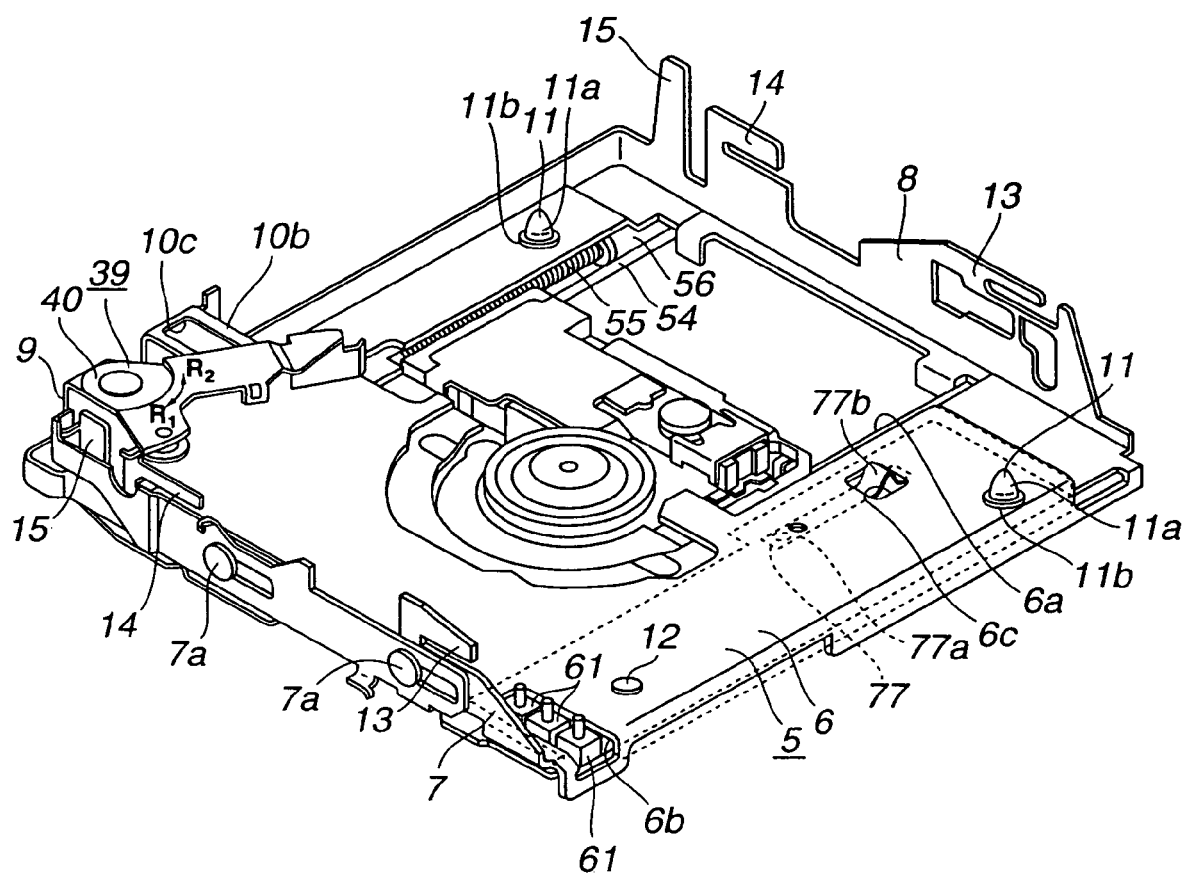
FIG. 9 is a perspective view showing the chassis and respective portions or units supported by the chassis.
Figure 10:
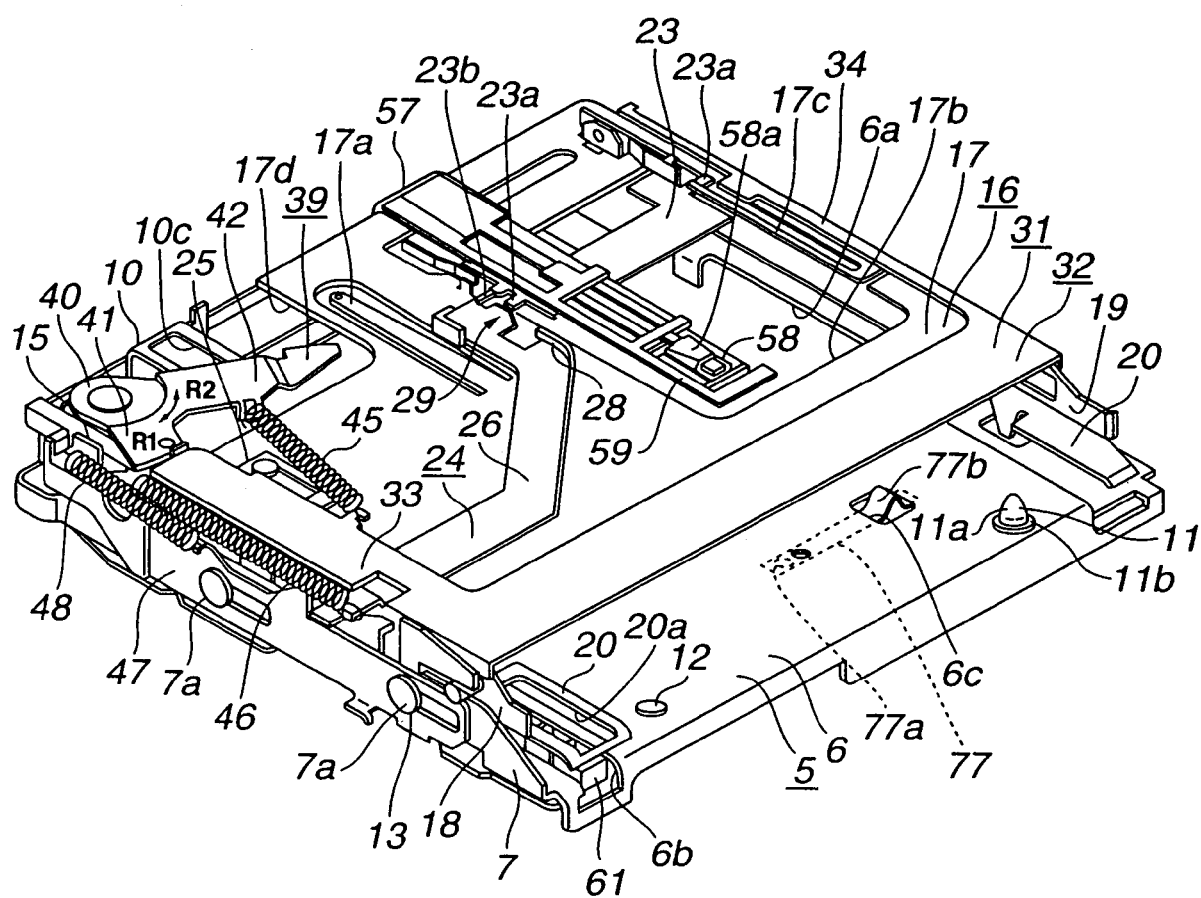
FIG. 10 is a perspective view showing the inner structure of a disc recording and/or reproducing apparatus according to the present invention.
Figure 11:
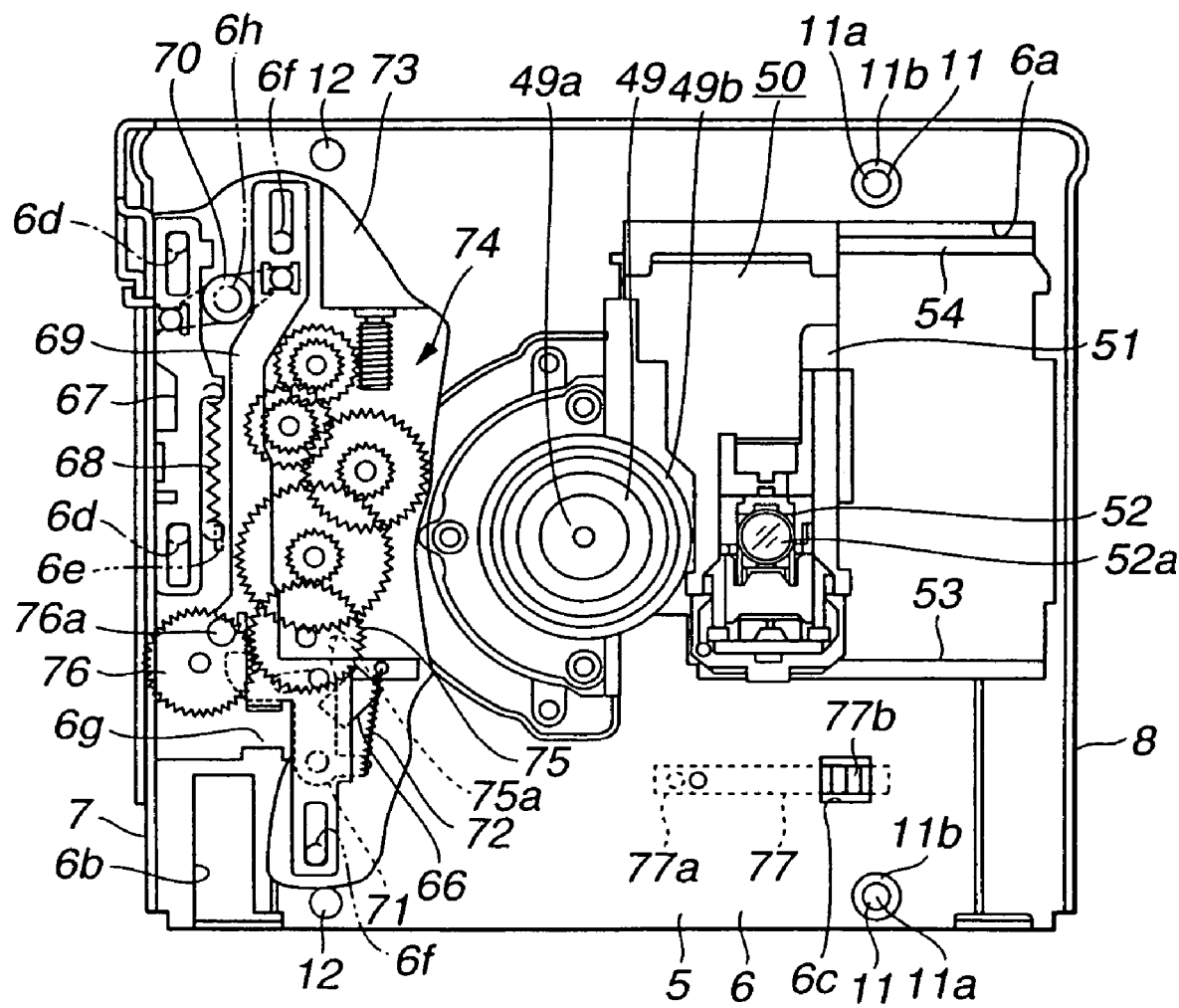
FIG. 11 is a plan view, partially cut away, and showing various portions or units supported by the chassis
Figure 16:
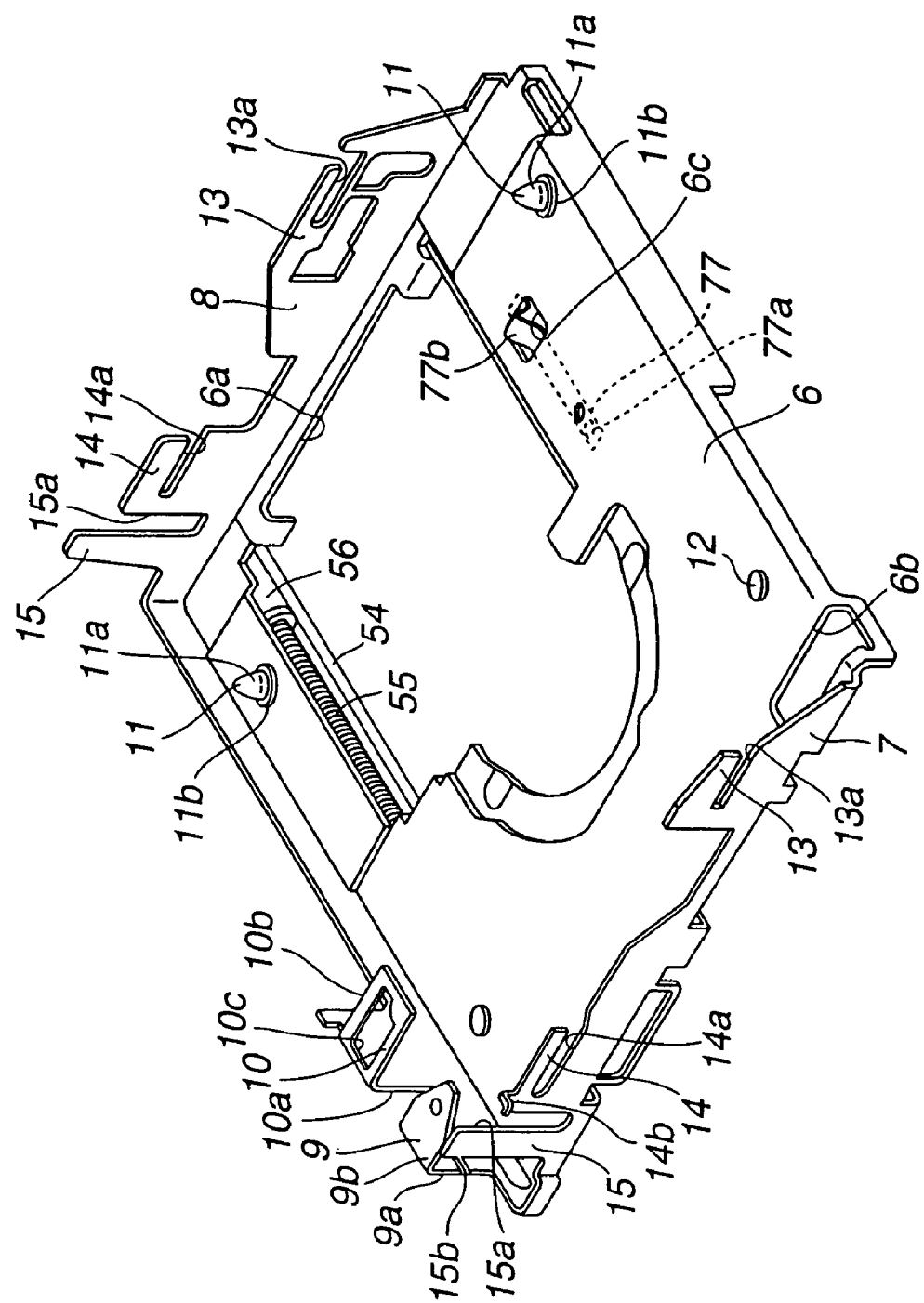
FIG. 16 is a perspective view showing a chassis.

Within the outer casing 2, there is arranged a chassis 5, as shown in FIGS. 9 to 11. The chassis 5 is formed integrally by a major surface portion 6, side supporting portions 7, 8 arranged on left and right side edges of the major surface portion 6, and a lever supporting portion 9 as well as a lever controlling portion 10, with the lever supporting portion 9 and the lever controlling portion 10 upstanding from the rear edge of the major surface portion 6 and being spaced apart from each other in the left and right direction, as shown in FIG. 16. A pickup mounting opening 6a is formed towards the right side of the major surface portion 6, while a switch mounting opening 6b is formed in the forward left side thereof. A retention unit mounting opening 6c is formed towards the front right side of the major surface portion 6. Towards the right side of the major surface portion 6, positioning pins 11, 11 are formed integrally in a staggered relationship in the fore-and-aft direction. Each positioning pin 11 is made up by a positioning projections 11a and a support portion 11b formed on the rim of the positioning projections 11a, 11a. Towards the left side end of the major surface portion 6 are formed receptacles 12, 12 in a staggered relationship in the fore-and-aft direction. The upper surfaces of these receptacles 12, 12 are flush with the upper surfaces of the support portions 11b, 11b of the positioning pins 11, 11.

Towards the forward and rear ends of the side supporting portions 7, 8 are respectively formed supporting projections 13, 14, which supporting projections 13, 14 are formed with forwardly opening supporting grooves 13a, 14a, respectively. On the rear sides of the rear side supporting projections 14, 14, the side supporting portions 7, 8 are formed with lugs 15, 15, with portions lying between the supporting projections 14, 14 and the lugs 15, 15 being opened upwards to serve as guide grooves 15a, 15a. On the upper ends of the supporting projection 14 and the lug 15 of the side supporting portion 7 on the left side, there are formed spring retention pieces 14b, 15b, respectively.

The lever supporting portion 9 of the chassis 5 is made up by an upstanding portion 9a, protruded upwards from the major surface portion 6, and a supporting portion 9b protruded forwards from the upper edge of the upstanding portion 9a. The lever controlling portion 10 of the chassis 5 is made up by an upstanding portion 10a, protruded upwards from the major surface portion 6, and a supporting portion 10b protruded forwards from the upper edge of the upstanding portion 10a. The supporting portion 10b is formed with a control opening 10c elongated in the forward and aft direction.

A holder 16 is vertically movably supported by the side supporting portions 7, 8, as shown in FIG. 10. The holder 16 is formed of a plate-shaped elastic metal material, and is formed integrally from a top plate portion 17, side plate portions 18, 19, and support plates 20, 20, protruded from the lower edges of the side plate portions 18, 19 in a direction approaching to each other. The disc cartridge is inserted and held in a flattened spacing defined by the top plate portion 17, side plate portions 18, 19 and the support plates 20, 20.

In the top plate portion 17, a retention spring 17a is segmented so that it is slightly inclined towards its distal end. In the top plate portion 17, there is also formed a head inserting opening 17b in register with the pickup mounting opening 6a of the chassis 5. The right side end of the top plate portion 17 is formed integrally with a shift lever restoration spring 17c which is protruded rearwards. The left rear end of the top plate portion 17 is formed integrally with a relief opening 17d.

The forward ends of the side plate portions 18, 19 of the holder 16 are respectively formed with embossed supports 18a, 19a which are protruded outwards. The rear ends of the side plate portions 18, 19 are formed with outwardly protruded support pins 18b, 19b, respectively. The right side plate portion 19 is provided with a shutter opening/closing mechanism which is formed by a shutter restoration spring 21 and an unlock piece 22 which are formed by partially segmenting the side plate portion 19. The shutter restoration spring 21 is protruded slightly forwards and is inclined relative to the side plate portion 19 so that its distal end will be positioned inwardly of the side plate portion 19. The distal end of the shutter restoration spring 21 is bent for protruding inwards and provided as a holding portion 21a.

The unlock piece 22 is extended in the fore-and-aft direction so that its major surface is directed in the up-and-down direction.

The forward end of the left side support plate 20 is formed with an operating opening 20a.

Figure 12:
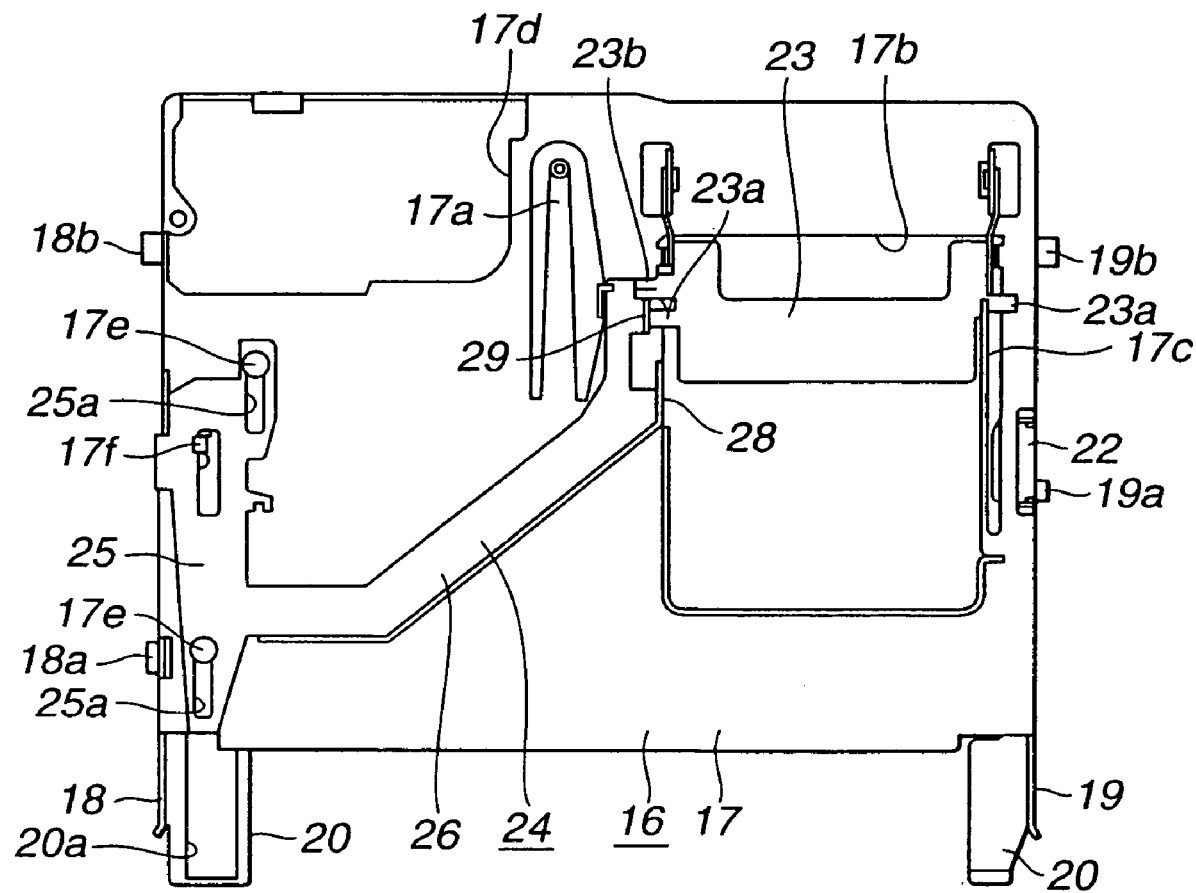
FIG. 12 is a plan view showing a holder and a cam lever held by the holder.
Figure 17:
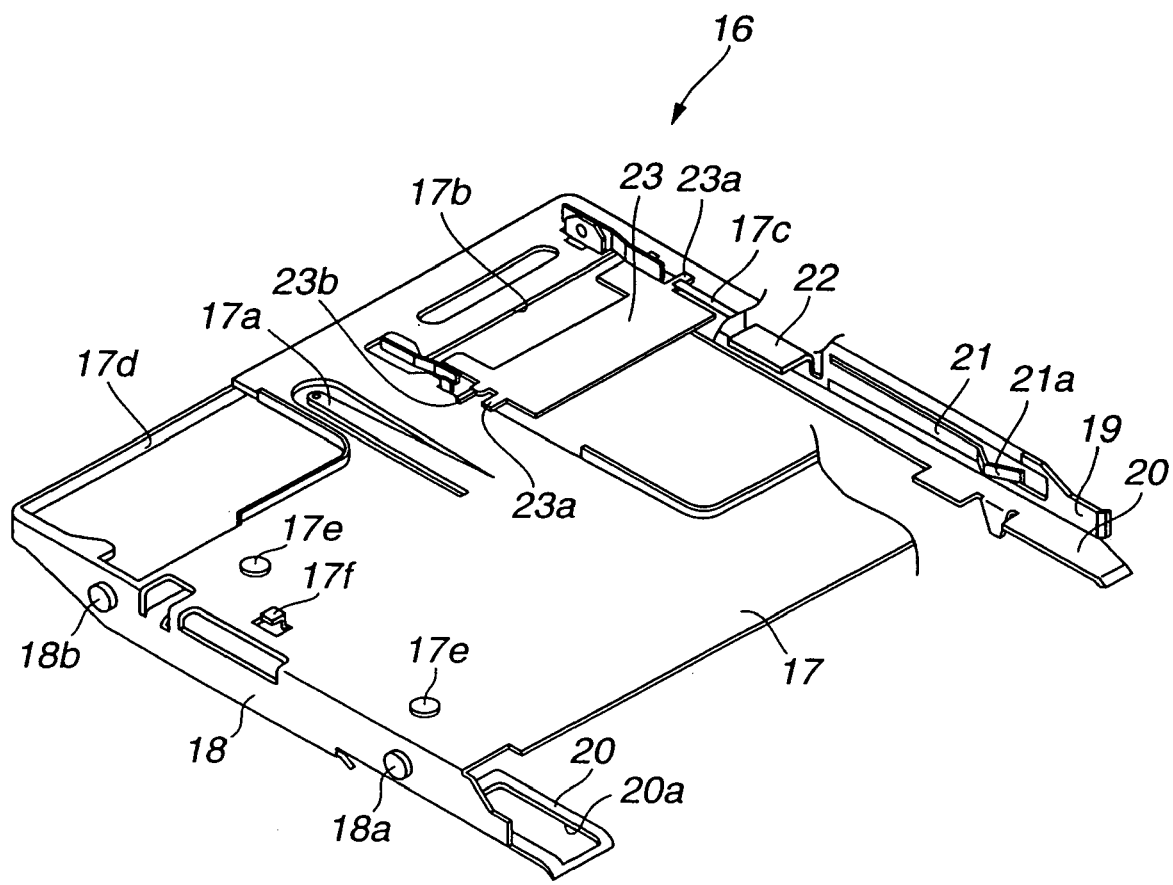
FIG. 17 is a perspective view showing the holder, partially cut away.
Figure 18:
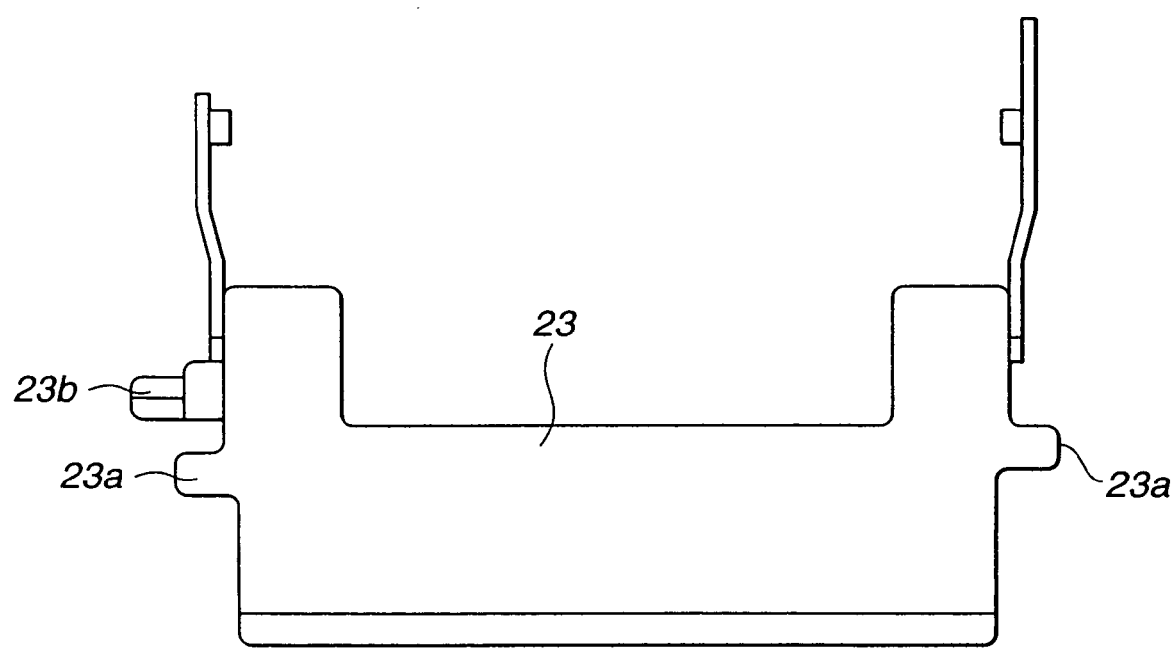
FIG. 18 is a plan view showing a head shift lever.
Figure 19:
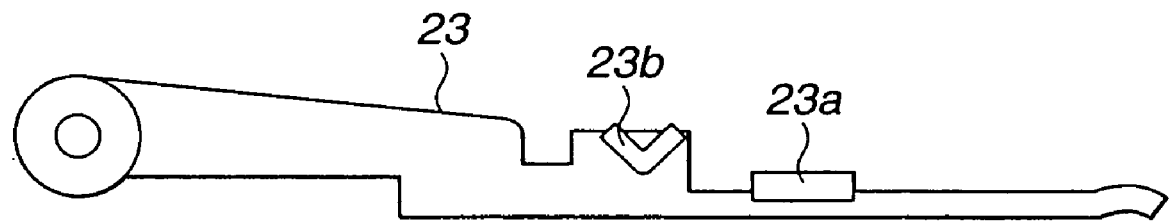
FIG. 19 is a side view showing the head shift lever.

The top plate portion 17 of the holder 16 rotatably supports a head shift lever 23, as shown in FIGS. 10, 12 and 17. The head shift lever 23 is mounted proximate to the rear end of the head inserting opening 17b and is protruded towards the head inserting opening 17b. From the left side edge of the head shift lever 23, a rotation controlling piece 23a and a mating operating piece 23b, spaced apart from each other in the fore-and-aft direction, are protruded leftwards, as shown in FIGS. 18 and 19. The mating operating piece 23b is in the form of a letter V in cross-section, with the apex pointing downwards, when seen from its lateral side, as shown in FIGS. 18 and 19. The right side edge of the head shift lever 23 is formed with the rightwardly protruded rotation controlling piece 23a. The foremost part of the shift lever restoration spring 17c provided on the top plate portion 17 of the holder 16 is elastically contacted with the right side end of the head shift lever 23. As a consequence, the head shift lever 23 is biased so that its foremost part will be moved substantially downwards.

Figure 13:
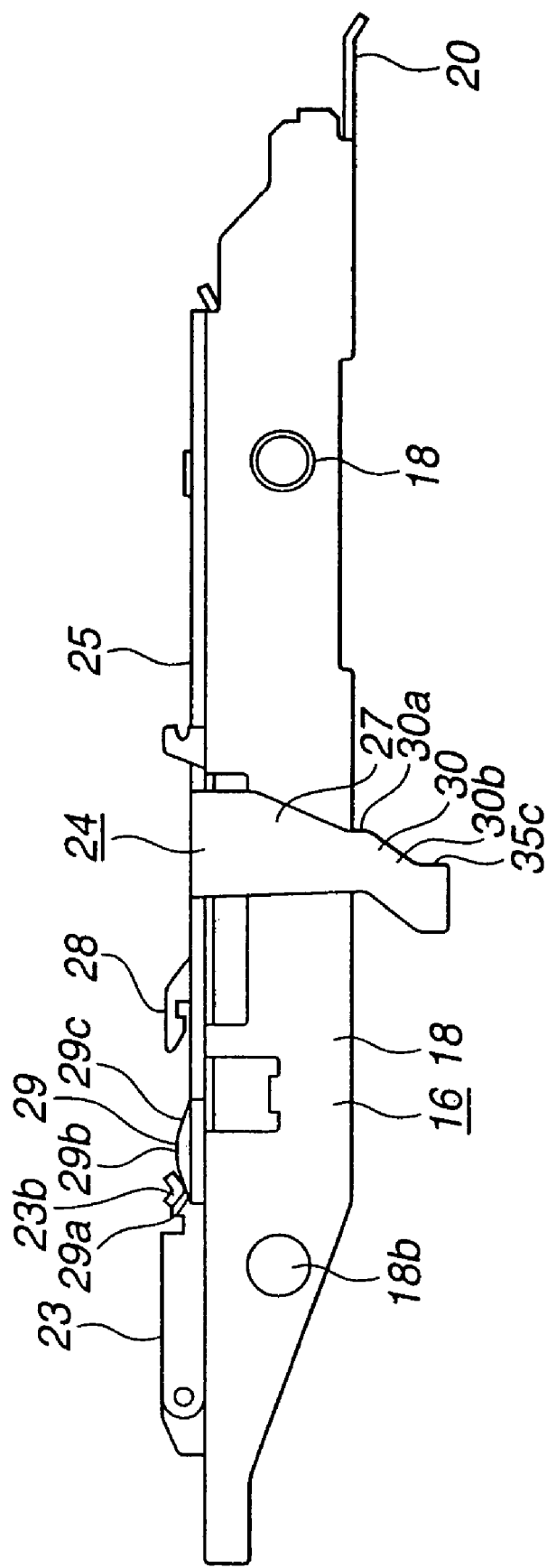
FIG. 13 is an enlarged side view showing the holder and the cam lever held by the holder.

A cam lever 24 is supported by the holder 16 for movement in the fore-and-aft direction, as shown in FIGS. 10, 12 and 13. The cam lever 24 and the head shift lever 23 operate as a head movement mechanism for uplifting and lowering a magnetic head which will be explained subsequently.

Figure 20:
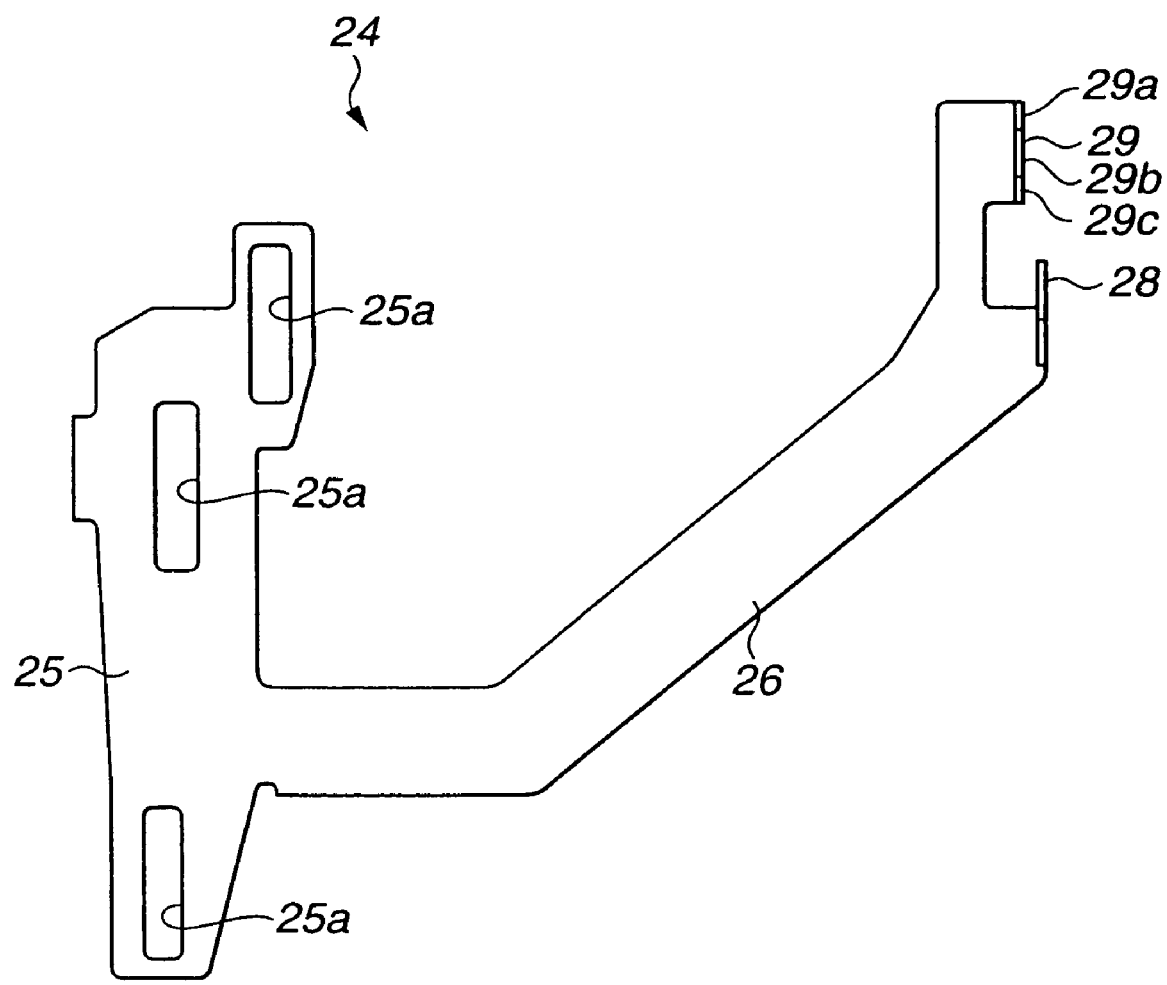
FIG. 20 is a plan view showing a cam lever.
Figure 21:
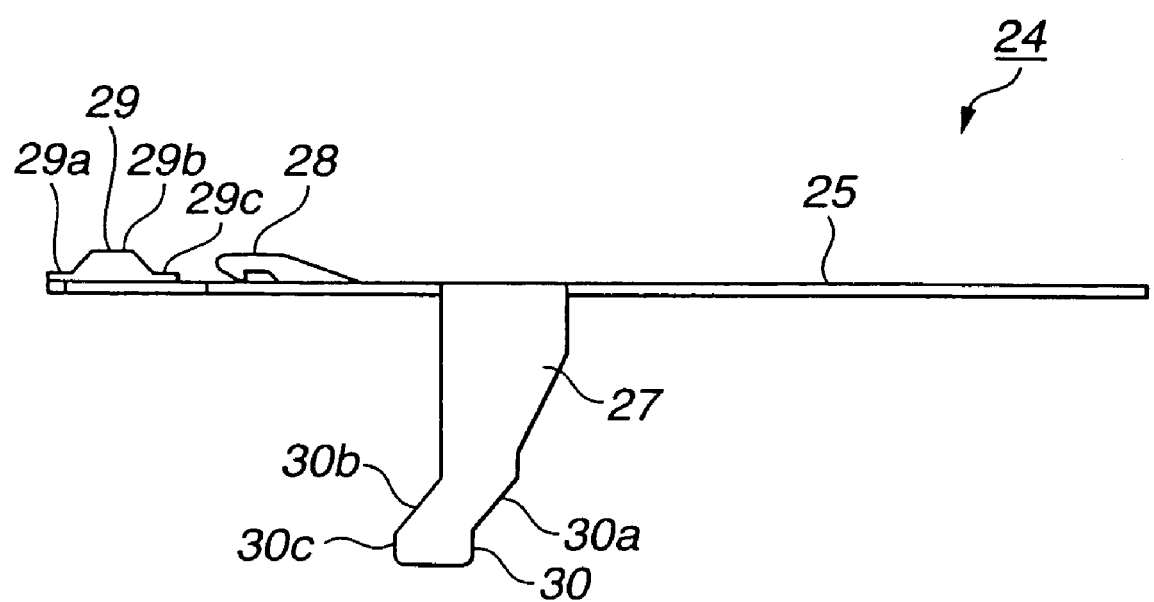
FIG. 21 is a side view showing the cam lever.

The cam lever 24 is formed with a supported portion 25, elongated in the fore-and-aft direction, a protruding portion 26, protruded rightwards from the supported portion 25 and a cam leg 27 protruded downwards from the supported portion 25, as shown in FIGS. 20 and 21. The supported portion 25 has a plural number of support openings 25a, elongated in the fore-and-aft direction. The supporting pin 17 or the supporting piece 17f provided on the top plate portion 17 is inserted into these support openings 25a to permit movement in the fore-and-aft direction. A protruded portion 26 is protruded rightwards from the right side edge of the supported portion 25 so that its foremost part is elongated in the fore-and-aft direction. At the foremost part of the protruded portion 26, a retention piece 28 and a cam piece 29, both of which are bent from the foremost portions of the protruded portion 26, are provided in a spaced-apart relationship to each other. The cam piece 29 is provided, looking from the rear side, with a first cam portion 29a, a second cam portion 29b, at a lower portion than the first cam portion 29a, and a third cam portion 29c, at a lower portion than the second cam portion 29b, with the first cam portion 29a being at substantially the same height level as the third cam portion 29c. The portion of the cam leg 27 lower than a mid portion in the vertical direction is formed as a cam portion 30. This cam portion 30 is made up by an upper portion, extending from an upper position for a short length in the vertical direction, an inclined portion 30b, contiguous to the upper portion 30a and deflected progressively downwards towards rear and a lower portion 30c contiguous to the inclined portion 30b and extending from the inclined position for a short length in the vertical direction.

Figure 14:
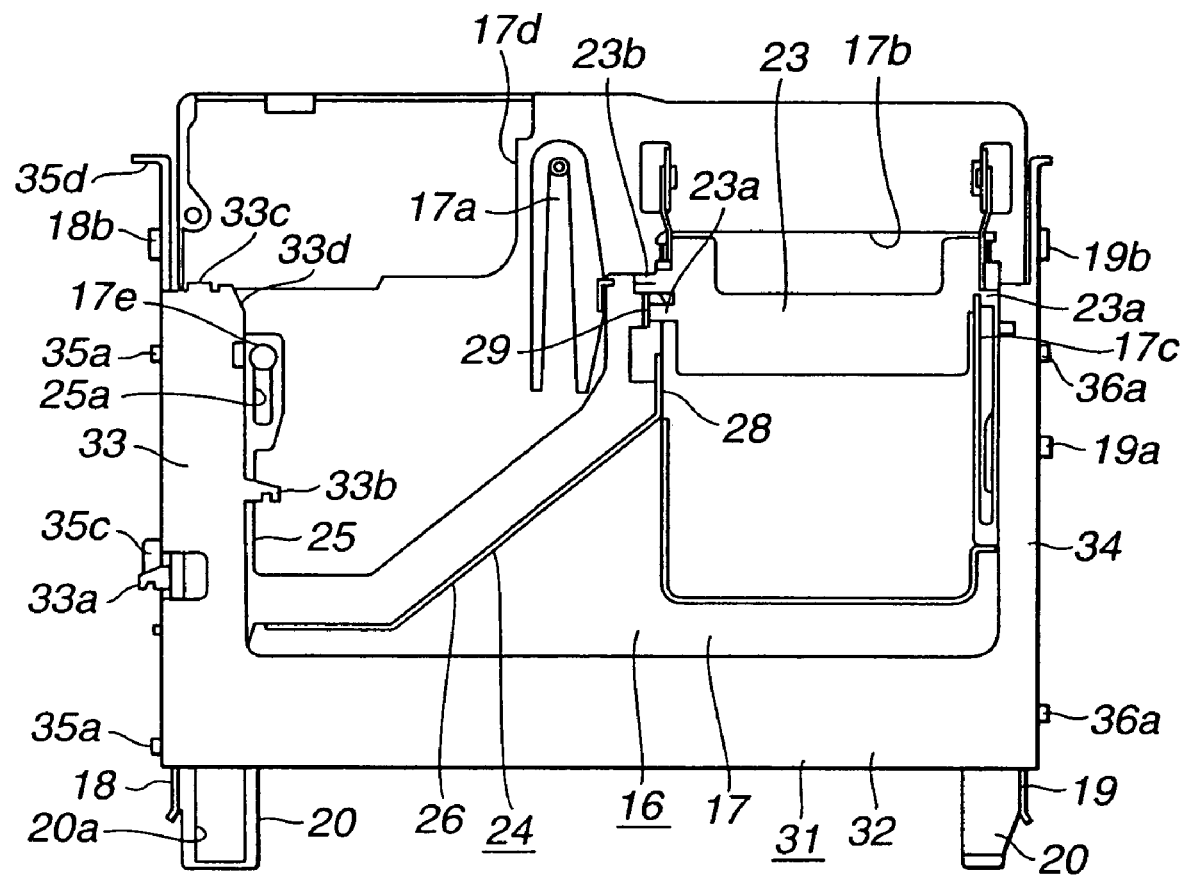
FIG. 14 is a plan view showing the holder and the cam lever as well as the slider held by the cam lever.
Figure 15:
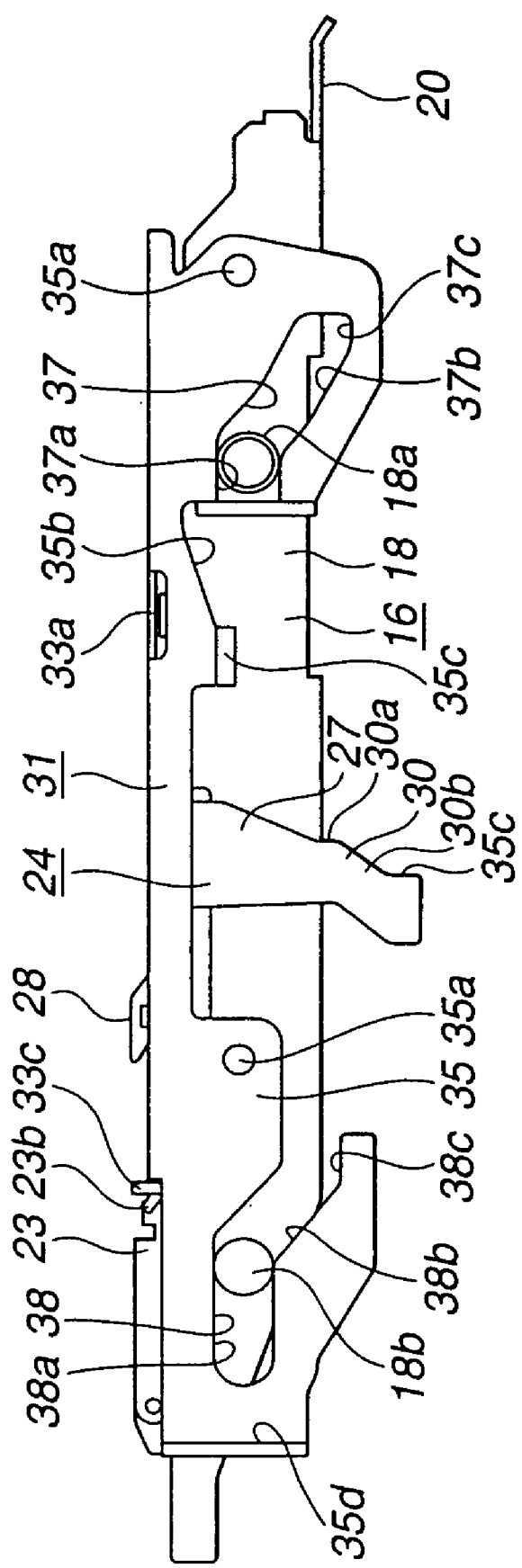
FIG. 15 is an enlarged side view showing the holder and the cam lever as well as the slider held by the cam lever.
Figure 22:
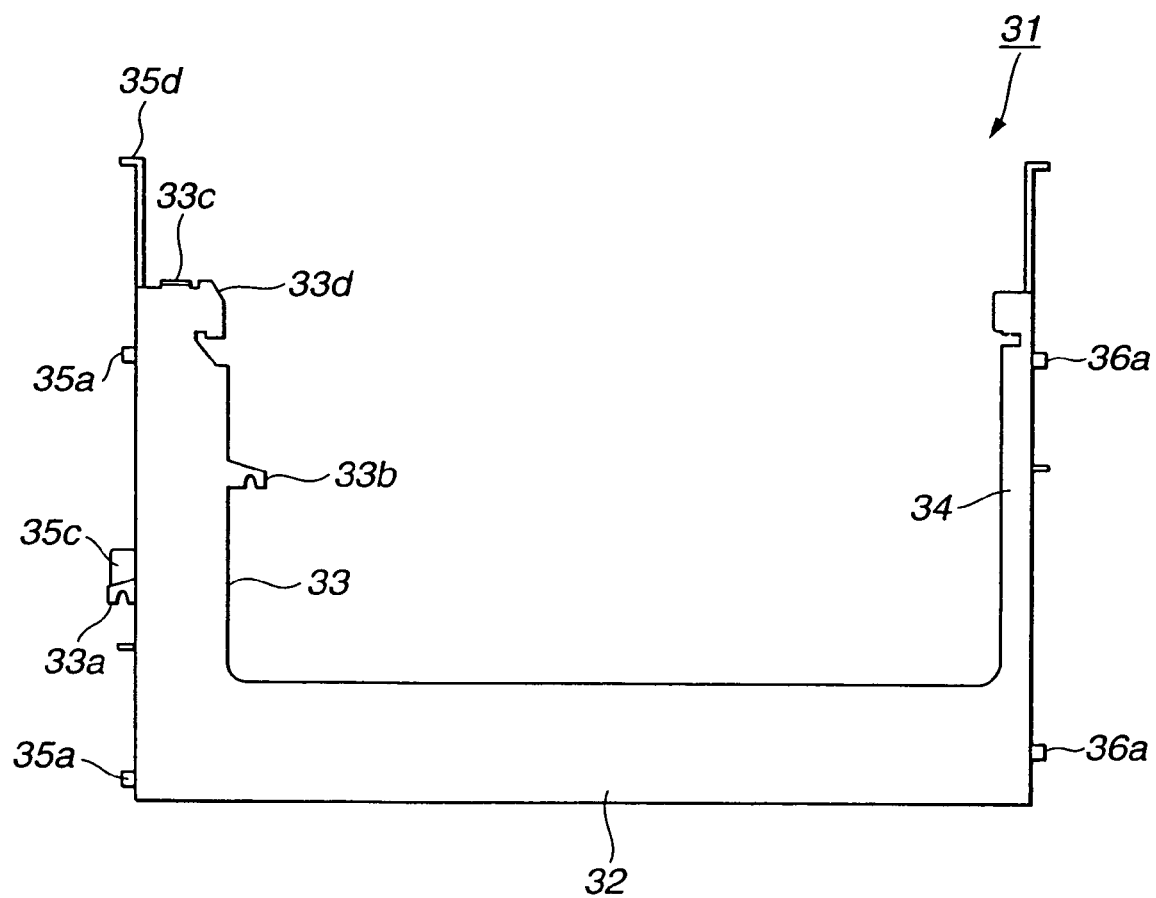
FIG. 22 is a plan view showing a slider.
Figure 23:
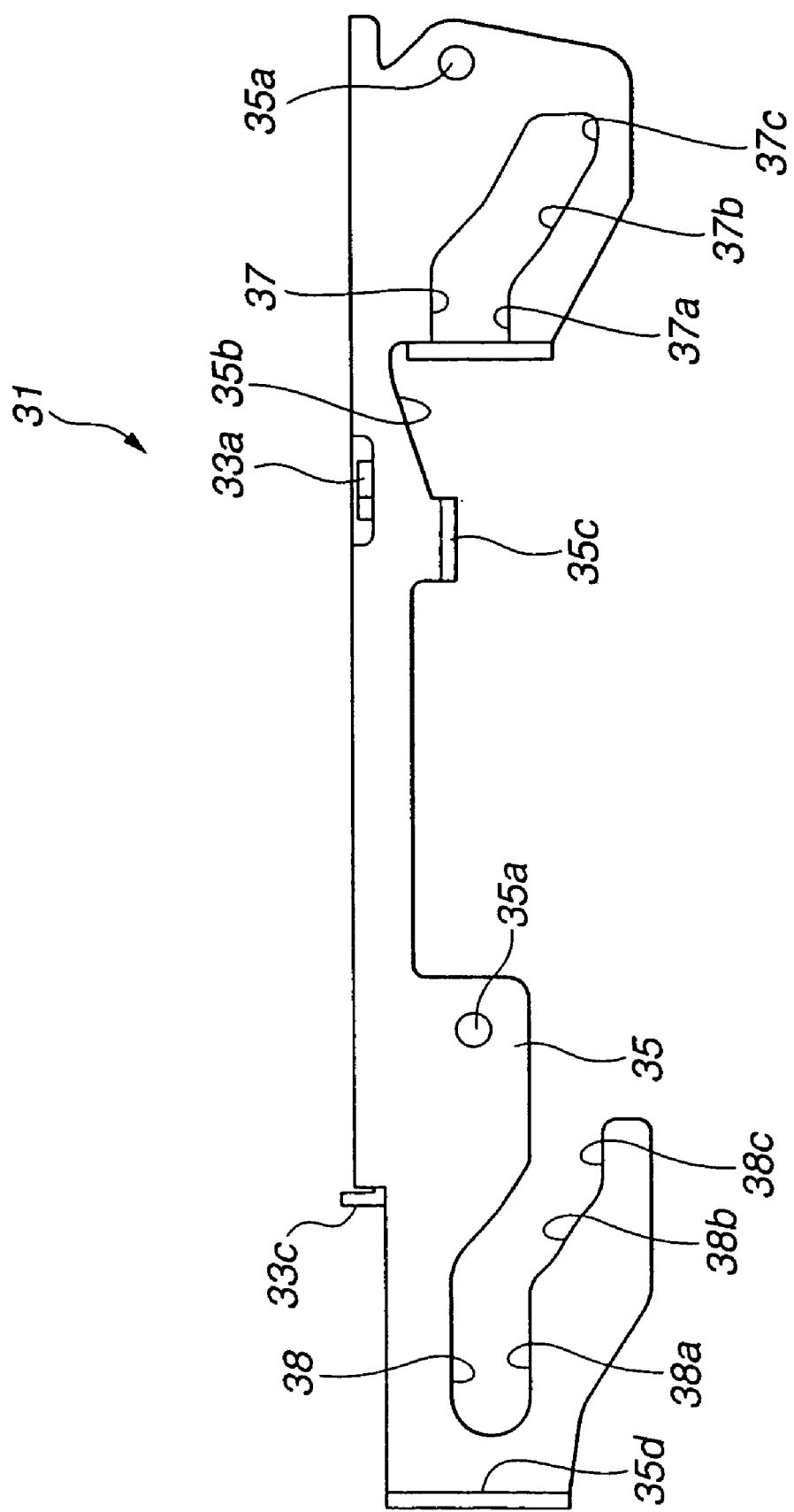
FIG. 23 is a left side view showing the slider.
Figure 24:
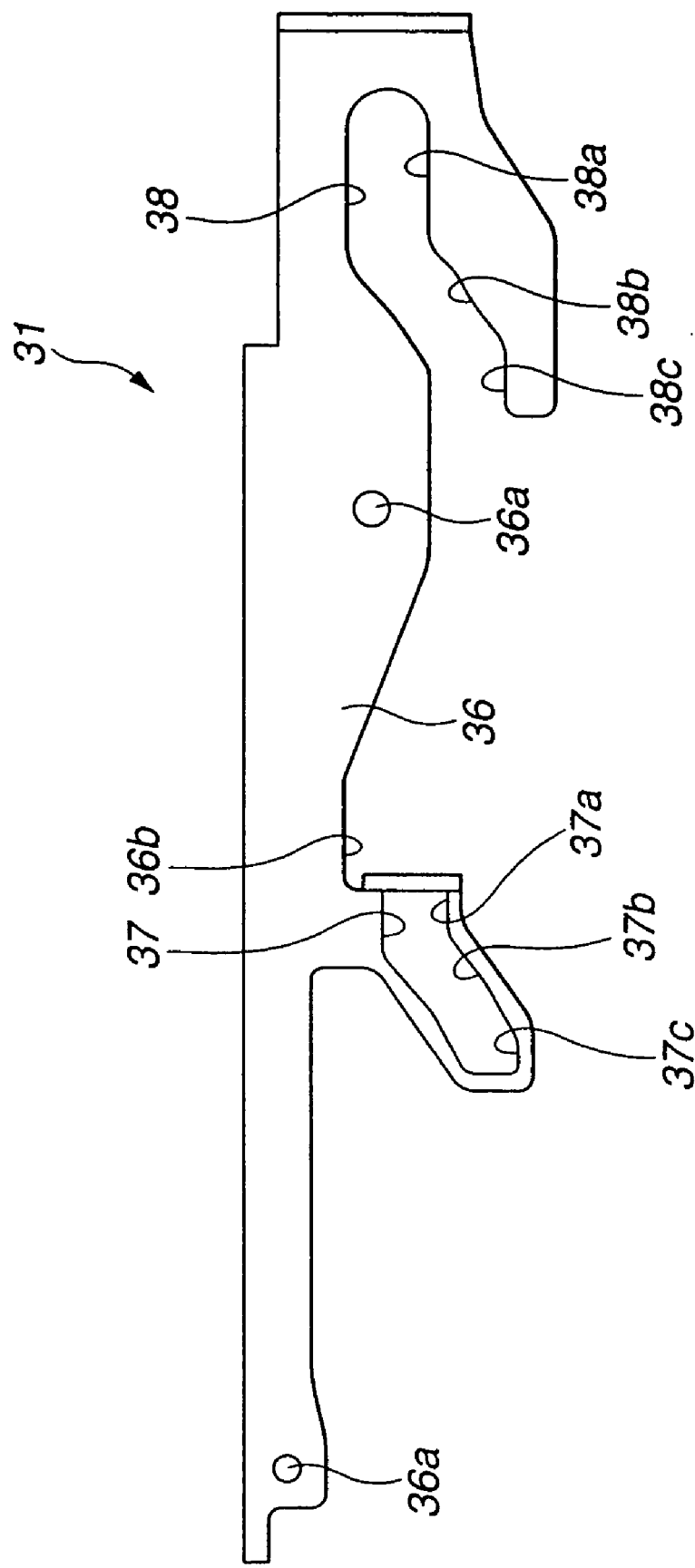
FIG. 24 is a right side view showing the slider.

A slider 31 is supported by the holder 16 for movement in the fore-and-aft direction, as shown in FIGS. 10, 14 and 15. The slider 31 is made up by a connecting portion 32, elongated in the left and right direction, extensions 33, 34, protruded rearwards from the left and right ends of the connecting portion 32, and side portions 35, 36 depending from the side edges of the extensions 33, 34, as shown in FIGS. 22 and 24. The left side extension 33 is provided with a spring retention projection 33a, protruded leftwards from the left side edge thereof, and a spring retention projection 33b, protruded rightwards from the right side edge thereof. A controlled piece 33c is provided at the rear end of the extension 33 by bending a portion of the extension 33. The rear end of the extension is formed with an edge 33d inclined so as to be progressively deflected rightwards in the forward direction. The side portions 35, 36 are provided with supported pins 35a, 36a, which are spaced apart from each other in the fore-and-aft direction. The side portions 35, 36 are also provided with cam grooves 37, 38, which are spaced apart from each other in the fore-and-aft direction. The forward side cam groove 37 is formed with an upper horizontal portion 37a, an inclined portion 37b and a lower horizontal portion 37c, in this order, beginning from the rear side, with the upper horizontal portion 37a being opened rearwards. The rear side cam groove 38 is formed with an upper horizontal portion 38a, an inclined portion 38b and a lower horizontal portion 38c, in this order, beginning from the rear side, with the lower horizontal portion 38c being opened forwards. Directly at back of the cam grooves 37, 37, there is no portion of the slider 31. Here, relief openings 35b, 36b, opened downwards and rearwards, are formed.

The left side portion 35 is formed with thrust pieces 35c, 35d, directly at back and at the rear end of the relief opening 35b.

The slider 31 is assembled to the holder 16 as follows (see FIGS. 25 to 28).

Figure 25:
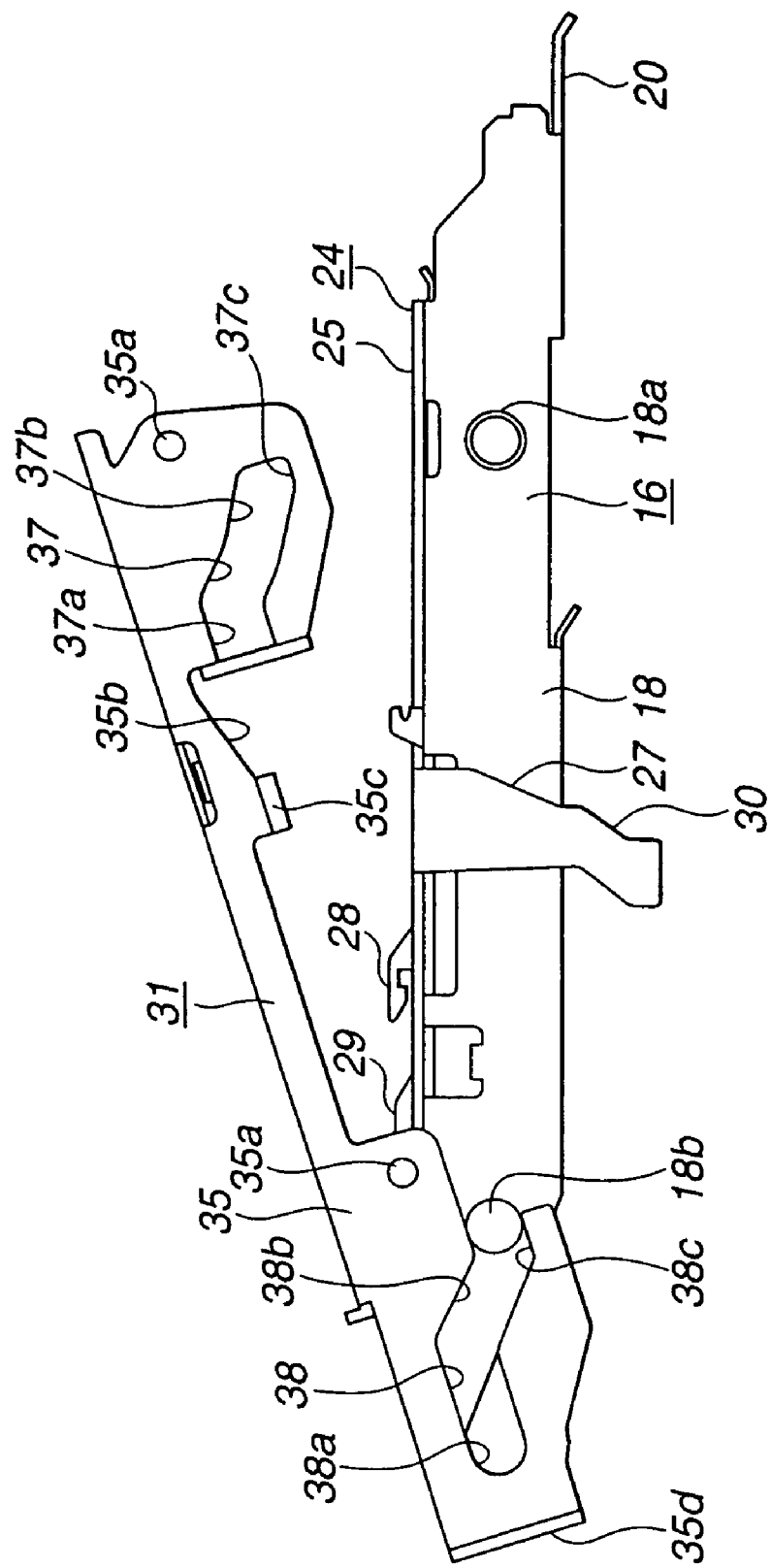
FIG. 25, showing a sequence of assembling the slider on the holder, is a side view showing the state in which a holder supporting pin is engaged in a lower horizontal portion of a slider cam groove.

First, the slider 31 is connected to the rear side of the holder 16, as the slider is inclined so that its forward end is positioned upwards, in such a manner that the supporting pins 18b, 19b of the holder 16 will be inserted into the cam grooves 38, 38 of the slider 31 (see FIG. 25).

Figure 26:
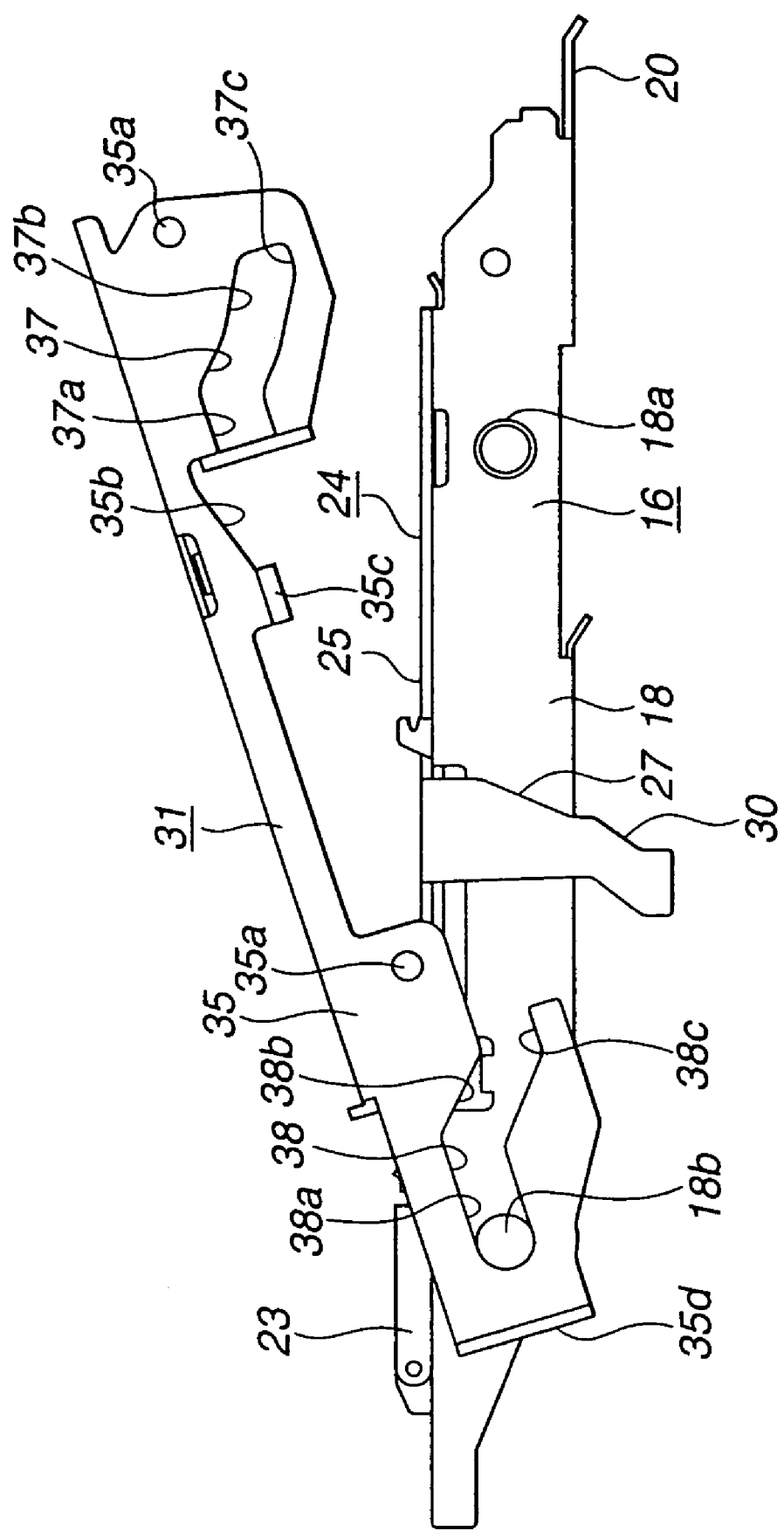
FIG. 26 is a side view showing the state in which the slider is moved forwards and the holder supporting pin is engaged in the upper horizontal portion of the slider cam groove.
Figure 27:
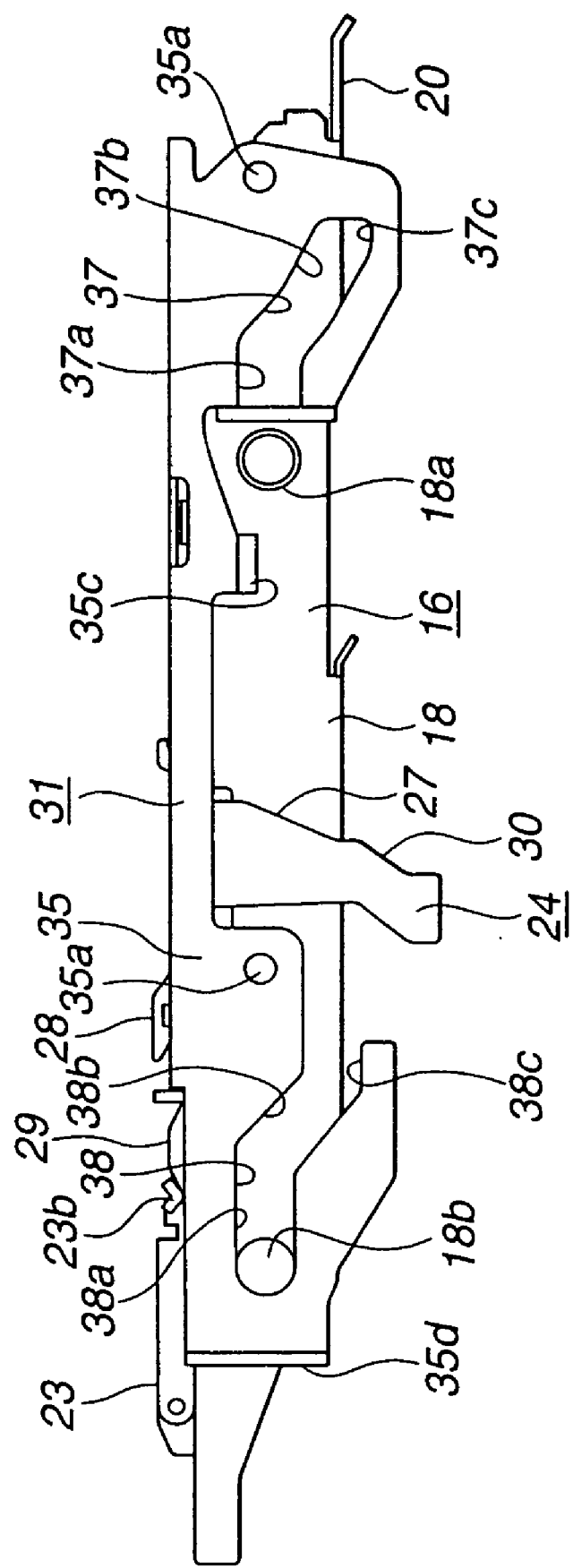
FIG. 27 is an enlarged side view showing the state in which the slider has been placed on the holder.

The slider 31 is then moved forwardly of the holder 16 so that the supporting pins 18b, 19b will be engaged in the rear ends of the cam grooves 38, 38 (see FIG. 26).

The slider 31 is then rotated relative to the holder 16 until the connecting portion 32 rests on the top plate portion 17. Since the relief openings 35b, 36b are formed directly at back of the cam grooves 37, 37 of the slider 31, there is no risk of the slider 31 colliding against the supporting portions 18a, 19a of the holder 16, such that, when the connecting portion 32 is set on the top plate portion 17, the support portions 18a, 19a of the holder 16 are positioned directly at back of the upper horizontal portions 37a, 37a of the cam grooves 37, 37 (see FIG. 27).

Figure 28:
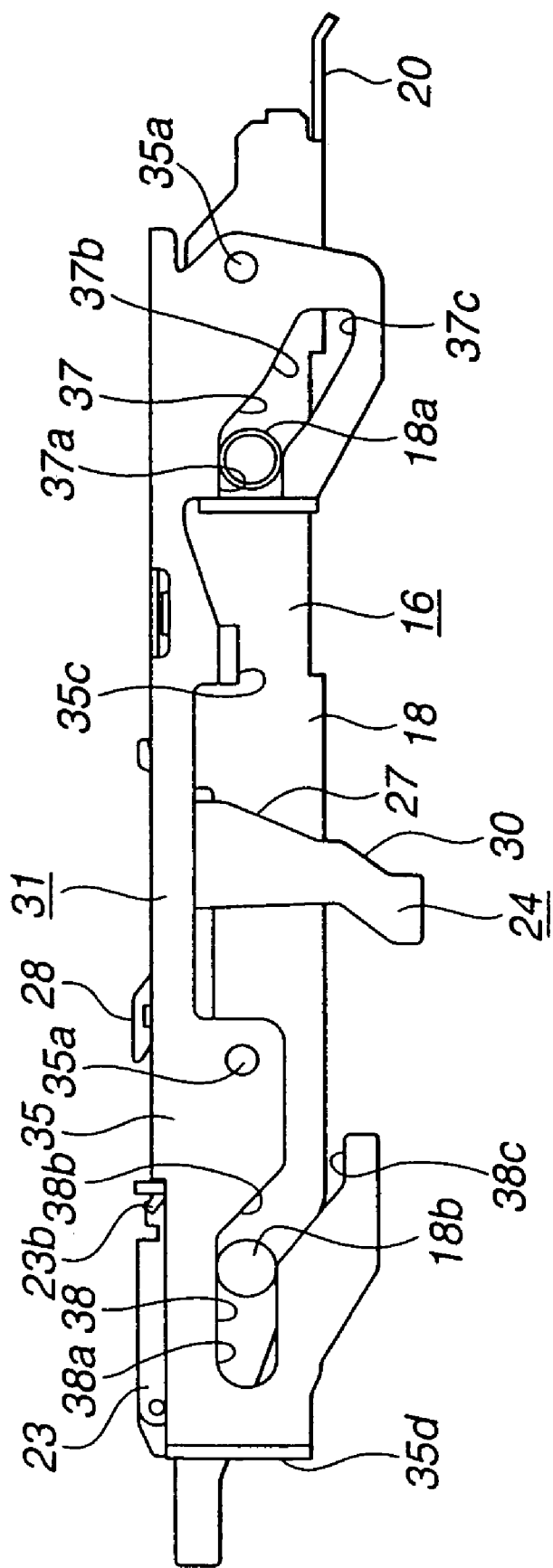
FIG. 28 is an enlarged side view showing the state in which the assembling of the slider on the holder has been completed.

Finally, the slider 31 is moved slightly rearwards relative to the holder 16 so that the support portions 18a, 19a are inserted and engaged in the cam grooves 37, 37 from the rear side (see FIG. 28). This causes the slider 31 to be supported by the holder 16 for movement in the fore-and-aft direction.

For assembling the slider 31 to the holder 16, it is only sufficient that the support pins 18b, 19b are inserted from the forward side into the cam grooves 38, 38 of the slider 31, the slider 31 is then rotated relative to the holder 16 and subsequently the slider is moved towards rear. As a consequence, there is no necessity to provide an allowance in the distance between the slider 31 and the holder 16 in the left and right direction corresponding to the amount of protrusion of the support portions 18a, 19a and the support pins 18b, 19b from the side plate portions 18, 19, respectively. The result is that the width in the left and right direction of the slider 31 may be correspondingly reduced to reduce the size of the disc recording and/or reproducing apparatus 1.

Figure 29:
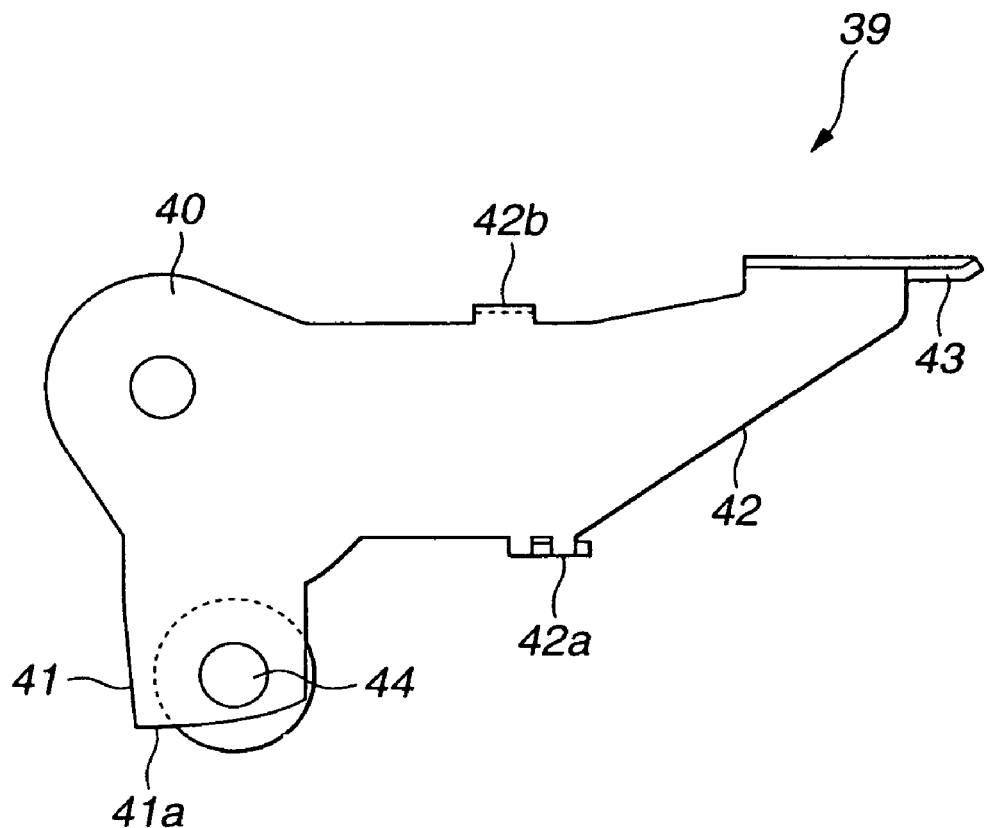
FIG. 29 is a plan view showing an ejection lever.
Figure 30:
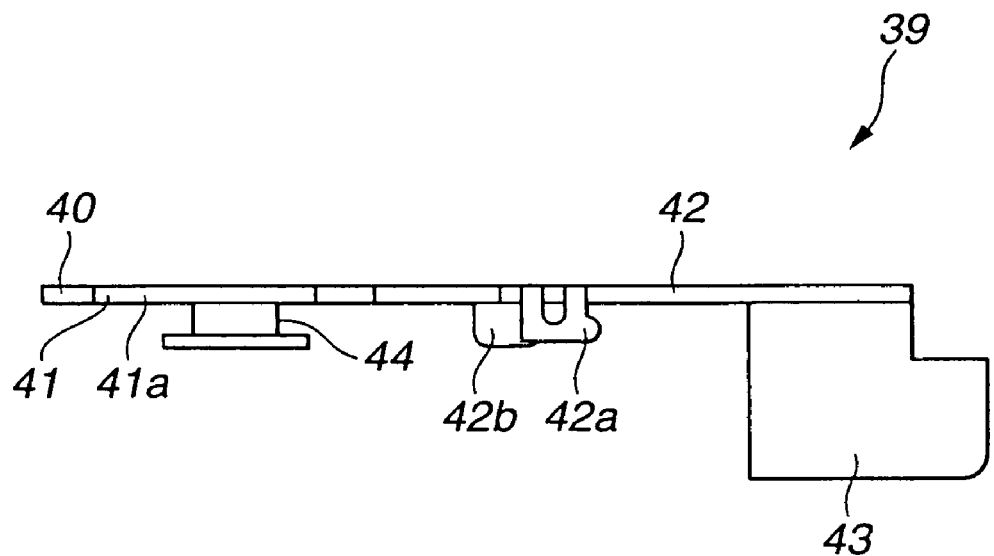
FIG. 30 is a front view thereof.

On the lever supporting portion 9 of the chassis 5, an ejection lever 39 is supported for rotation, as shown in FIGS. 9 and 10. As for the slider 31 and the ejection lever 39, the ejection lever 39, operating as an ejection mechanism for ejecting the disc cartridge held by the holder 16 from the holder 16, is formed integrally by a rotation fulcrum point 40, a control projection 41 protruded from the rotation fulcrum point 40, a protrusion 42 extending from the rotation fulcrum point 40 in a direction substantially perpendicular to the control projection 41 and an operating portion 43 extending downwards from the distal end of the protrusion 42, as shown in FIGS. 29 and 30. The control projection 41 has its distal end edge formed as a control edge 41a contacted with the controlled piece 33c of the slider 31. A roll 44 is carried for rotation by the distal end of the control projection 41. This roll 44 is carried as it is protruded downwards from the control projection 41. The forward edge of the protrusion 42 has a spring retainer 42a, while its rear edge includes an insertion piece 42b bent downwards. The insertion piece 42b is inserted into the control opening 10c of the lever controlling portion 10 of the chassis 5. Rotation of the ejection lever 39 in a forward direction indicated by arrow R1 in FIG. 10 is controlled by the insertion piece 42b contacting with the forward opening edge of the control opening 10c.

The holder 16, carrying the cam lever 24 and the slider 31, is slidably engaged from an inner side in guide grooves 15a, 15a of the side supporting portions 7, 8 of the chassis 5, as the support pins 18b, 19b are protruded from the cam grooves 38, 38 of the slider 31. The slider 31, carried by the holder 16, has the supported pins 35a, 36a slidably engaged from the inner side in the supporting grooves 13a, 14a of the side supporting portions 7, 8 of the chassis 5. As a consequence, the holder 16 is movable in the vertical direction relative to the chassis 5 along with the cam lever 24. The slider 31 is movable in the fore-and-aft direction relative to the holder 16, by the support portions 18a, 19a and the support pins 18b, 19b being moved in the cam grooves 37, 38 of the slider 31 during movement of the holder 16.

When the holder 16 has been supported by the chassis 5 as described above, a spring member 45 as a tension coil spring is mounted under tension between the spring retainer 42a of the ejection lever 39, rotatably carried by the lever supporting portion 9, and the spring retention projection 33b of the slider 31 (see FIG. 10). As the ejection lever 39 is biased in a direction indicated by arrow R1 in FIG. 10, the slider 31 is biased rearwards, with the controlled piece 33c of the slider 31 being contacted with the control edge 41a of the control projection 41 of the ejection lever 39, positioned at the stroke end of rotation in the direction indicated by arrow R1 in FIG. 10, to control the rearward movement of the slider 31.

Between the spring retention projection 33a of the slider 31 and the spring retention piece 14b of the side supporting portion 7 of the chassis 5, an auxiliary spring 46, having a spring force weaker than the spring force of the spring member 45, is mounted under tension. This also biases the slider 31 rearwards (see FIG. 10).

Figure 31:
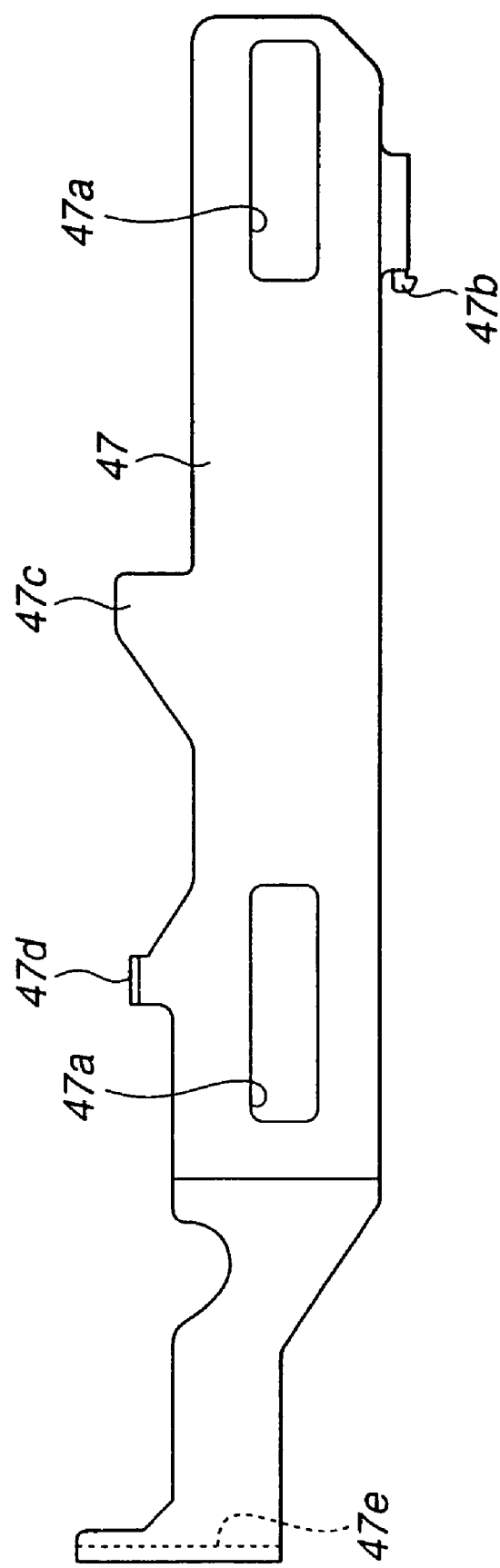
FIG. 31 is a side view showing a joint lever.

On the side supporting portion 7, a joint lever 47 is supported for movement in the fore-and-aft direction, as shown in FIGS. 9 and 10. The joint lever 47 is elongated in the fore-and-aft direction and is formed with supported openings 47a, 47a which are spaced apart from each other in the fore-and-aft direction (see FIG. 31). The forward lower edge of the joint lever 47 is formed with a mating operating piece 47b, whereas the upper edge of the joint lever between the paired supported openings 47a, 47a thereof is formed with an upwardly projecting thrusting piece 47b. A spring retainer 47d is formed above the rear supported opening 47a of the joint lever 47. The rear end of the joint lever 47 is bent rightwards to form a thrusting portion 47e. The support pins 7a, 7a provided on the side supporting portion 7 are inserted into the supported openings 47a, 47a of the joint lever 47 so as to be carried for movement in the fore-and-aft direction. With the joint lever 47 supported by the side supporting portion 7, a tension coil spring 48 is mounted under tension between the spring retainer 47d and the spring retention piece 15b of the side supporting portion 7 for biasing the joint lever 47 rearwards.

Figure 1:
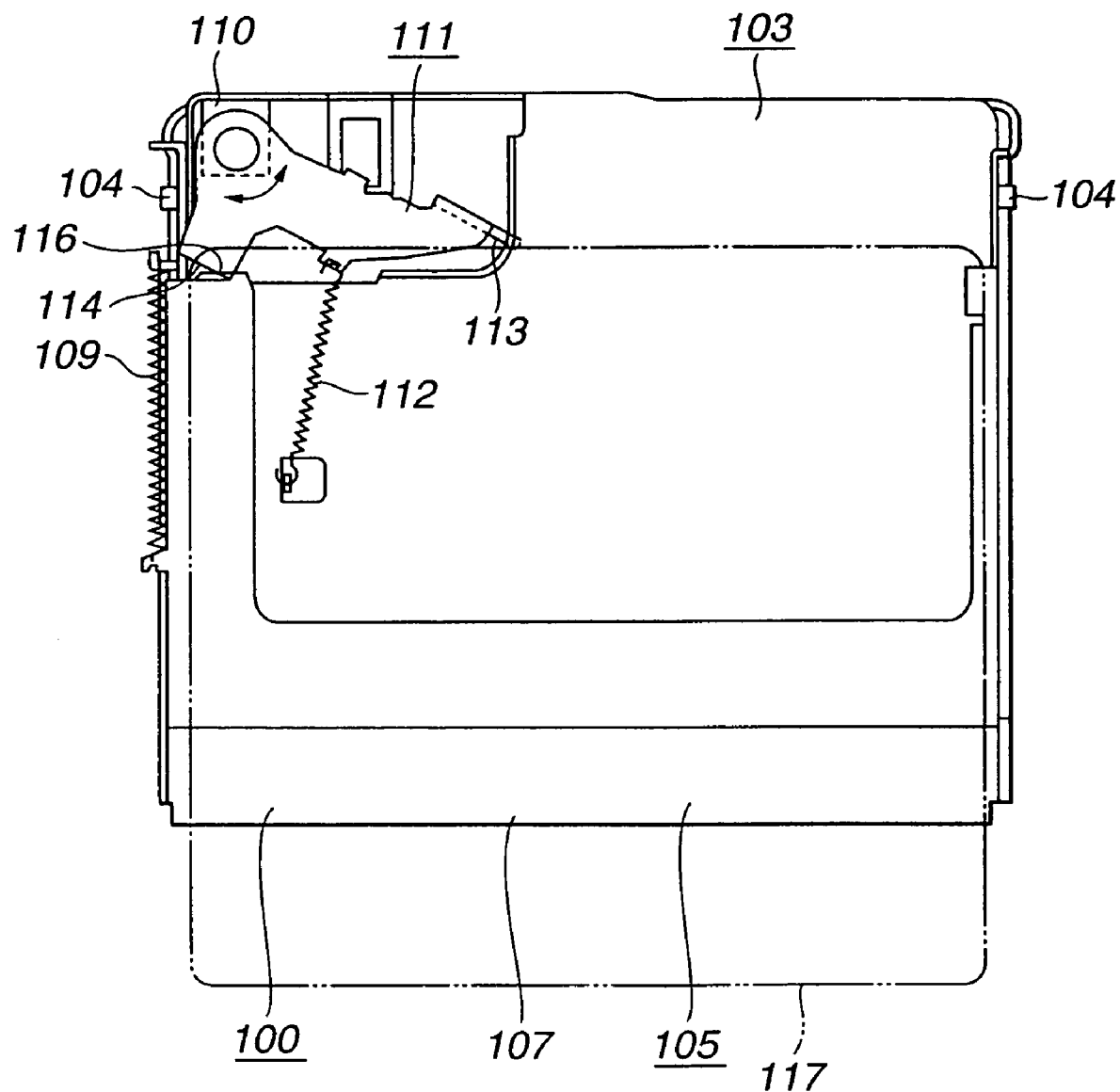
FIG. 1 show the operation of a recording and/or reproducing apparatus of the related art, and is a plan view showing the state prior to rotation of the ejection lever.
Figure 2:
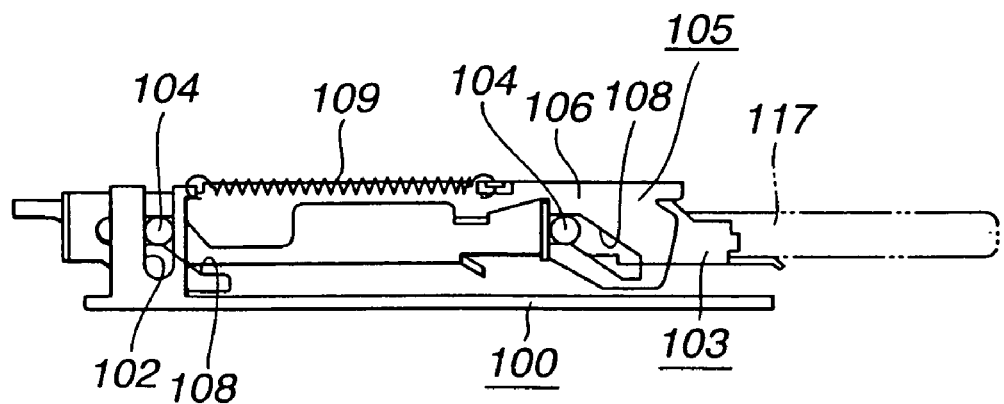
FIG. 2 is a side view thereof, showing the state prior to descent of the holder.
Figure 3:
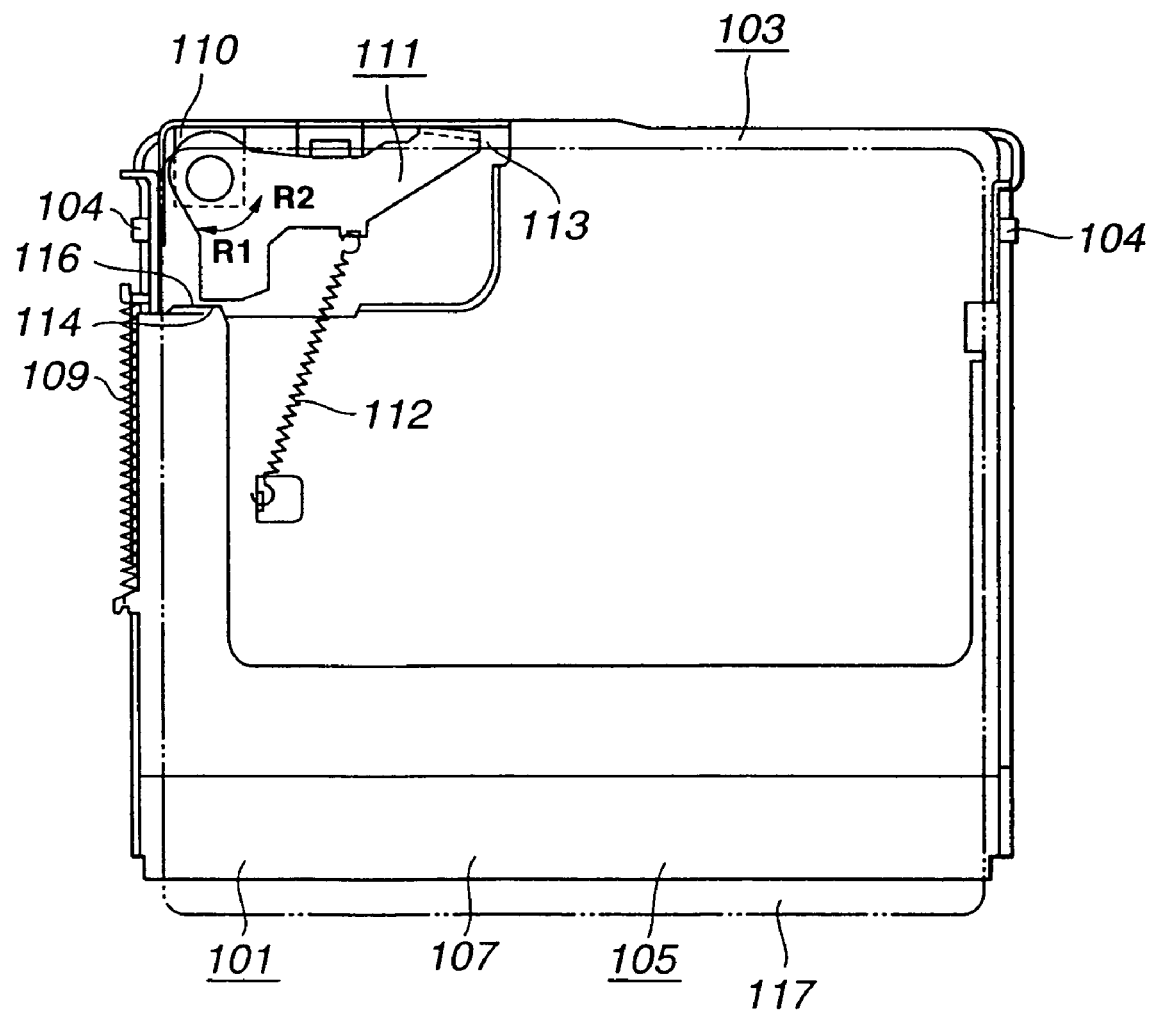
FIG. 3 is a plan view thereof, showing the state prior to descent of the holder.
Figure 4:
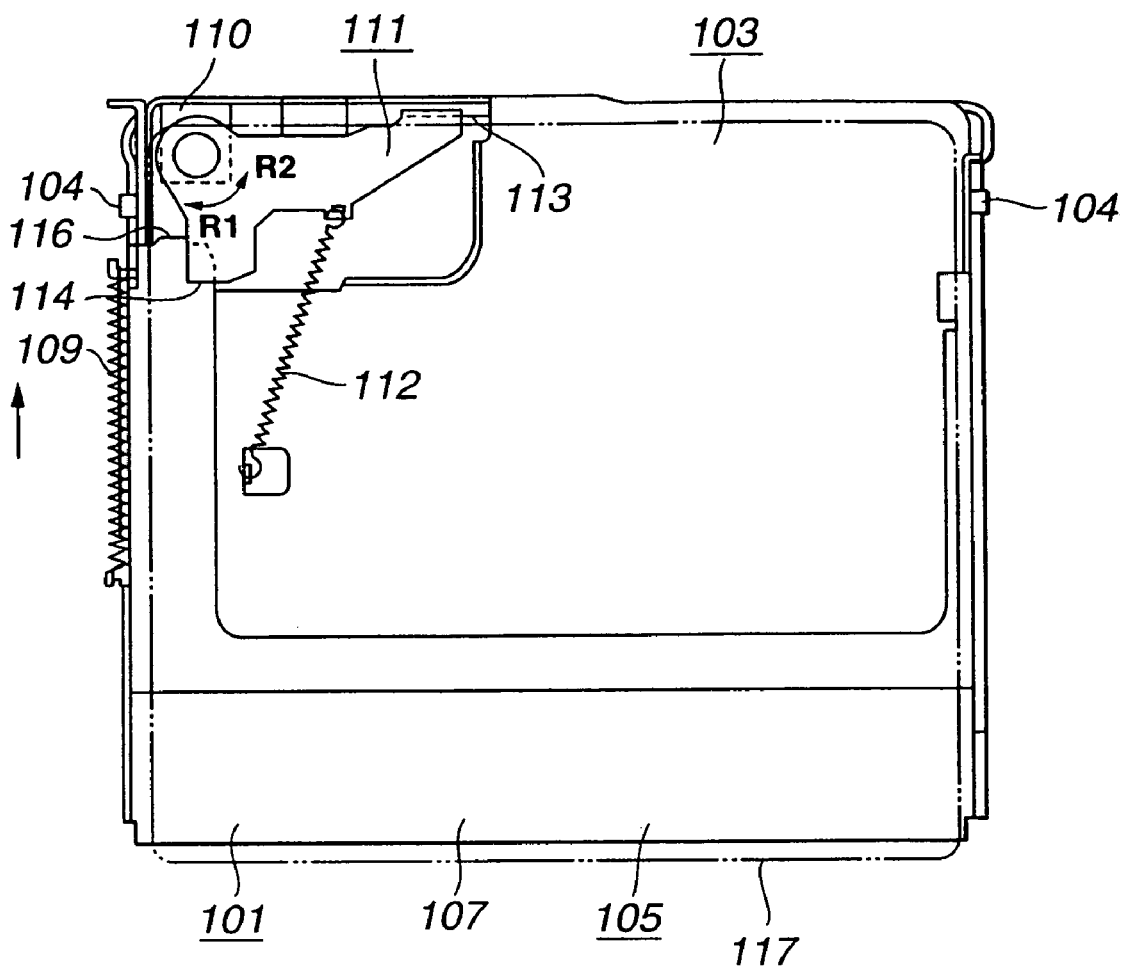
FIG. 4 is a plan view thereof, showing the state in which the ejection lever has been rotated to shift the slider backwards.
Figure 5:
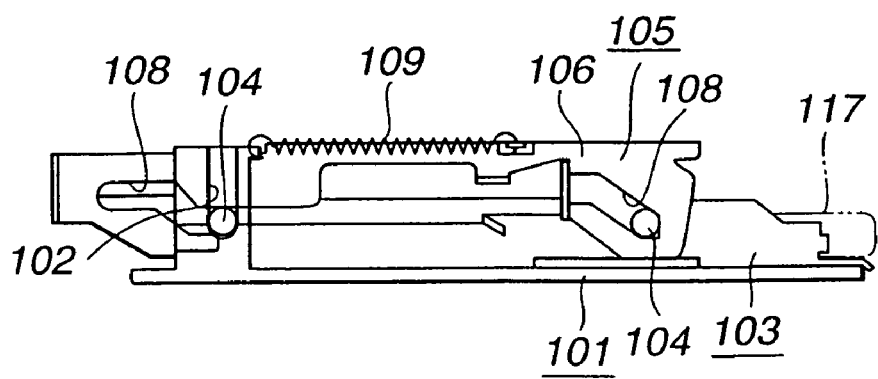
FIG. 5 is a side view thereof showing the state in which the holder has been lowered.
Figure 6:
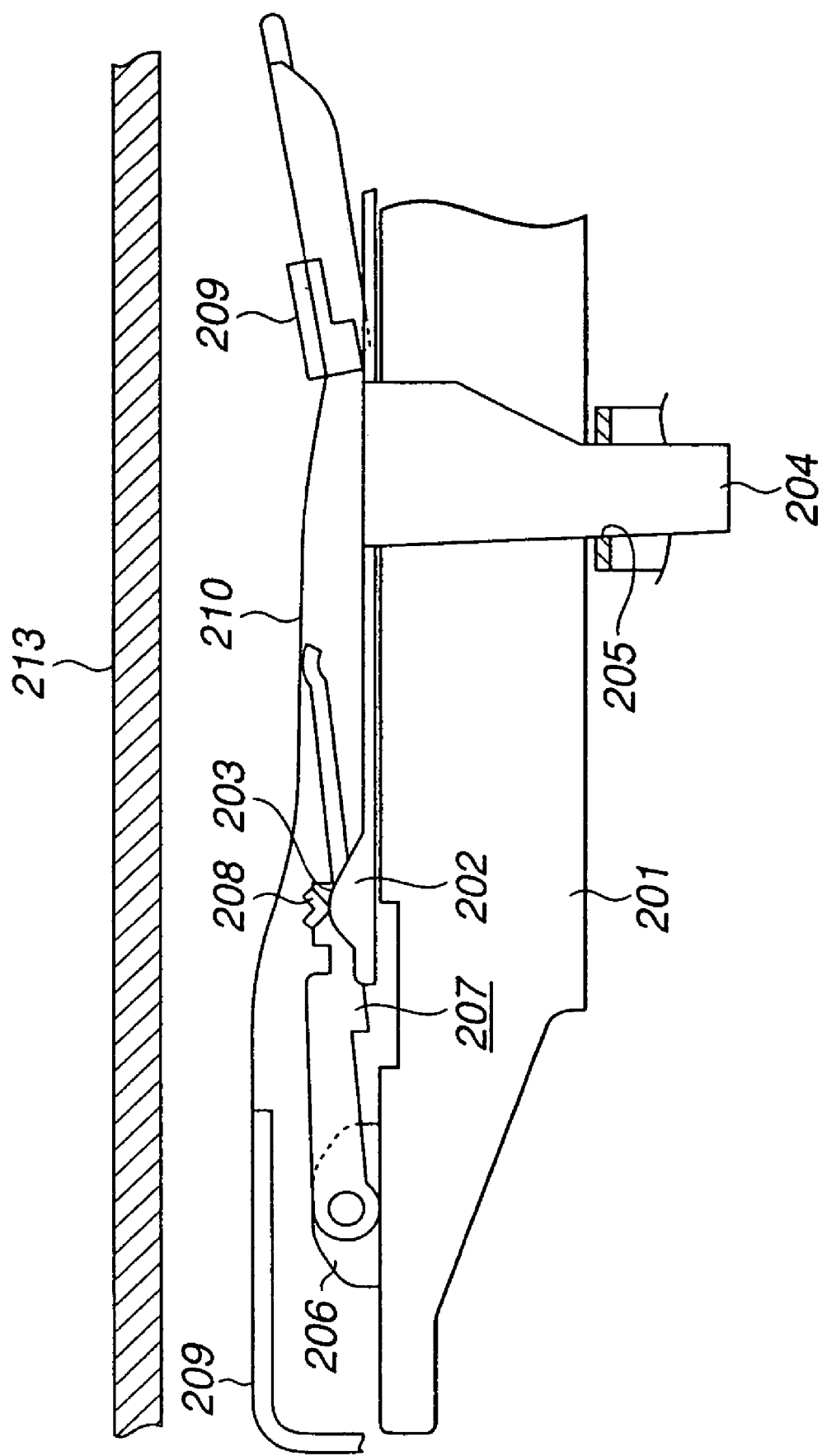
FIG. 6 shows the operation of another recording and/or reproducing apparatus of the related art, and is a side view, shown partially in cross-section, and showing the state in which, when the holder has been lowered, the magnetic head has retreated.

At a mid portion of the major surface portion 6 of the chassis 5, a spindle motor, not shown, is mounted, and a disc table 49 is secured to a motor shaft of the spindle motor (see FIGS. 2 and 4). The disc table 49 includes a centering boss 49a, fitted in a center opening of a disc-shaped recording medium, and a table 49b on which is set an inner rim of the disc-shaped recording medium. A suction magnet, not shown, is embedded in the centering boss 49a.

Within the pickup mounting opening 6a of the major surface portion 6, an optical pickup 50 is mounted for movement radially of the disc-shaped recording medium, as shown in FIGS. 9 and 11. The optical pickup 50 includes a biaxial actuator 52, having an objective lens 52a, carried on a movable base 51. The movable base 51 has its forward and rear ends carried for sliding movement by guide shafts 53, 54 mounted on the lower surface of the major surface portion 6, respectively. A nut, not shown, provided on the movable base 51, is engaged with a lead screw 55 provided on the lower surface of the major surface portion 6. The lead screw 55 is rotated by a feed motor 56 provided on the lower surface of the major surface portion 6. When the lead screw 55 is rotated by the feed motor 56, the nut meshing with the lead screw 55 is fed along the axial direction of the lead screw 55, whereby the optical pickup 50 is guided by the guide shafts 53, 54 so as to be moved along the radius of the disc-shaped recording medium.

The rear end of the optical pickup 50 carries the lower surface of a U-shaped connecting member 57 with the opening of the letter U being opened forwards when seen from the lateral side. The connecting member 57 includes an intermediate portion, lying directly at back of the rear edge of the major surface portion 6, while having an upper surface portion lying directly above the rear end of the holder 16 (see FIG. 10). On the upper surface of the connecting member 57 are mounted a head mounting arm 58 and an arm control plate 59 for controlling excess upward shifting of the head mounting arm 58 (see FIG. 10). The head mounting arm 58, formed by an elastic metal sheet of a thin thickness, is elongated in the fore-and-aft direction, and has its rear end mounted to the connecting member 57. The head mounting arm is set at a mid portion thereof in the fore-and-aft direction on the head shift lever 23 carried by the holder 16. A magnetic head 58a is mounted on the forward end of the head mounting arm 58 directly on top of the objective lens 52a of the biaxial actuator 52. The arm control plate 59 is elongated in the fore-and-aft direction, and has its rear end mounted to the connecting member 57 from above the head mounting arm 58. The arm control plate includes lateral projections for holding the head mounting arm 58 from above.

Since the optical pickup 50 and the head mounting arm 58 are interconnected by the connecting member 57, the head mounting arm 58, carrying the optical pickup 50 and the magnetic head 58a, may be moved in unison along the radius of the disc-shaped recording medium.

Figure 32:
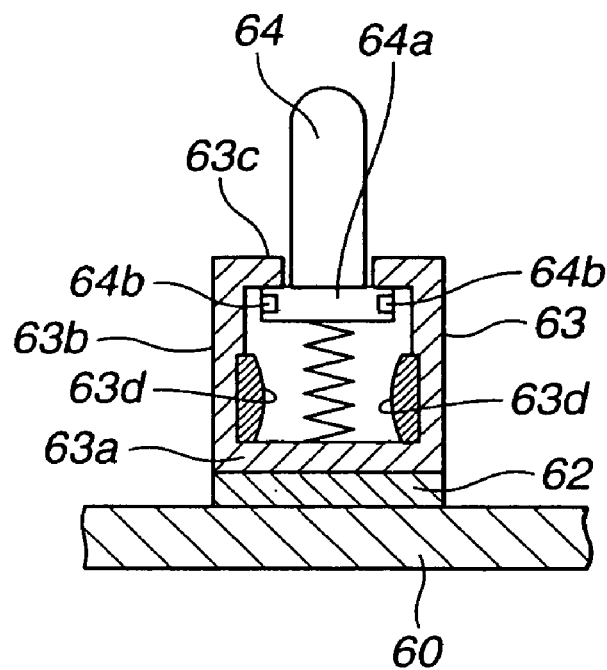
FIG. 32 shows a disc detection switch and is a cross-sectional view showing the switch in the non-operated state.
Figure 33:
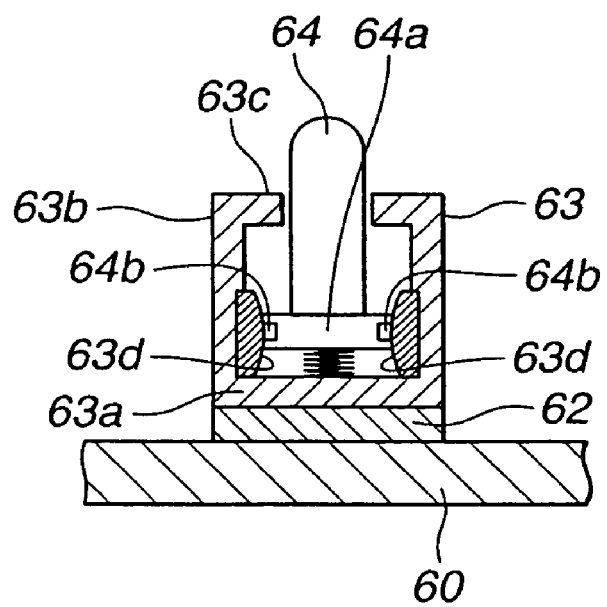
FIG. 33 is a cross-sectional view showing the switch in the operated state.

A circuit board 60 is mounted on the forward lower surface of the major surface portion 6 of the chassis 5, and carries plural disc detection switches 61 on the forward left end of the major surface portion 6 of the chassis 5, as shown in FIG. 9. A disc detection switch 61 is mounted via a connection board 62, mounted in turn on the circuit board 60, and includes a switch casing 63 and a mating operating shaft 64 vertically movably supported on the switch casing 63, as shown in FIGS. 32 and 33. The switch casing 63 includes a rectangular bottom surface 63a, a peripheral wall section 63b, upstanding from the periphery of the bottom surface 63a and an anti-extrication portion 63c projected inwards from the peripheral wall section 63b. The lower end of the peripheral wall section 63b includes contacts 63d, 63d. The mating operating shaft 64 is arbor-shaped, with the diameter of a lower end 64a being thicker in thickness than the other portions. The operating shaft includes a pair of contacts 64b, 64b provided on its lower end 64a. A compression spring 65 is mounted under compression between the bottom surface 63a of the switch casing 63 and the lower surface of the mating operating shaft 64, so that the mating operating shaft 64 is biased upwards. When the mating operating shaft 64 is not acted on, the lower end 64a is engaged with the anti-extrication portion 63c of the switch casing 63, thus establishing a non-detection state in which the contacts 64b, 64b are not connected to the contacts 63d, 63d, as shown in FIG. 32. When the mating operating shaft 64 is acted on by being thrust downwards by the disc cartridge, the contacts 64b, 64b are connected to the contacts 63d, 63d to set up a detection state.

On the leftward lower surface portion of the circuit board 60, a rotation detection switch 66 is mounted as shown in FIG. 11. A mating operating portion 66a of the rotation detection switch 66 is protruded substantially laterally.

Figure 34:
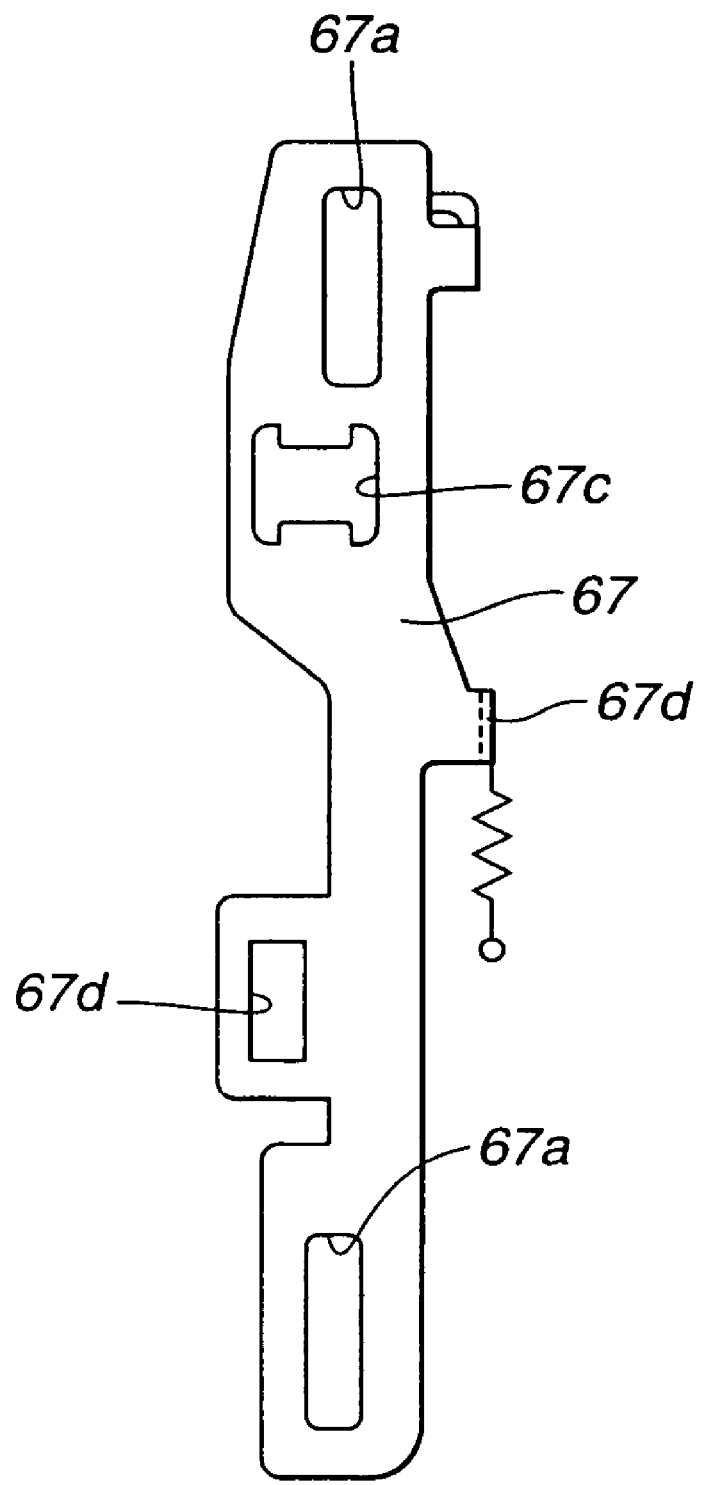
FIG. 34 is a plan view showing a driving lever.

On the lower left surface portion of the major surface portion 6, a driving lever 67 is mounted for movement in the fore-and-aft direction, as shown in FIG. 11. The driving lever 67 is elongated in the fore-and-aft direction and is formed with supported openings 67a, 67a at the forward and rear ends thereof (see FIG. 34). The forward end of the driving lever 67 is formed with an engagement opening 67b. In this engagement opening 67b is inserted and engaged the cam leg 27 of the cam lever 24. The rearward end of the driving lever 67 is formed with a connection opening 67c, while the mid portion thereof in the fore-and-aft direction is formed with a spring retention piece 67d.

By the support pins 6d, 6d on the lower surface of the major surface portion 6 being inserted into the supported openings 67a, 67a of the driving lever 67, and by the cam leg 27 of the cam lever 24 being inserted and engaged with the engagement opening 67b, the cam lever 24 is moved in the fore-and-aft direction with movement of the driving lever 67 in the fore-and-aft direction. Between the spring retention piece 67d and a spring retention projection 6e provided on the lower surface of the major surface portion 6, a tension coil spring 68 is mounted under tension for biasing the driving lever 67 in the forward direction, as shown in FIG. 11.

Figure 35:
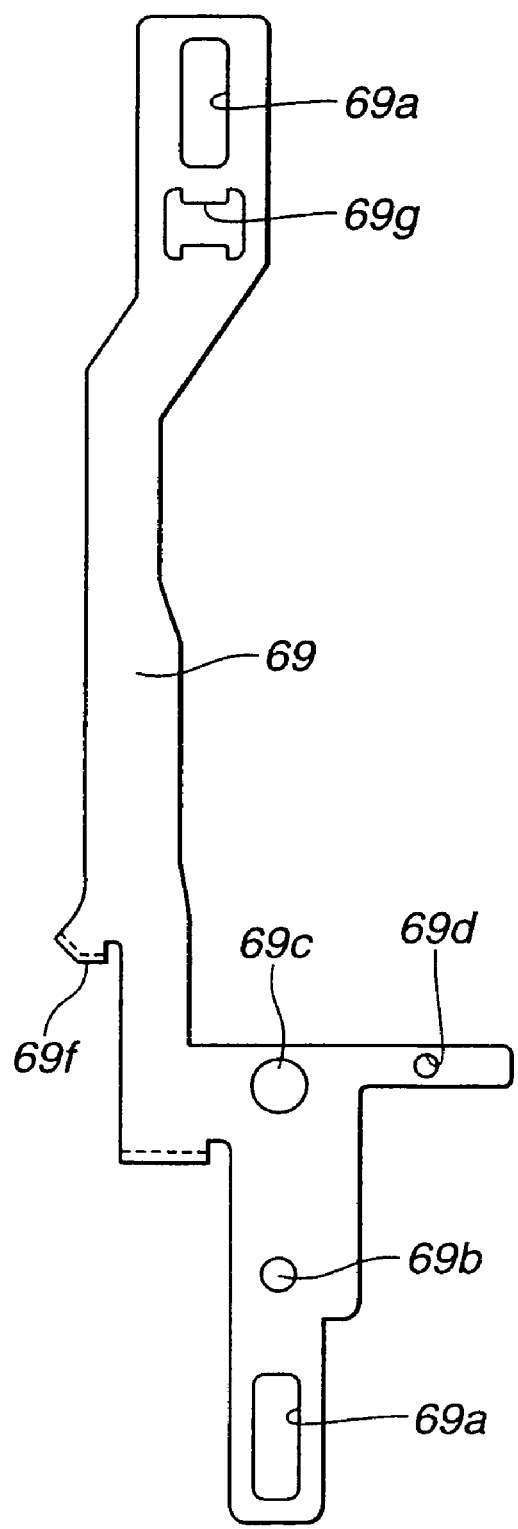
FIG. 35 is a plan view showing a limit lever.

On the lower surface of the major surface portion 6, a limit lever 69 is mounted for movement in the fore-and-aft direction, in a side-by-side relationship to the driving lever 67, as shown in FIG. 11. The limit lever 69 is elongated in the fore-and-aft direction and is formed at forward and rear ends with supported openings 69a, 69a (see FIG. 35). Towards the forward end of the limit lever 69, there is provided a lever supporting portion 69b. A support shaft 69c is mounted in rear of the lever supporting portion 69b. The limit lever 69 has a spring retention opening 69d and a forwardly directed support piece 69e on the right-hand side and on the left-hand side of the support shaft 69c, respectively. The limit lever 69 is formed with a thrust piece 69f at back of the support piece 69e, while being formed with a connection opening 69g towards its rear end. In the supported openings 69a, 69a of the limit lever 69, support pins 6f, 6f provided on the lower surface of the major surface portion 6 are inserted and carried for movement in the fore-and-aft direction (see FIG. 11). A stop edge 6g formed on the major surface portion 6 of the chassis 5 is positioned ahead of the support piece 69e of the limit lever 69 (see FIG. 11).

Figure 36:
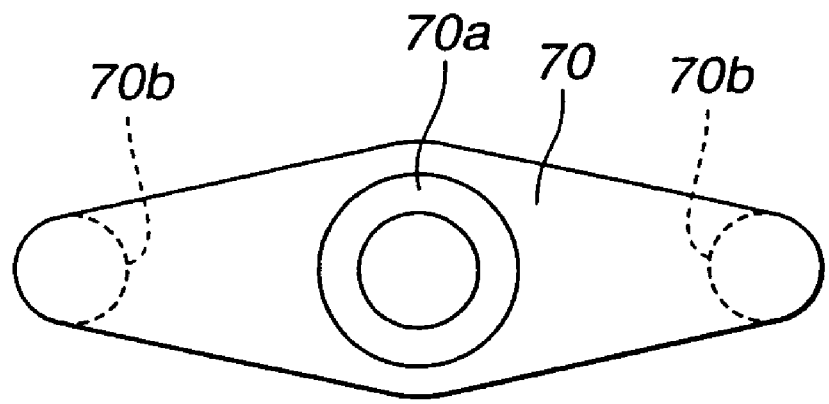
FIG. 36 is a plan view showing a converting lever.
Figure 37:
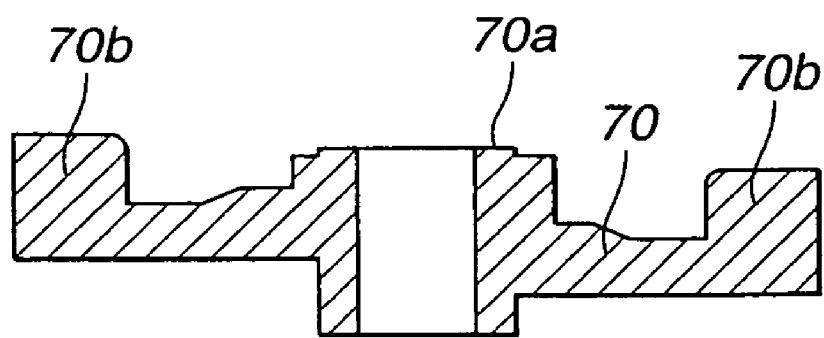
FIG. 37 is a cross-sectional view showing the converting lever.

The driving lever 67 and the limit lever 69 are interconnected by a conversion lever 70, as shown in FIG. 11. The conversion lever 70 has a center supported tube 70a and upwardly projecting connection pins 70b, 70b on both sides of the supported tube 70a (see FIGS. 36 and 37).

A support shaft 6h of the conversion lever 70, provided between the driving lever 67 on the lower surface of the major surface portion 6 and the limit lever 69, is inserted into the supported tube 70a, for rotation relative to the major surface portion 6, as shown in FIG. 11. The connection pins 70b, 70b are rotatably engaged in the connection opening 67c of the driving lever 67 and in the connection opening 69g of the limit lever 69. As a result, the driving lever 67 and the limit lever 69 are moved in the opposite directions in the fore-and-aft direction.

Figure 38:
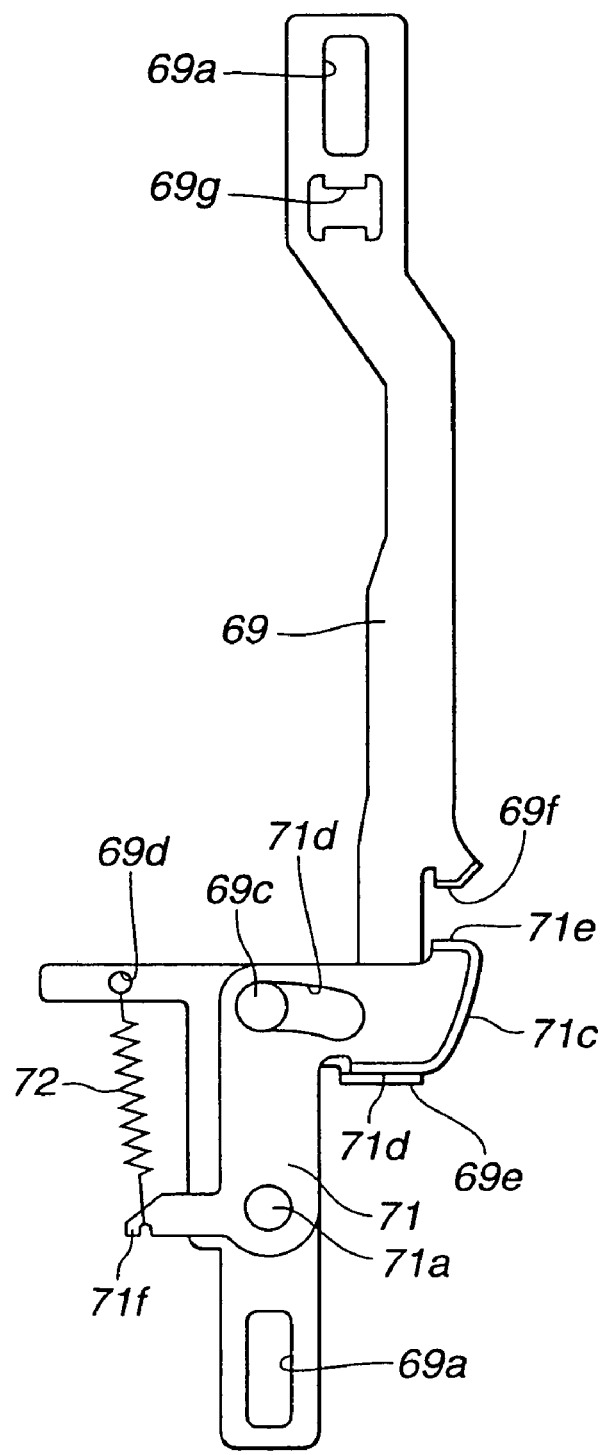
FIG. 38 is a bottom view showing the limit lever and an operating lever supported by the limit lever.
Figure 39:
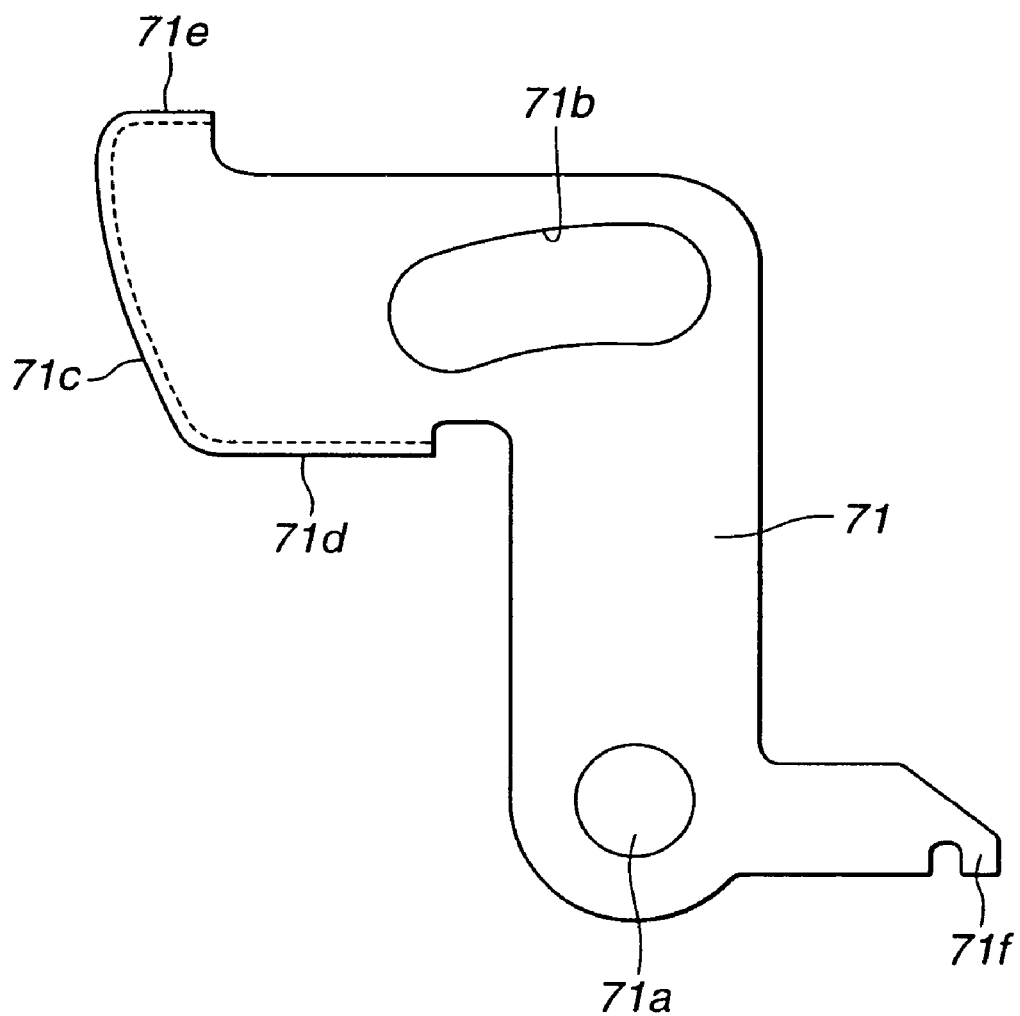
FIG. 39 is a plan view showing the operating lever.

The lower surface of the limit lever 69 rotatably carries an operating lever 71, as shown in FIGS. 11 and 38. The operating lever 71 is substantially L-shaped and has its one end formed as a rotation fulcrum point 71a, which rotation fulcrum point 71a is rotatably carried by the lever supporting portion 69b of the limit lever 69 (see FIGS. 38 and 39). The bent portion of the operating lever 71 is formed with a short arcuate guide opening 71b. The support shaft 69c of the limit lever 69 is inserted into the guide opening 71b. The operating lever 71 is rotatable relative the limit lever 69 within an extent of the guide opening 71b.

The operating lever 71 has its distal edge bent to from a curved mating operating edge 71c, and includes a linear controlled edge 71d and a linear thrust edge 71e on both opposite sides of the mating operating edge 71c.

A spring retention projection 71f is protruded from the rotation fulcrum point 71a of the operating lever 71. A tension spring 72 is mounted under tension between the spring retention projection 71f and the spring retention opening 69d of the limit lever 69. Thus, the operating lever 71 is biased counterclockwise in the plane of FIG. 11. Except if the force in the clockwise direction in FIG. 11 is accorded to the operating lever 71 in FIG. 11, the controlled edge 71d is contacted with the support piece 69e of the limit lever 69.

A driving motor 73 is mounted on the lower surface of the major surface portion 6 of the chassis 5, and drives a gear set 74, made up of four gears, carried on the lower surface of the major surface portion 6 (see FIG. 11). A switching gear 75 meshes with the fourth gear of the gear set 74 counted from the side of the driving motor 73 (see FIG. 11). An operating boss 75a is formed as one with the lower surface of the switching gear 75. Rotation of the switching gear 75 actuates the mating operating portion 66a of the rotation detection switch 66. When the mating operating portion 66a is actuated, rotation of the driving motor 73 ceases transiently.

A driving gear 76 meshes with the switching gear 75. The upper surface of the driving gear 66 is formed with a thrusting boss 76a (see FIG. 11). The thrusting boss 76a plays the role of a driving power transmission for transmitting the driving power of the driving motor 73 through the limit lever 69, conversion lever 70 and the driving lever 67 to the cam lever 24, as a portion of the head movement mechanism, and of transmitting the driving power of the driving motor 73 through the joint lever 47 to the slider 31 as a portion of the ejection mechanism. The driving gear 76 is mounted at such a position that the thrusting boss 76a is able to thrust the thrust piece 69f of the limit lever 69, the mating operating edge 71c of the operating lever 71 and the thrust edge 71e of the operating lever 71.

Figure 40:
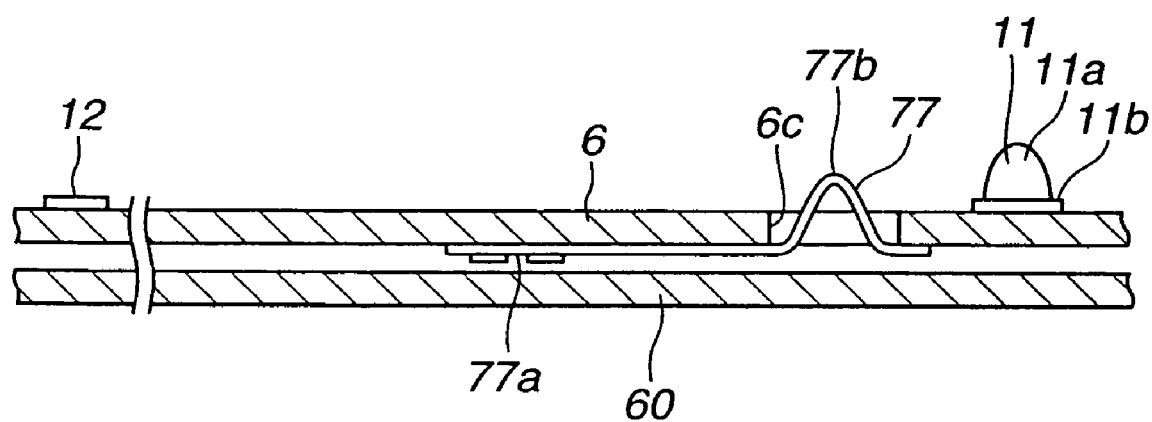
FIG. 40 is an enlarged cross-sectional view showing the state of mounting a spring plate member to the chassis.

A spring plate member 77, which plays the role of retaining a shutter, as later explained, of the disc cartridge, is mounted between the major surface portion 6 of the chassis 5 and the circuit board 60 (see FIGS. 9 and 40). The spring plate member 77 has its one end 77a mounted on the major surface portion 6. The portion of the spring plate member towards the other end thereof is formed as an upwardly protruding retainer 77b, which retainer 77b is projected upwards through the retention unit mounting opening 6c (see FIG. 40). The upper end of the retainer 77b is positioned above the support portion 11b of the positioning pin 11 provided on the major surface portion 6 and the receptacle 12 (see FIG. 40).

Figure 41:
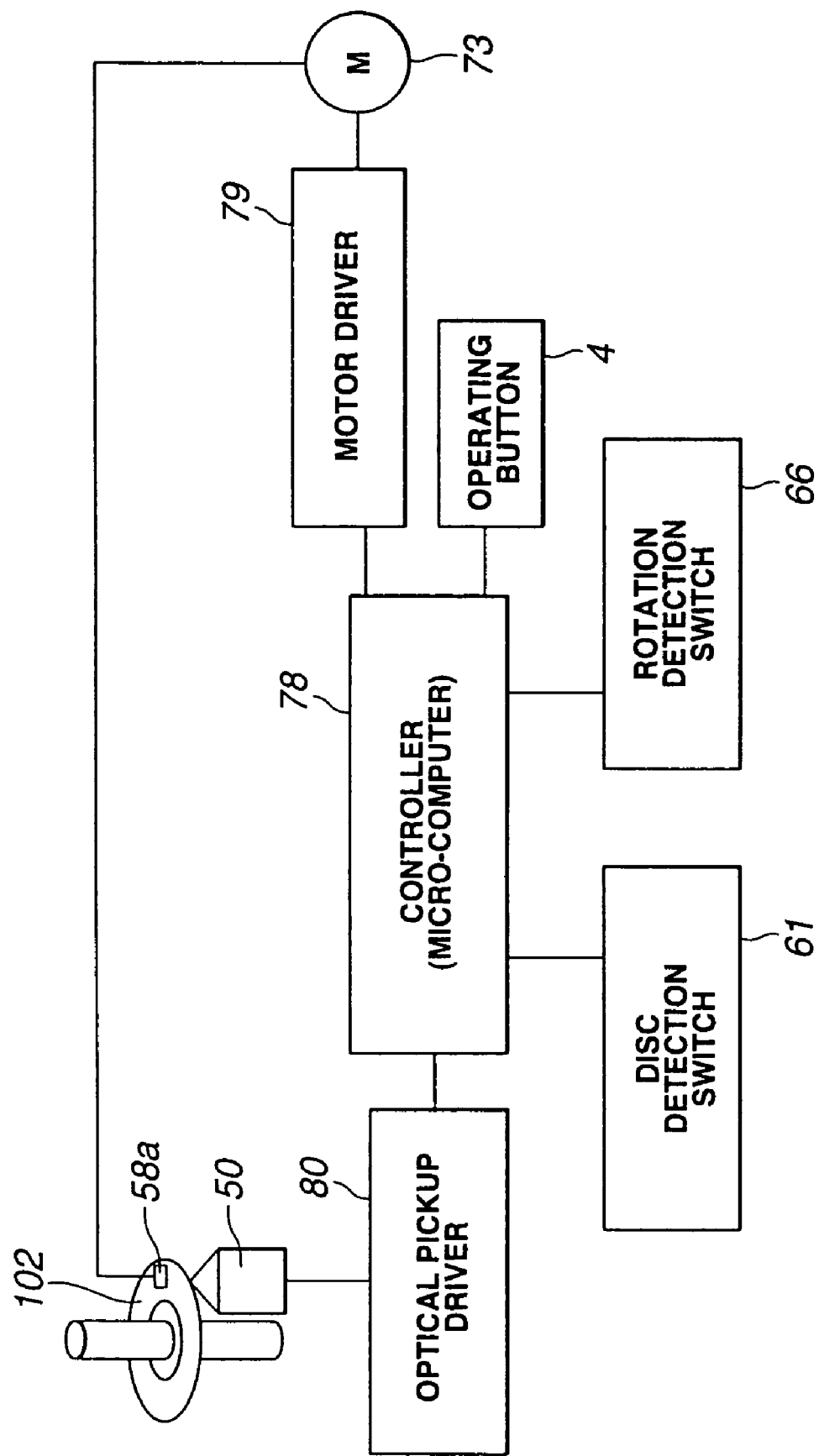
FIG. 41 is a block diagram showing the structure of a portion of the disc recording and/or reproducing apparatus.

The circuit board 60 carries a controller (micro-computer) including a central processing unit (CPU) 78 (see FIG. 41). The controller 78 sends a control signal to each component based on a detection signal yielded on actuation of the disc detection switch 61 and the rotation detection switch 66. The controller 78 also sends a control signal to each component based on an operating signal yielded on actuation of any of the operating buttons 4 provided on the outer casing 2.

The driving motor 73 is run in rotation or halted based on a control signal sent from the controller 78 through a motor driver 79. The optical pickup 50 is driven or halted based on a control signal sent from the controller 78 through an optical pickup driver 80. The feed motor 56 and the spindle motor are also driven or halted based on the control signal input from the controller 78.

The disc cartridge 120 includes a flattened rectangular box-shaped casing 121, within which a magneto-optical disc 122 as a disc-shaped recording medium is rotationally mounted, as shown in FIG. 8. Centrally of the lower surface of the casing 121 is formed an insertion opening, not shown, and a through-hole, not shown, is formed laterally of the insertion opening. In the upper surface of the casing 121, there is formed, in register with the through-hole, a head access opening 121*a*, into which is inserted the magnetic head 58*a*. In the casing 121 is slidably mounted a shutter 123 for opening or closing the through-hole and the head access opening 121*a*. In the lateral surface of the casing 121 carrying the shutter 123 is formed a groove 121*b* extending in the fore-and-aft direction. In the lateral surface of the shutter 123 is formed an engagement opening 123*a*. The shutter is locked by a lock mechanism, not shown, provided in the casing 121, in a state in which the shutter has closed the through-hole and the head access opening 121*a*. In the lower surface of the casing 121 are formed positioning openings, not shown, separated from each other in the fore-and-aft direction.

The center portion of the disc-shaped recording medium 122 is formed with a center opening, on an opening edge of which is fitted a hub formed of a magnetic metal material.

The operation of the disc recording and/or reproducing apparatus 1 is hereinafter explained (see FIGS. 42 to 64).

First, the state prior to the loading of the disc cartridge 120 is explained (see FIGS. 42 to 46).

Figure 42:
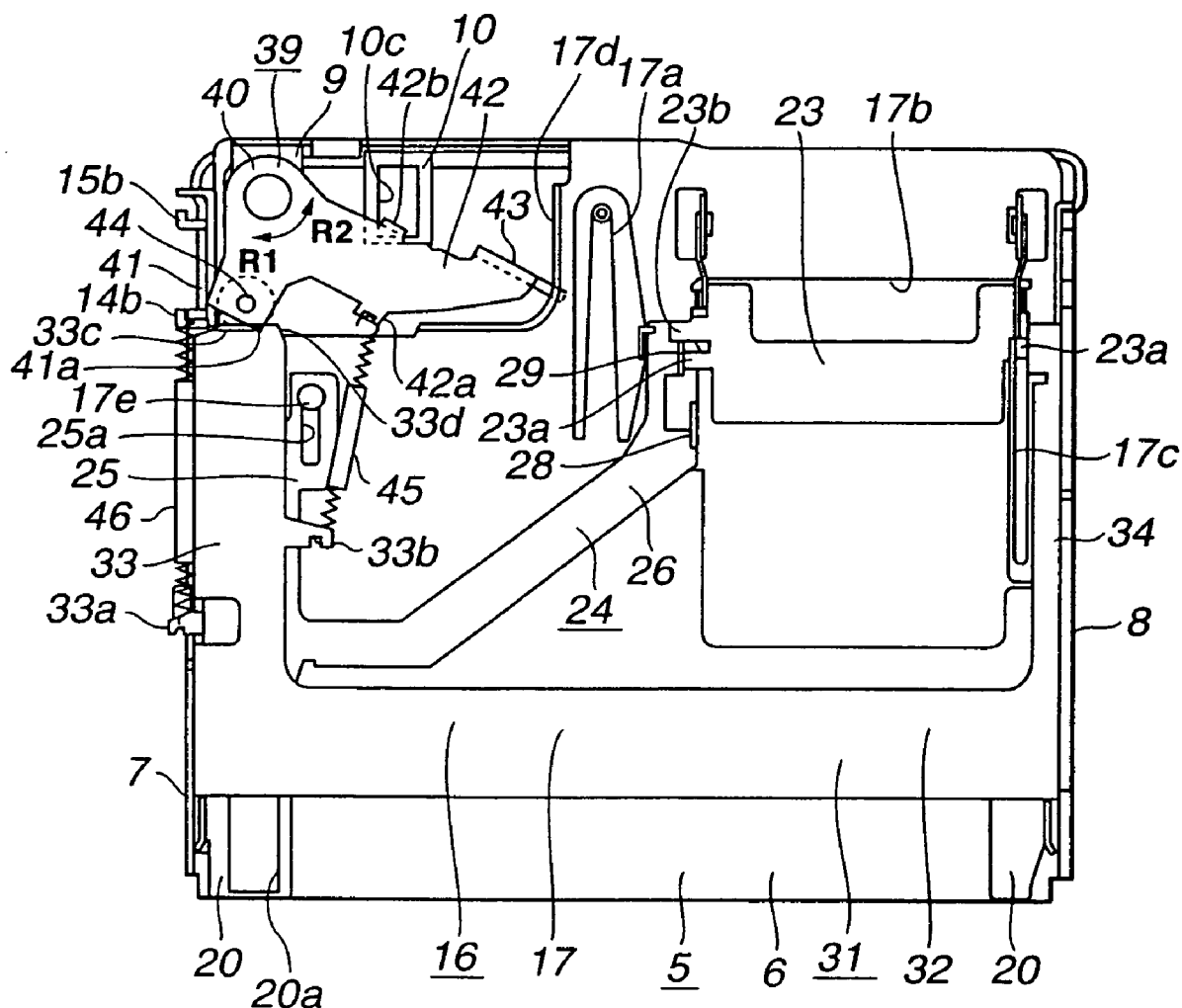
FIG. 42 shows the operation of the disc recording and/or reproducing apparatus and is a plan view showing the initial state prior to operation of respective portions or units.

The ejection lever 39 is positioned at the end of the rotational stroke in the direction indicated by arrow R1 in FIG. 42. The controlled piece 33*c* of the slider 31 is contacted with the control edge 41*a* of the control projection 41, under the force of the spring member 45, for holding the slider 31 at a forward position (see FIG. 42). Thus, the support portions 18*a*, 19*a* and the support pins 18*b*, 19*b* of the holder 16 are engaged in the upper horizontal portions 37*a*, 38*a* of the cam grooves 37, 38 of the slider 31, and hence the holder 16 is held at an upper movement stroke end, that is at a position of inserting or ejecting the disc cartridge 120 (see FIG. 43).

Figure 7:
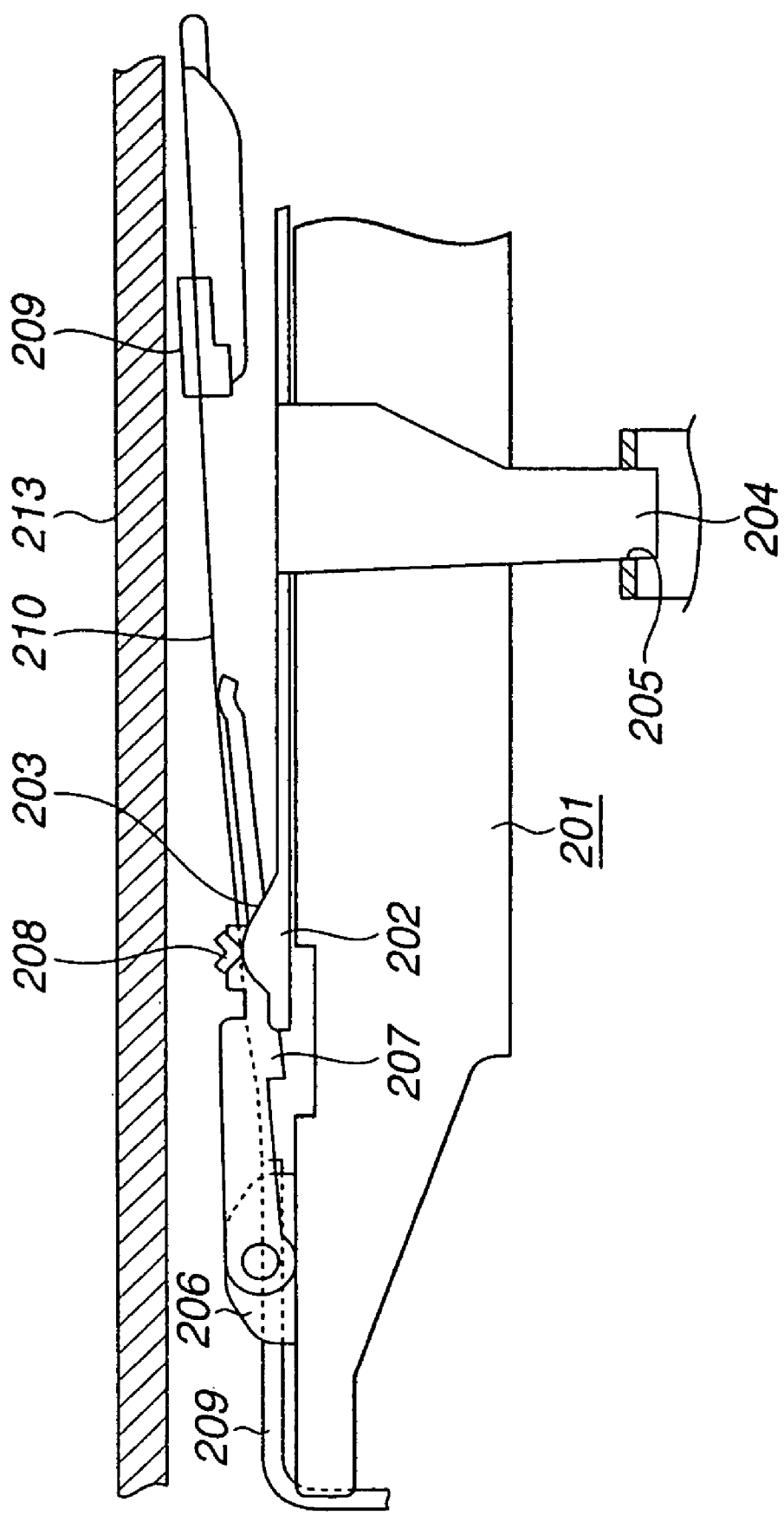
FIG. 7 is a schematic enlarged side view, shown partially in cross-section, and showing the state in which, when the holder is lifted, the magnetic head has been retreated.

The joint lever 47, carried by the side supporting portion 7, is held at the rear stroke end under the force of the tension coil spring 48, as shown in FIG. 7. The switching gear 75, carried by the lower surface of the major surface portion 6 of the chassis 5, is halted in contact with the mating operating portion 66*a* of the rotation detection switch 66, while the driving gear 76 is at a position in which the thrusting boss 76*a* abuts against or in proximity to the thrust piece 69*f* of the limit lever 69, that is at a reference position (see FIG. 38). The limit lever 69 is positioned at the rear stroke end, while the operating lever 71 supported by the limit lever 69 is in such a state in which the controlled edge 71*d* is kept in abutment against the support piece 69*e* of the limit lever 69 (see FIG. 45). Since the limit lever 69 is at the rear stroke end, the driving lever 67, connected to the limit lever 69 through the conversion lever 70, is positioned at the forward stroke end (see FIG. 45).

Figure 43:
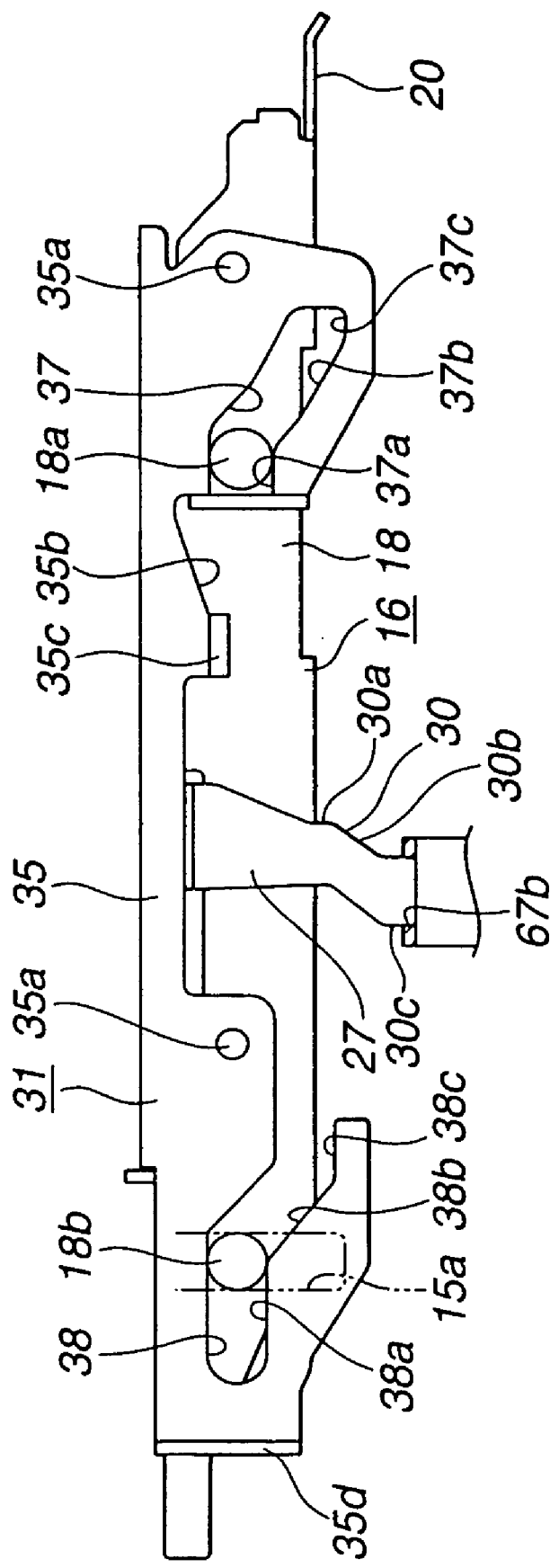
FIG. 43 is a side view showing the initial state prior to operation of respective portions or units, with a joint lever being omitted.
Figure 46:
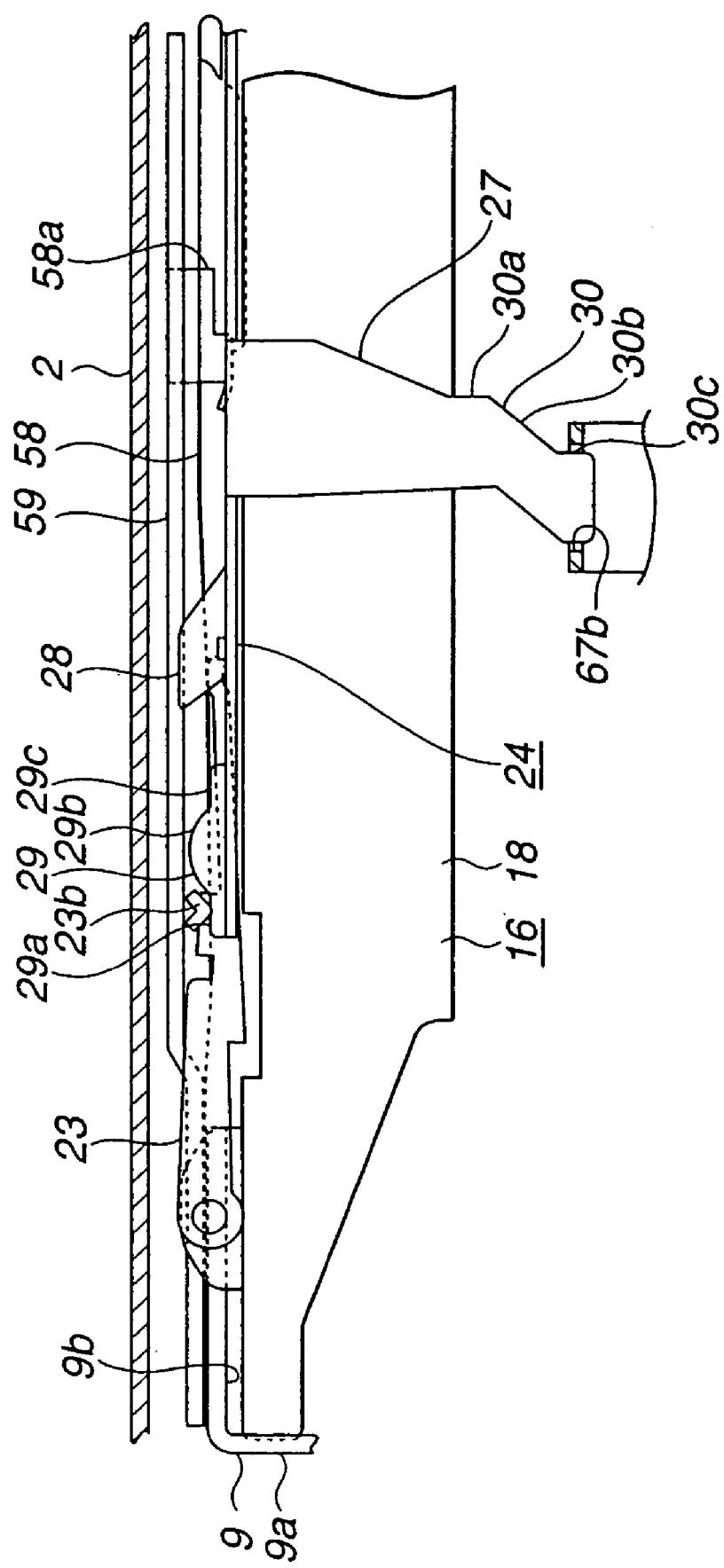
FIG. 46 is a side view, shown partially in cross-section, and showing the initial state prior to operation of the respective portions or units as the position relationships between the cam lever and the magnetic head.

Since the driving lever 67 is at the forward stroke end and the holder 16 is held at the insertion/ejection position, the cam lever 24 has the lower portion 30*c* of the cam leg 27 engaged in the engagement opening 67*b* of the driving lever 67 (see FIGS. 43 and 46). The cam lever 24 is positioned at the forward end of the movement stroke (see FIG. 42). Thus, the head shift lever 23 is kept at a first retreat position in which the mating operating piece 23*b* is engaged in the first cam 29*a* of the cam lever 24, the head mounting arm 58 is substantially at a horizontal position and the magnetic head 58*a* is not collided against the disc cartridge being introduced into the holder 16 (see FIG. 46).

Figure 47:
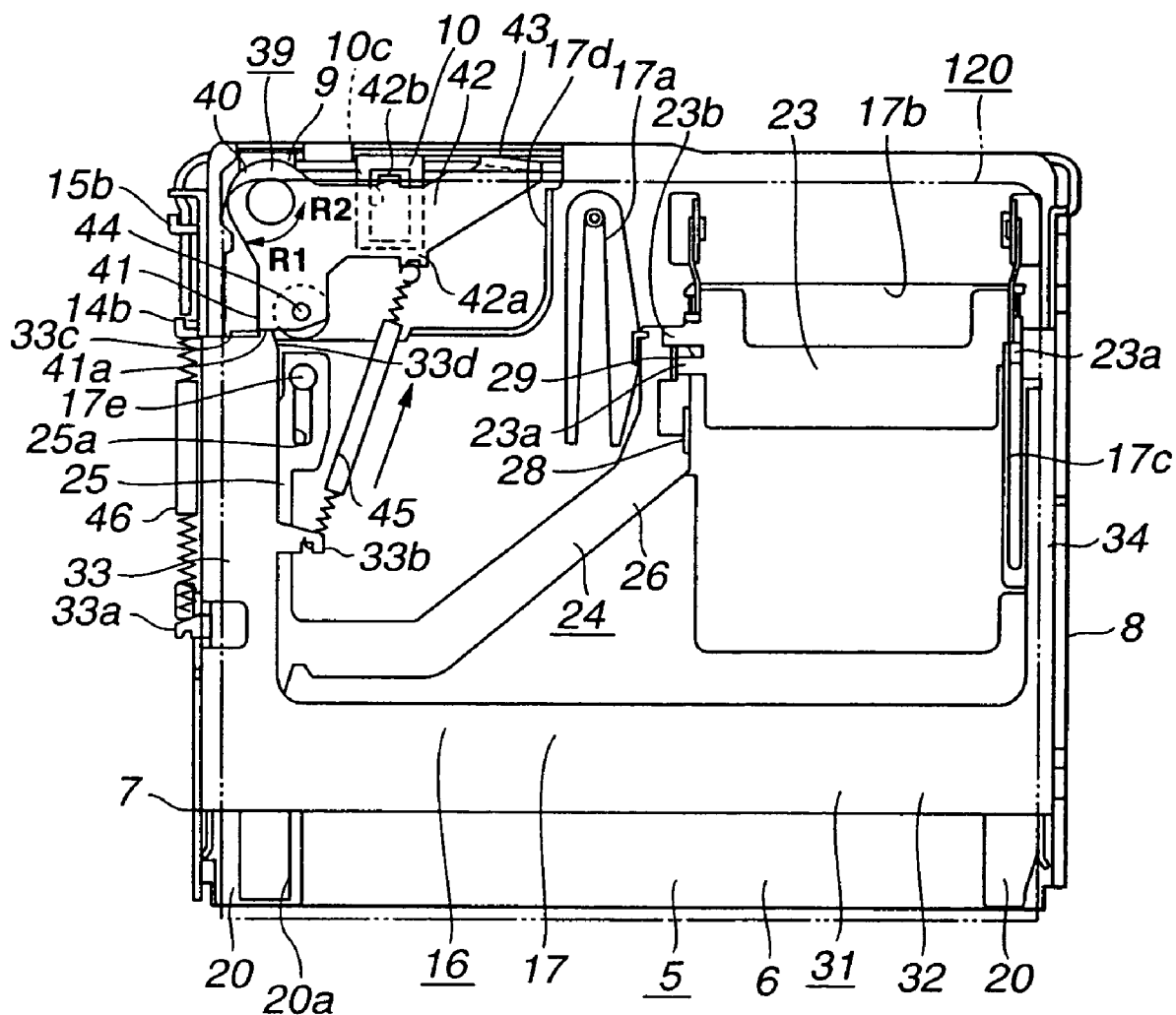
FIG. 47 is a plan view showing the state in which a disc cartridge is being introduced into a cartridge holder.

When the disc cartridge 120 is inserted through the insertion/ejection opening 2*a* of the outer casing 2, the door 3 is rotated, and the disc cartridge 120 is inserted into the holder 16 (see FIG. 47). The operating portion 43 of the ejection lever 39 is thrust towards rear by the inserted disc cartridge 120, so that the ejection lever 39 is rotated in the direction indicated by arrow R2 in FIG. 47 against the force of the spring member 45.

As the disc cartridge 120 is inserted into the holder 16, the lateral side of the casing 121 is brought into sliding contact with the shutter restoration spring 21, provided on the side plate portion 19 of the holder 16, so that the shutter restoration spring 21 is flexed outwards. The unlock piece 22 then is moved forwards in the groove 121*b* of the disc cartridge 120 to unlock the shutter 123. The unlock piece then thrusts the edge of the shutter 123 to cause the sliding of the shutter 123. As the shutter 123 is slid, the holding portion 21*a* of the shutter restoration spring 21 is engaged in the engagement opening 123*a* of the shutter 123 to hold the disc cartridge 120 within the holder 16. As the shutter 123 is slid, the through-hole and the head access opening 121*a* formed in the casing member 121 are opened.

When the disc cartridge is inserted into the holder 16, the retention spring 17*a* provided to the top plate portion 17 of the holder 16 is brought into resilient contact with the casing member 121 of the disc cartridge 120 to hold the casing member 121.

Figure 48:
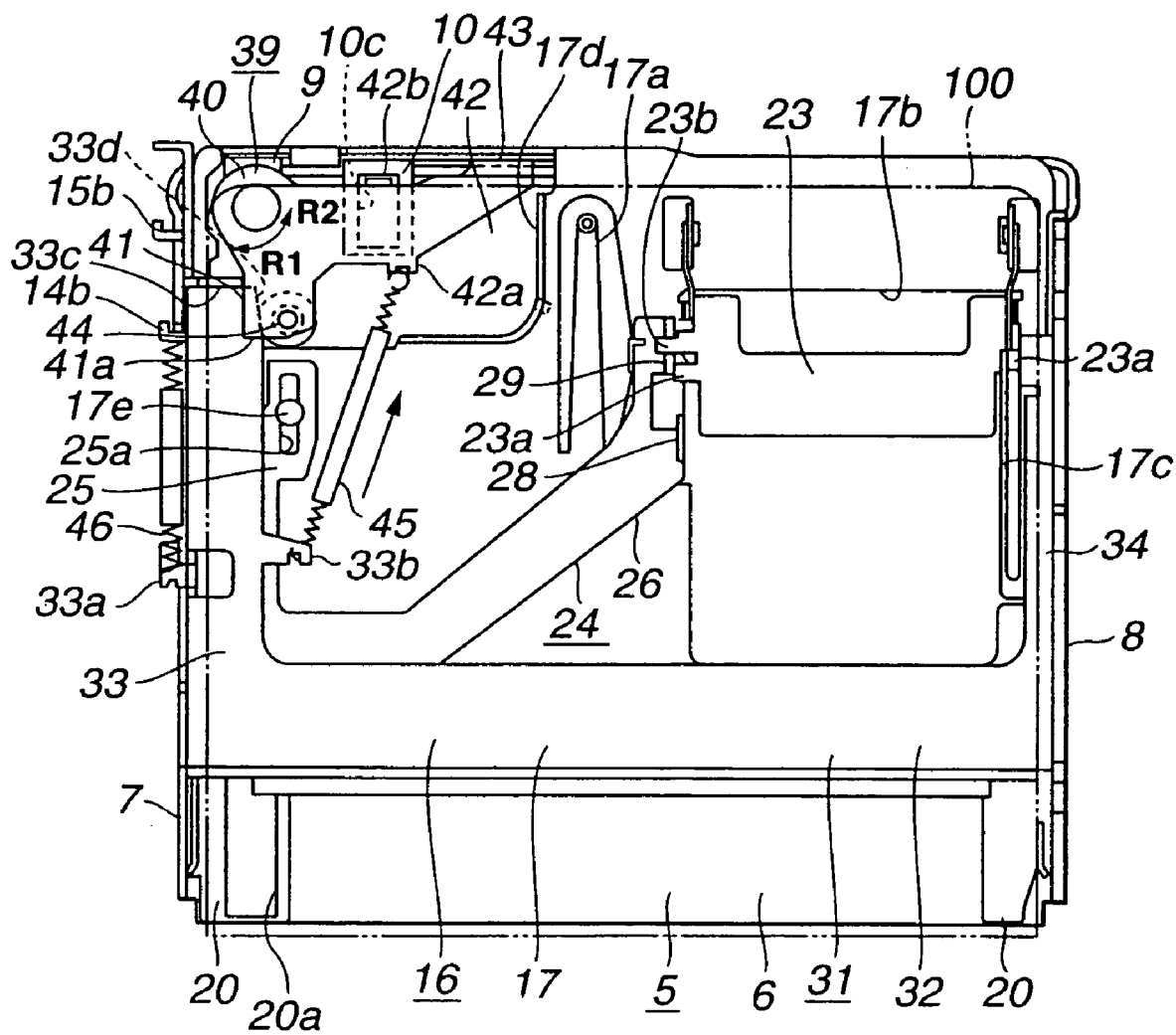
FIG. 48 is a plan view showing the state in which the slider has been moved to the rear end of its movement stroke.

When the ejection lever 39 is rotated in the direction indicated by arrow R2 in FIG. 48 and the control edge 41*a* is disengaged from the controlled piece 33*c* of the slider 31, the slider 31 is moved rearwards under the force of the spring member 45. Since the slider 31 is also pulled rearwards by the auxiliary spring 46, mounted under tension between the spring retention projection 33*a* and the spring retention piece 14*b* of the side supporting portion 7 of the chassis 5, the slider 31 is positively moved to the rear movement stroke end.

When the slider 31 is moved rearwards, the roll 44 supported by the ejection lever 39 rolls on the inclined edge 33*d*, so that the slider 31 is smoothly moved rearwards as shown in FIG. 48.

Although the auxiliary spring 46 is used in the disc recording and/or reproducing apparatus 1 of the present invention, such auxiliary spring 46 may be dispensed with subject to proper adjustment of the force of the spring member 45. As a consequence, only the spring member 45 suffices, and hence the number of components may be reduced.

With the disc recording and/or reproducing apparatus 1 of the present invention, the length of the extended spring member 45 is progressively shortened as the slider 31 is moved rearwards, as described above. Thus, the slider 31 and the ejection lever 39 may be improved in durability, and hence the load on the driving motor 73 in ejecting the disc cartridge 120, as later explained is relieved to lower the power consumption in an amount corresponding to the diminished frictional resistance of the slider 31 and the ejection lever 39. In addition, the spring force of the spring member 45 may be reduced due to reduction in the load.

Figure 49:
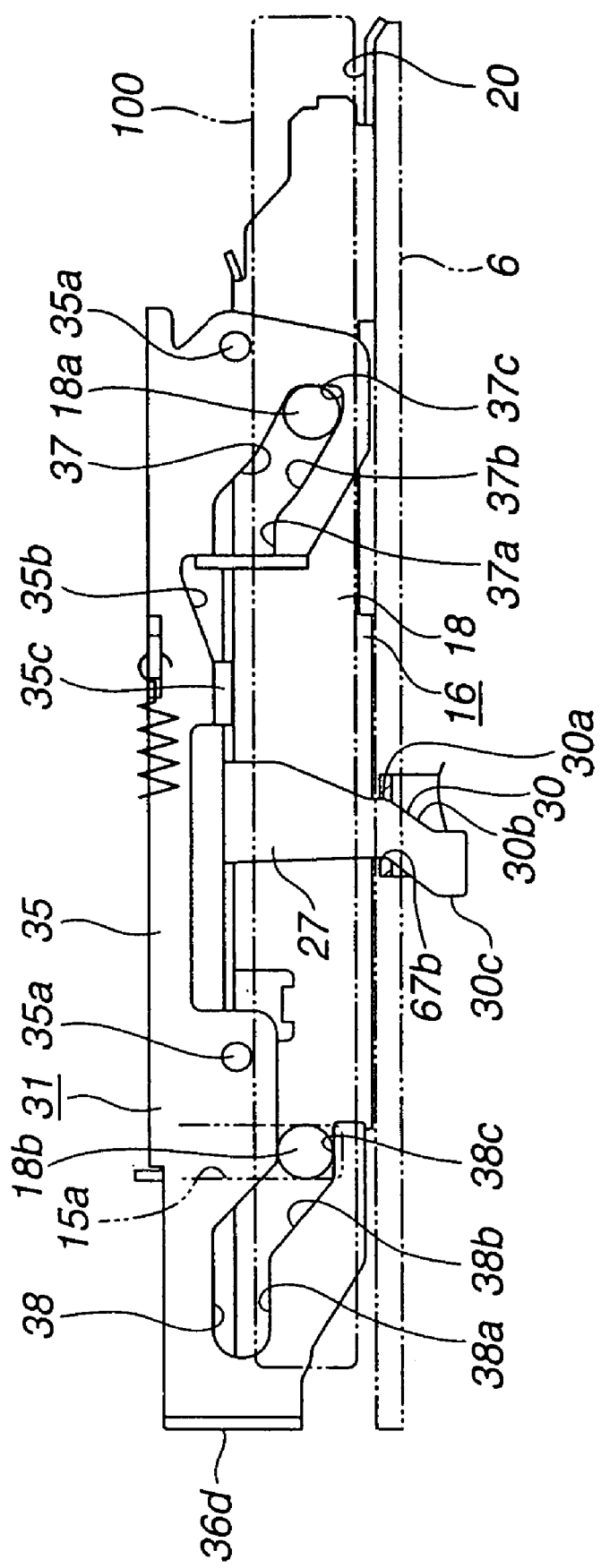
FIG. 49 is a side view showing the state of descent of the holder, with the joint lever being omitted.

As the slider is moved rearwards, the support portions 18a, 19a and the support pins 18b, 19b of the holder 16 perform relative movement from the upper horizontal sections 37a, 38a of the cam grooves 37, 38 and the inclined sections 37b, 38b to the lower horizontal sections 37c, 38c (see FIG. 49). Thus, the holder 16 is moved to the lower end of the movement stroke, as it is guided by the guide grooves 15a, 15a formed in the side supporting portions 7, 8, until the holder gets to the loading position in contact with the major surface portion 6 of the chassis 5. When the holder 16 is moved downwards, the cam lever 24 is also moved downwards, with movement of the holder 16. The cam lever 24, the lower portion 30c of the cam leg 27 of which has been engaged in the engagement groove 67b of the driving lever 67, is moved through the inclined section 30b (see FIG. 50) until the upper side section 30a is engaged in the engagement groove 67b, with the cam lever 24 being moved slightly rearwards relative to the holder 16 (see FIGS. 41 to 44). The result is that the head shift lever 23 has its mating operating piece 23b engaged in the second cam portion 29b of the cam lever 24, so that the head shift lever is raised in its forward portion (see FIG. 51). Since the holder 16 has been lowered, the head mounting arm 58 has its forward portion lowered. However, the head shift lever 23 has its forward portion elevated, and hence the magnetic head 58a is kept at the second retreat position directly overlying the top plate portion 17 of the holder 16 and is not introduced into the head inserting opening 17b. In terms of the relative position of the holder 16 relative to the top plate portion 17, this second retreat position is substantially the same as the aforementioned first retreat position.

When the holder 16 gets to the loading position corresponding to the lower end of its movement stroke, the disc table 49 is inserted via an insertion opening of the casing member 121 of the disc cartridge 120, held by the holder 16, so that the centering boss 49a of the disc table 49 is introduced into the center opening of the disc-shaped recording medium 122, while the hub of the disc-shaped recording medium 122 is sucked by a magnet provided on the centering boss 49a, whereby the disc-shaped recording medium 122 is loaded on the disc table 49.

When the holder 16 is moved downwards, the operating shafts 64, 64, 64 of the disc detection switches 61, 61, 61 are thrust and actuated by the casing member 101 of the disc cartridge 120 for use for write protect detection, AD/MD-DATA2 (trademark) detection and disc reflectance detection, that is for detection whether the disc is a ROM (optical disc carrying information signals as pits) or a RAM (magneto-optical disc). A loading detection switch for detecting whether the disc-shaped recording medium 122 has been loaded on the disc table 49 is provided as a separate unit, even though such loading detection switch is not shown. Alternatively, the disc detection switch 61 may be used to detect that the disc-shaped recording medium 122 has been loaded on the disc table 49.

When the disc-shaped recording medium 122 has been loaded on the disc table 49, the inner edge of the disc-shaped recording medium 122 is set on the table portion 49b, while the disc-shaped recording medium 122 is positioned at a location slightly above the inner lower surface of the casing member 121.

When the disc-shaped recording medium 122 has been loaded on the disc table 49, the positioning projections 11a, 1a of the positioning pins 11, 11 provided on the major surface portion 6 of the chassis 5 are introduced into the positioning openings of the casing member 121 for positioning the disc cartridge 120 relative to the chassis 5. When the disc cartridge 100 has been positioned relative to the chassis 5, the casing member 121 is set on the support portion 11a of the positioning pin 11 and on the receptacle 12 (see FIG. 52). The retainer 77b of the spring plate member 77, mounted on the lower surface of the major surface portion 6, is brought into resilient contact with the shutter 123 of the disc cartridge 120 at this time from the lower side (see FIG. 52). Consequently, the vibrations of the shutter 123 during the reproduction and recording of the disc-shaped recording medium 122 can be suppressed to assure optimum reproducing and recording operations.

Since the spring plate member 77 for suppressing the vibrations of the shutter 123 is mounted on the chassis 5 arranged within the outer casing 2, the vibrations otherwise transmitted from outside to the disc recording and/or reproducing apparatus 1 can scarcely be transmitted through the spring plate member 77 to the shutter 123 to suppress the vibrations efficiently and sufficiently.

Moreover, since the spring plate member 77, having its one end 77a mounted on the major surface portion 6 of the chassis 5, is used as retention means for holding the shutter 123 to suppress its vibrations, the vibrations to the shutter 123 may be effectively prohibited by a simplified structure, such that provision of retention means does not raise the cost.

In the foregoing description, the spring plate member 77 is used as retention means. Alternatively, the disc detection switch 61 may also be used as retention means in place of the spring plate member 77 (see FIG. 53). In this case, the disc detection switch 61 is arranged on the circuit board 60 at such a position that the mating operating shaft 64 is projected upwards from the retention unit mounting opening 6c formed in the major surface portion 6, in place of arranging the disc detection switch 61 provided at the left end of the circuit board 60.

When the holder 16 is lowered, the mating operating shaft 64 is brought into resilient abutting contact from below against the shutter 123 of the disc cartridge 120, under the spring force of the compression coil spring 65, to suppress the vibrations of the shutter 123. At the same time, the loading of the disc-shaped recording medium 22 on the disc table 49 is detected by the operation on the mating operating shaft 64. Thus, if the disc detection switch 61 is used as retention means, suppression of vibrations of the shutter 123 and the above detection can be achieved simultaneously, so that there is no necessity of providing dedicated retention means in addition to the disc detection switch 61, thus achieving reduction in the number of component parts and in cost.

As the retention means, the spring plate member 77 and the disc detection switch 61 may be used in combination.

If, when the holder 16 carrying the disc cartridge 120 is lowered and the disc-shaped recording medium 122 has been loaded on the disc table 49, a replay button (operating button) 4, provided on the outer casing 2, is actuated, the disc table 49 and hence the disc-shaped recording medium 122 are run in rotation by the driving of the spindle motor, while the optical pickup 50 is guided by the guide shafts 53, 54 by the driving of the feed motor 56 and hence is moved radially of the disc-shaped recording medium 122. At this time, a laser light beam is illuminated from the objective lens 52a of the biaxial actuator 52 of the optical pickup 50 through the through-hole of the casing member 121 to the disc-shaped recording medium 122 to reproduce information signals.

If a stop button (operating button) 4 is actuated, the rotation of the disc table 49 is halted, while the optical pickup 50 ceases to be operated to stop the reproduction of the information signals.

If, as the holder 16 carrying the disc cartridge 120 is lowered so that the disc-shaped recording medium 122 is loaded on the disc table 49, a recording button (operating button) 4 provided on the outer casing 2 is actuated, so that the driving motor 73 and hence the gear set 74 are run in rotation in one direction. When the gear set 74 is run in rotation, the switching gear 75 is run in rotation, so that the driving gear 76 meshing with the switching gear is run in rotation in one direction, with the consequence that the thrusting boss 76a of the g76 thrusts the thrust edge 71e of the operating lever 71 forwards (see FIG. 54).

Figure 54:
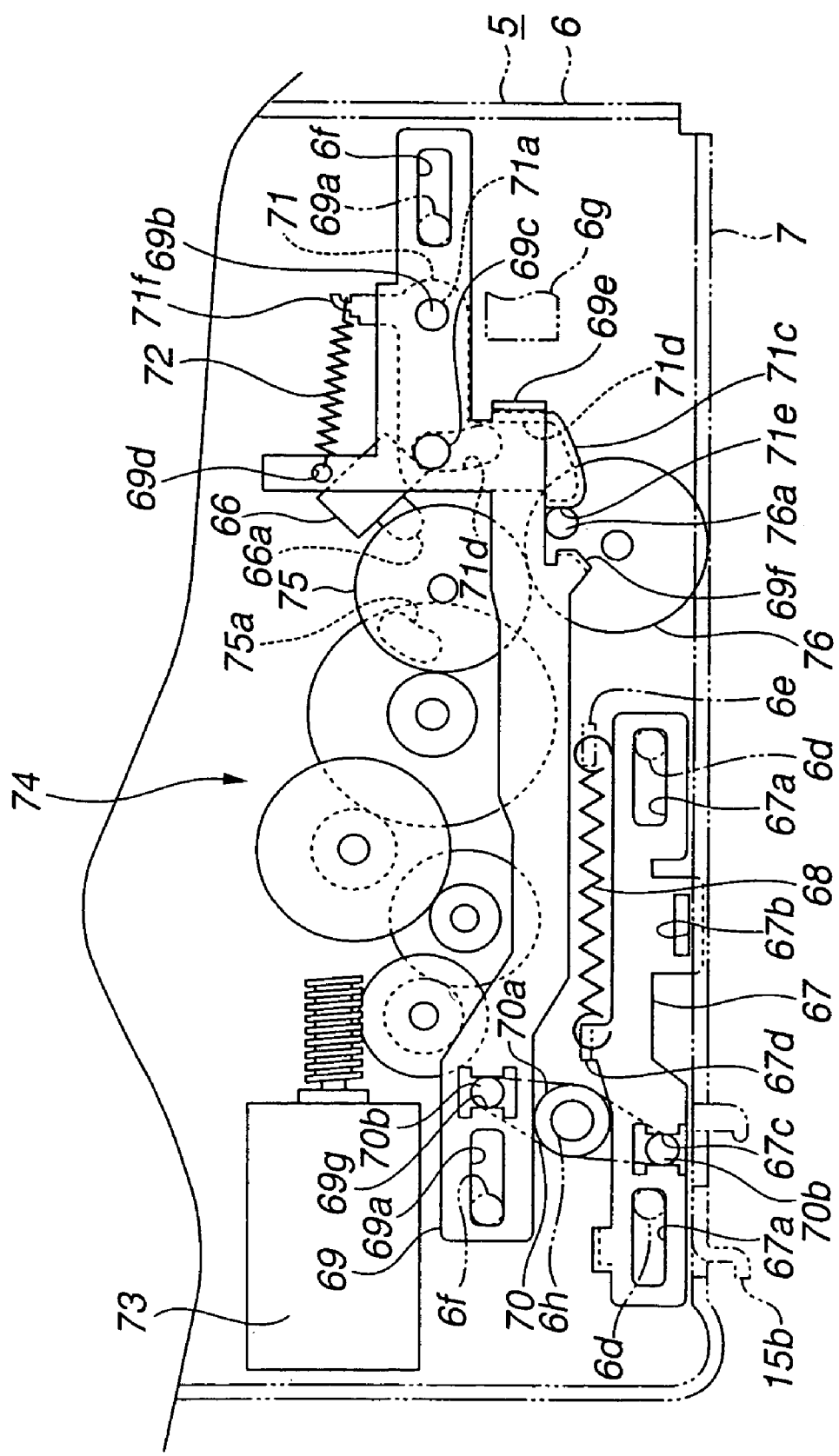
FIG. 54 is a plan view showing, of the constituent elements supported by the lower surface of the chassis, the state in which a driving gear has been rotated in a first direction and the limit lever has been moved to the forward side end of the movement stroke, while the driving lever has been moved to the rear movement stroke end.

When the thrust edge 71e of the operating lever 71 is thrust, since the controlled edge 71d is contacted with the support piece 69e of the limit lever 69, positioned at the rear end of the movement stroke, the support piece 69e is thrust forwards by the controlled edge 71d to cause forward movement of the limit lever 69 (see FIG. 54). When the limit lever 69 is moved forwards, the driving lever 67, positioned at the forward end of the movement stroke, is moved rearwards by the rotational movement of the conversion lever 70 (see FIG. 54). By the rearward movement of the driving lever 67, the cam lever 24, the upper side portion 30a of which is engaged in the engagement opening 67b, is moved towards rear with respect to the holder 16 (see FIG. 55).

The limit lever 69, moved forwards, is moved to the forward end of its movement stroke, as a result of the contact of the support piece 69e with the stop edge 6g formed on the major surface portion 6. At this time, the rotation of the driving motor 73 ceases, so that the driving lever 67 is halted at the rear end of its movement stroke (see FIG. 54). When the driving lever 67 is halted at the rear end of its movement stroke, the cam portion 30 of the cam lever 24 has been moved to a point at back of the mating operating piece 23b of the head shift lever 23, such that the head shift lever 23 is held at the lower end of its rotational movement, with the controlling piece 23a in contact with the opening edge of the head inserting opening 17b of the holder 16. Consequently, the head mounting arm 58 is inclined so that its forward end is lowered (see FIG. 55). The magnetic head 58a is introduced into the holder 16 through the head inserting opening 17b into contact with the disc-shaped recording medium 122 through the head access opening 121a formed in the casing member 121 of the disc cartridge 120. One of the rotation controlling pieces 23a of the head shift lever 23 is positioned below the retention piece 28 of the cam lever 24 and is retained by the retention piece 28.

With continued driving of the spindle motor, the disc table 49 is run in rotation, while the optical pickup 50 is guided by the guide shafts 53, 54, by the driving of the feed motor 56, so as to be moved radially of the disc-shaped recording medium 102. At this time, a laser light beam is illuminated from the objective lens 52a of the biaxial actuator 52 of the optical pickup 50 through the through-hole of the casing member 121 to the disc-shaped recording medium 122, at the same time as a magnetic field is applied through the magnetic head 58a to the disc-shaped recording medium 122, to record information signals.

If a stop button (operating button) 4, among the operating buttons 4, is actuated, the driving motor 73 is rotated in an opposite direction to that in the previous operation to run the gear set 74 and the switching gear 75 into rotation. The driving gear 76 is run in rotation in a second direction so that the thrust piece 69f of the limit lever 69 is thrust rearwards by the thrusting boss 76a of the driving gear 76 (see FIG. 56). When the thrust piece 69f of the limit lever 69 is thrust, the limit lever 69 and the operating lever 71 are moved rearwards in unison, while the driving lever 67, located at the rear end of the movement stroke, is moved forwards by the rotational movement of the conversion lever 70 (see FIG. 56). By the forward movement of the driving lever 67, the cam lever 24, the upper side portion 30a of which is engaged in the engagement opening 67b, is moved forwards relative to the holder 16.

When the mating operating portion 66a of the rotation detection switch 66 is actuated by the operating boss 75a of the switching gear 75, a stop signal is input to the driving motor 73, so that the operation of the driving motor 73 ceases. The limit lever 69 is halted when it has been moved to the rear end of the movement stroke, while the driving lever 67 is halted at the forward end of its movement stroke (see FIG. 56). The driving gear 76 is reverted to its reference position.

Figure 50:
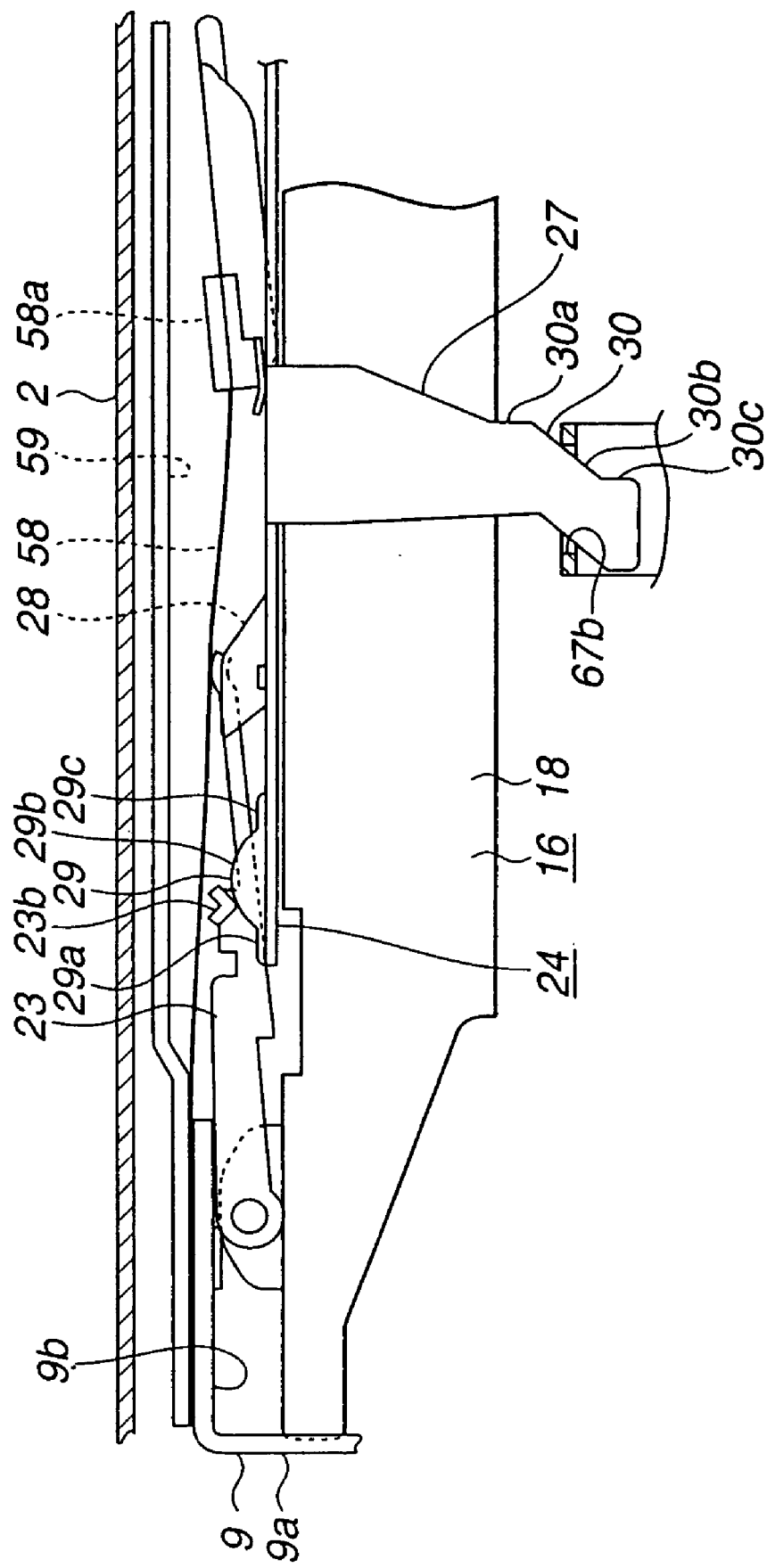
FIG. 50 is a side view, shown partially in cross-section, and showing the state in which a disc cartridge has been introduced into the cartridge holder and the holder is being lowered, as the position relationships between the cam lever and the magnetic head.
Figure 51:
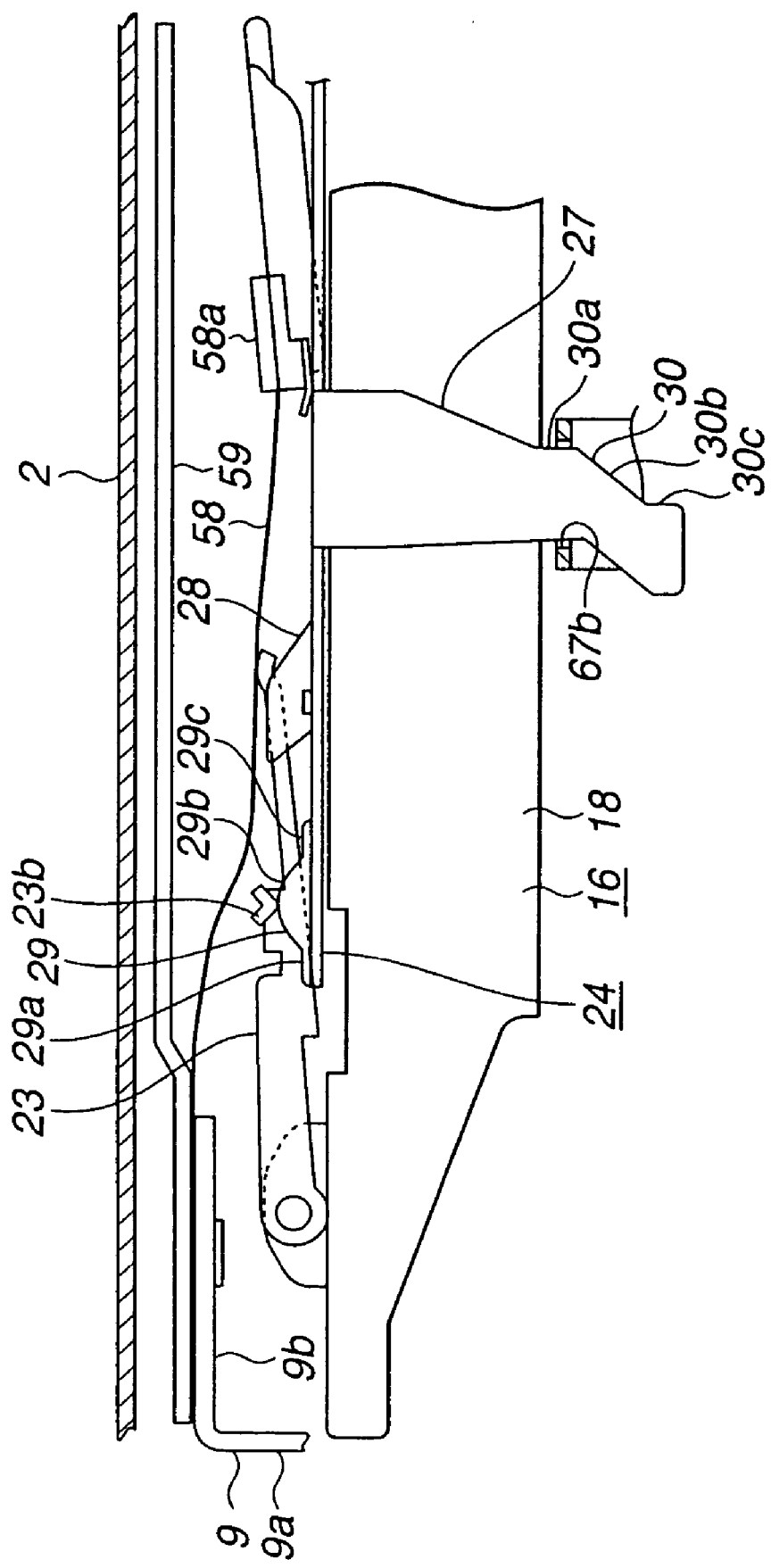
FIG. 51 is a side view, shown partially in cross-section, and showing the state of completion of descent of the holder, as the position relationships between the cam lever and the magnetic head.
Figure 52:
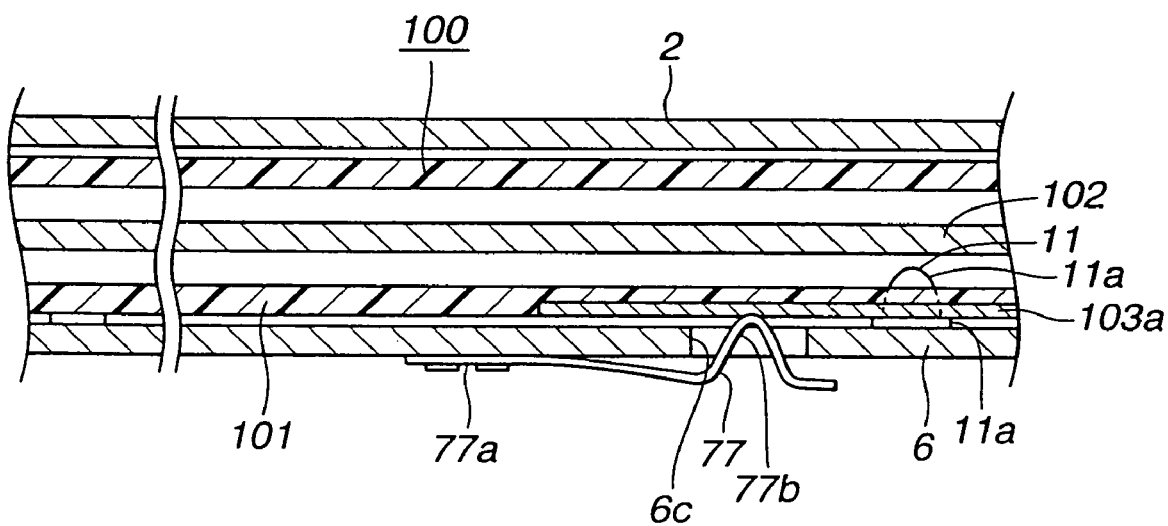
FIG. 52 is a cross-sectional view showing the state in which a spring plate member used as retention means has been resiliently contacted by a shutter.
Figure 53:
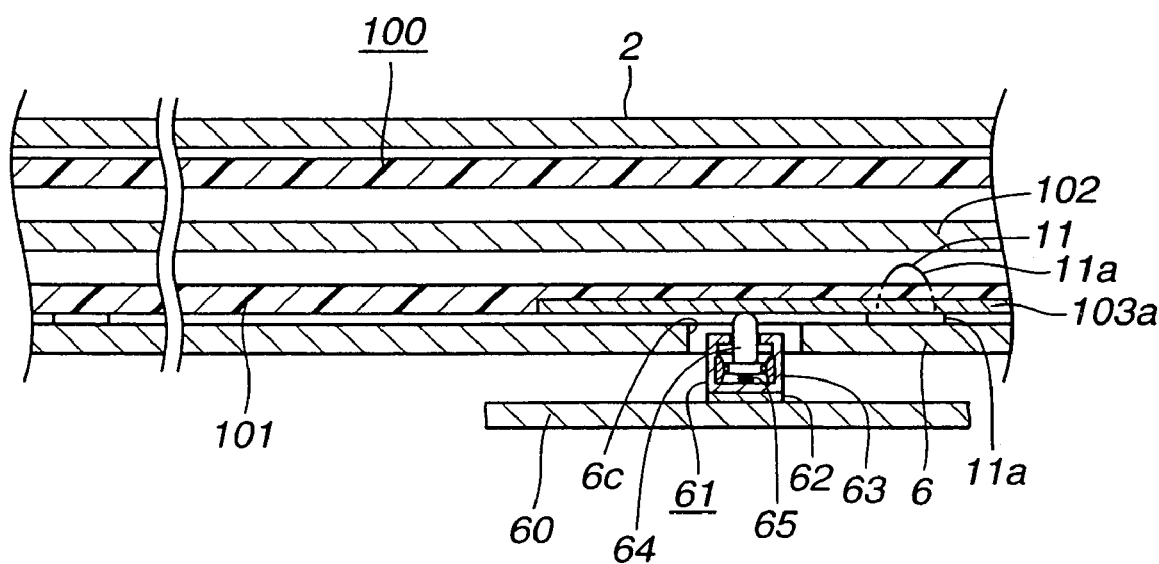
FIG. 53 is a cross-sectional view showing the state in which a mating operating shaft of a disc detection switch used as retention means has been resiliently contacted by the shutter.

When the driving lever 67 is halted at the forward movement stroke end, the mating operating piece 23b of the head shift lever 23 is engaged with the second cam portion 29b of the cam lever 24, the magnetic head 58a is moved upwards from the head inserting opening 17b of the holder 16, and the magnetic head 58a is kept at the second retreat position directly overlying the top plate portion 17 of the holder 16 (see FIG. 50). Simultaneously, the rotation of the disc table 49 is halted to terminate the operation of recording the information signals.

Figure 57:
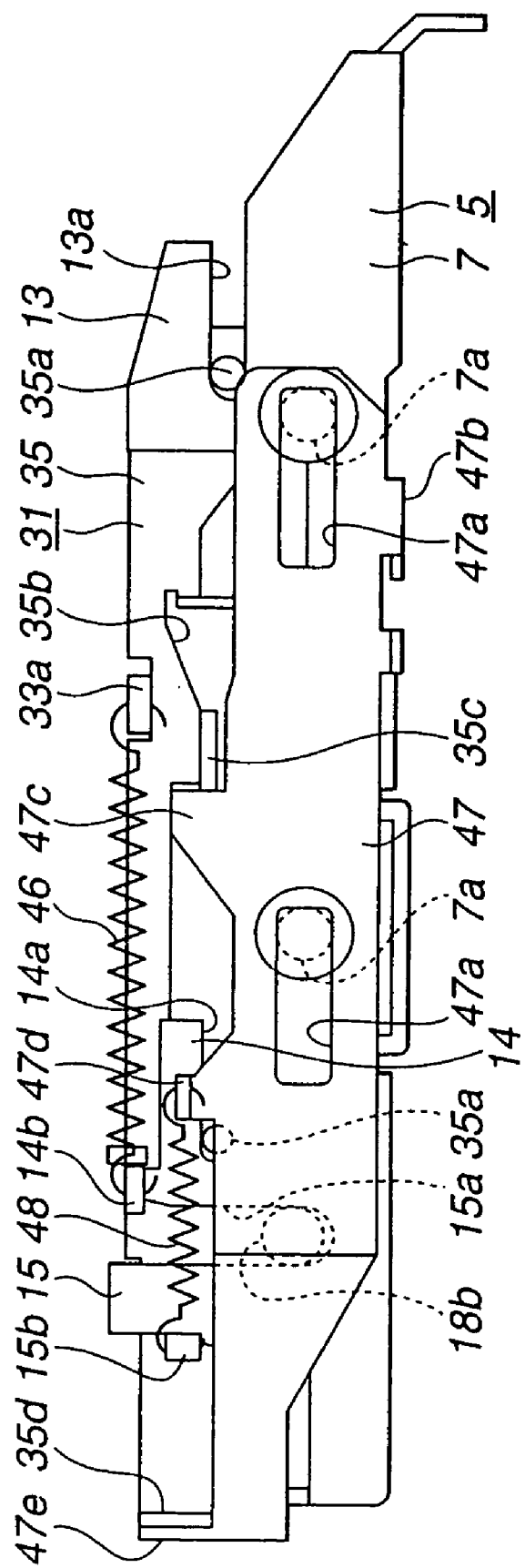
FIG. 57 is a side view showing the state in which, when the driving gear has been rotated in the second direction, the joint lever is positioned at the rear stroke end.
Figure 58:
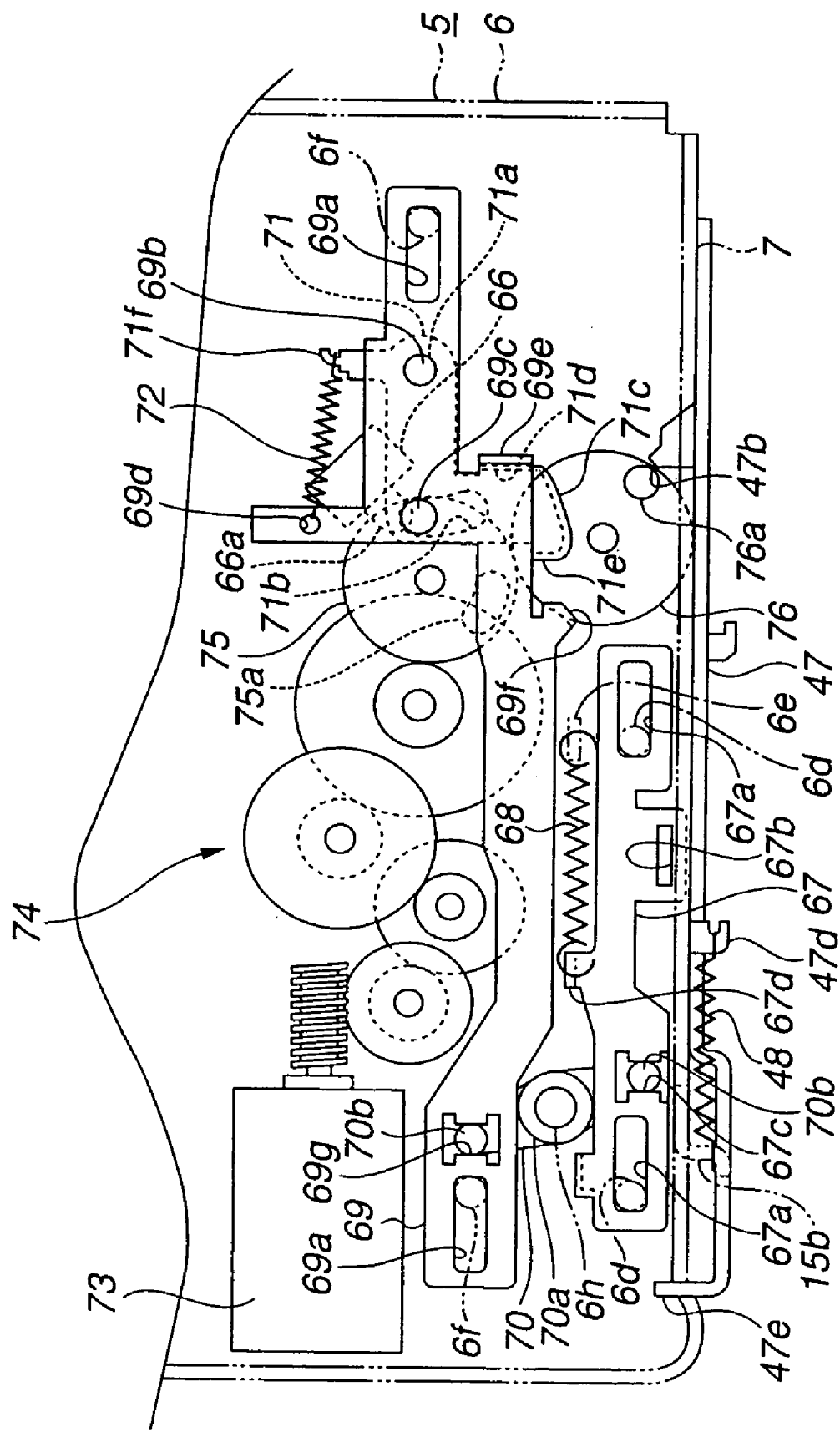
FIG. 58 is a plan view showing, of the constituent elements carried by the lower chassis surface, the state in which the driving gear has been rotated in the second direction and the joint lever has been moved forwards.

When the stop button (operating button) 4 is operated to terminate the reproducing or recording operation, as described above, the driving lever 67 is positioned at the forward movement stroke end, while the limit lever 69 is located at the rear movement stroke end (see FIG. 56) and the joint lever 47 is at the rear movement stroke end (see FIG. 57).

If, when the reproducing or recording operation is finished, the ejection button, as one of the operating buttons 4, is actuated, the driving motor 73 is rotated in the opposite direction. When the driving motor 73 is rotated in the opposite direction, the driving gear 76 is rotated in the second direction, and the mating operating piece 47b of the joint lever 47 is thrust forwards, with the joint lever 47 being then moved forwards against the bias of the tension coil spring 48 (see FIG. 58).

Figure 59:
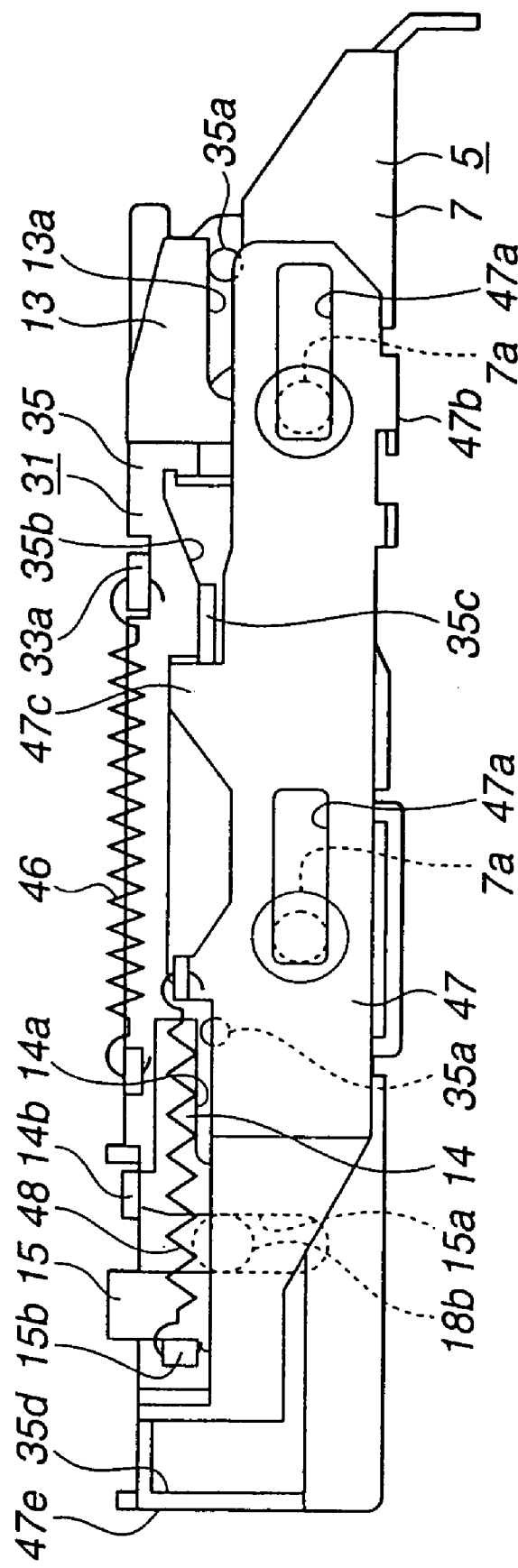
FIG. 59 is a side view showing the state in which the driving gear has been rotated in the second direction and the joint lever has been moved to the forward movement stroke end.
Figure 60:
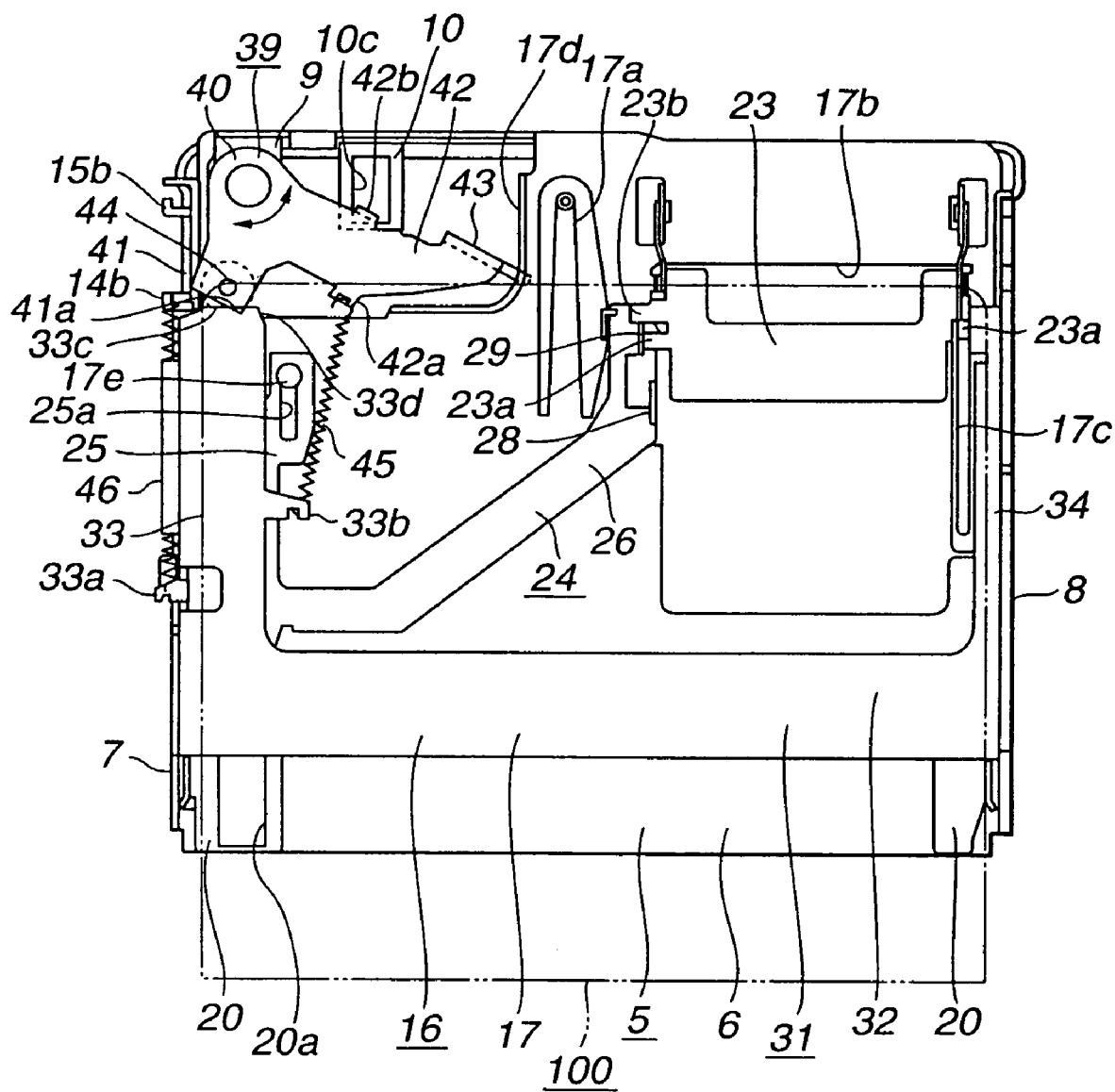
FIG. 60 is a plan view showing the state in which the disc cartridge has been ejected from the holder and in which the slider has been moved forwards.

When the joint lever 47 is moved forwards, the thrust piece 35c of the slider 31 is thrust forwards by a thrusting piece 47c, with the slider 31 being moved forwards (see FIG. 59). When the slider 31 is moved forwards, the support portions 18a, 19a and the support pins 18b, 19b of the holder 16 perform relative movement from the lower horizontal portions 37c, 38c of the cam grooves 37, 38 through the inclined portions 37b, 38b to the upper horizontal portions 37a, 38a (see FIG. 43). Consequently, since the support pins 18b, 19b of the holder 16 guided by the guide groove 15a formed in the side supporting portions 7, 8 of the chassis 5 are elevated, while the disc cartridge 120 held by the holder 16 is elevated along with the holder 16, the disc-shaped recording medium 122 is unloaded from the disc table 49.

When the holder 16 is elevated with the forward movement of the slider 31, the cam lever 24, the upper side portion 30a of which has been engaged in the engagement opening 67b of the of the driving lever 67, has the lower side portion 30c engaged in the engagement opening 67b. The cam lever 24 is moved forwards relative to the holder 16 a distance equal to the distance between the upper side portion 30a and the lower side portion 30c in the fore-and-aft direction. Consequently, the head shift lever 23 has the mating operating piece 23b engaged in the first cam portion 29a of the cam lever 24, with the head mounting arm 58 being substantially in the horizontal position (see FIG. 46). With forward movement of the slider 31, the spring member 45 is extended to increase the biasing force of the ejection lever 39 in the direction indicated by arrow R1 in FIG. 46. When the ejection lever 39 is rotated clockwise, as the roll 44 rolls on the inclined edge 33d of the slider 31, and the control edge 41a is spaced apart from the controlled piece 33c, the ejection lever 39 is rotated significantly clockwise under the force of the spring member 45, such that the ejection lever 39 is rotated in the direction indicated by arrow R1 in FIG. 60 until the insertion piece 42b is brought into contact with the forward opening edge of the control opening 10c of the lever supporting portion 9 provided to the chassis 5. At this time, the holder 16 has been rotated to the insertion/ejection position. When the ejection lever 39 is rotated in the direction indicated by arrow R1 in FIG. 60, the casing member 21 of the disc cartridge 120 is thrust forwards by the operating portion 43, so that a portion of the disc cartridge 100 is ejected from the holder 16.

When the disc cartridge 120 is ejected from the holder 16, the holder 21a of the shutter restoration spring 21 is engaged in the engagement opening 123a of the shutter 123, so that the shutter 123 is slid to stop up the through-hole and the head access opening 121a formed in the casing member 121. The through-hole and the head access opening 121a are closed.

Figure 61:
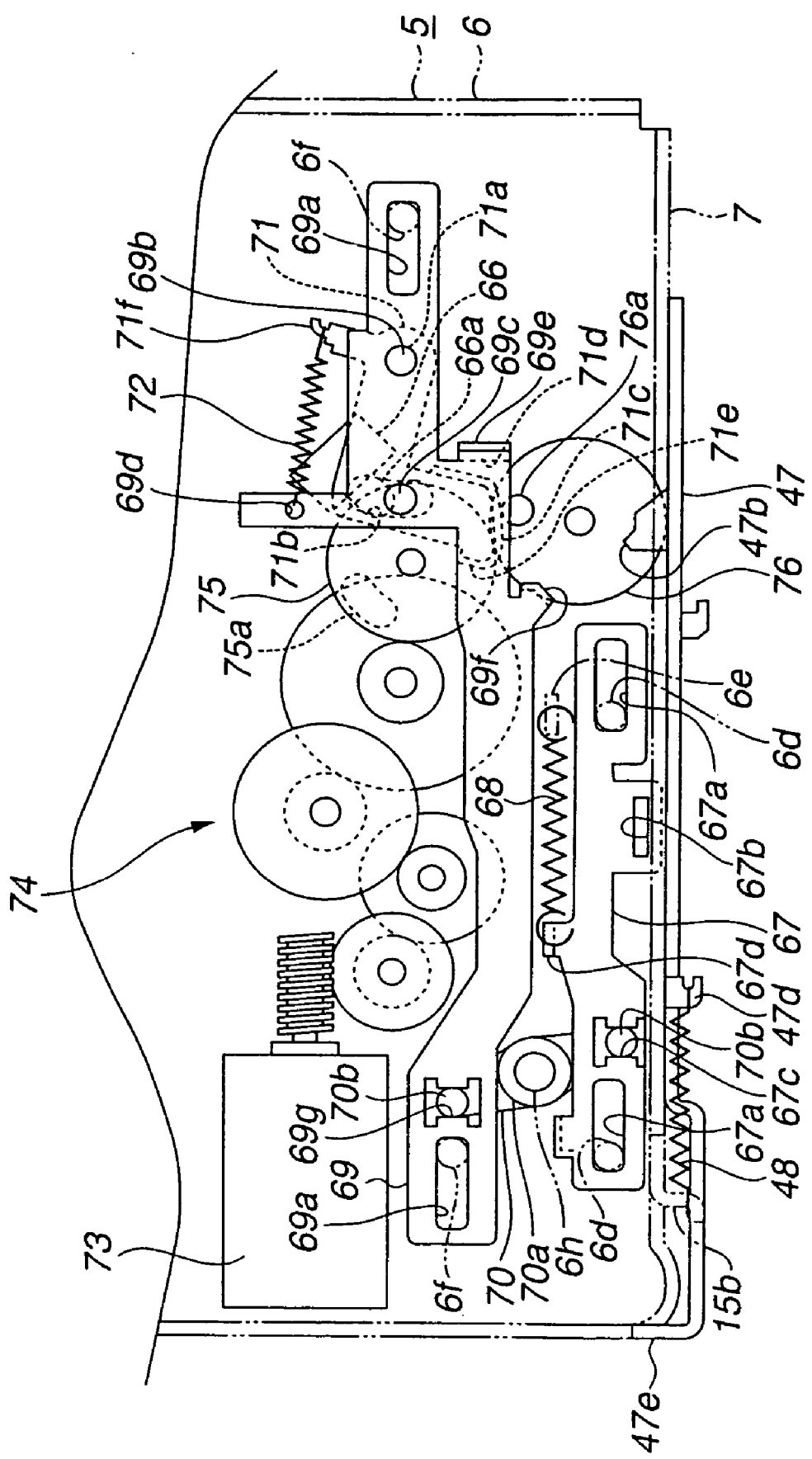
FIG. 61 is a plan view showing, of the constituent elements carried by the lower chassis surface, the state in which the driving gear has been rotated in the second direction and the thrusting lug has a sliding contact with a mating operating edge, with the operating lever having been rotated.
Figure 62:
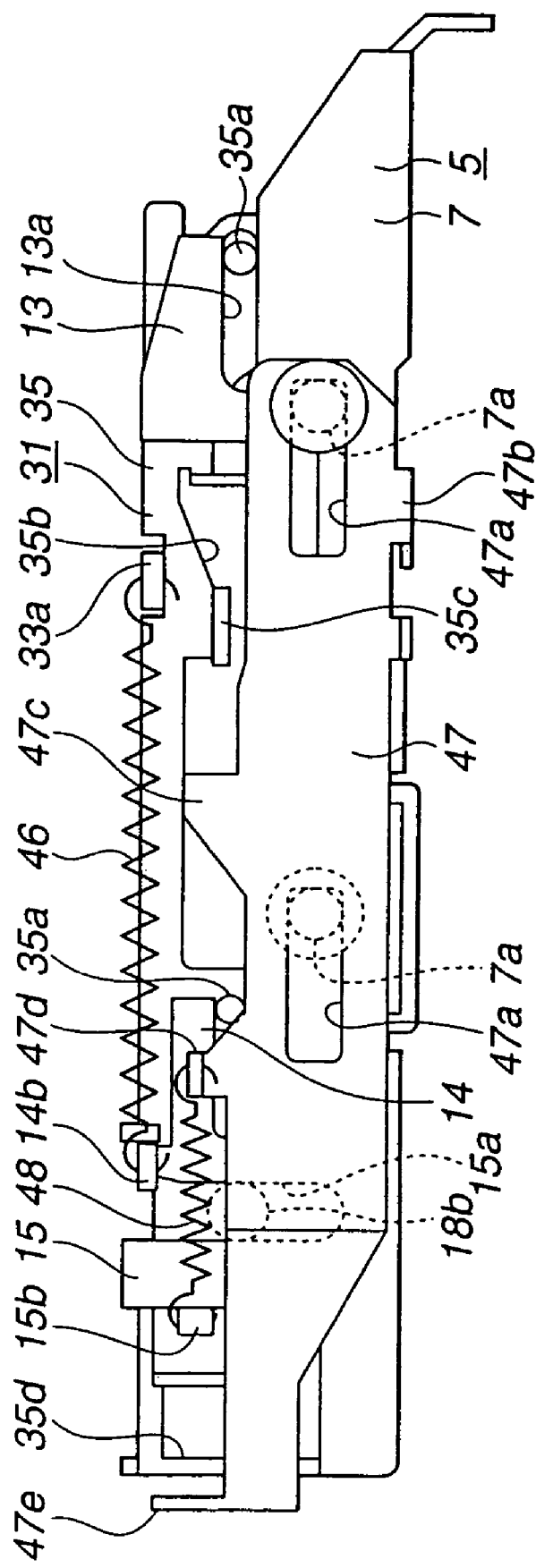
FIG. 62 is a side view showing the state in which the thrusting lug of the driving gear is disengaged from the mating operating piece of the joint lever, with the joint lever having been moved to the rear movement stroke end.
Figure 63:
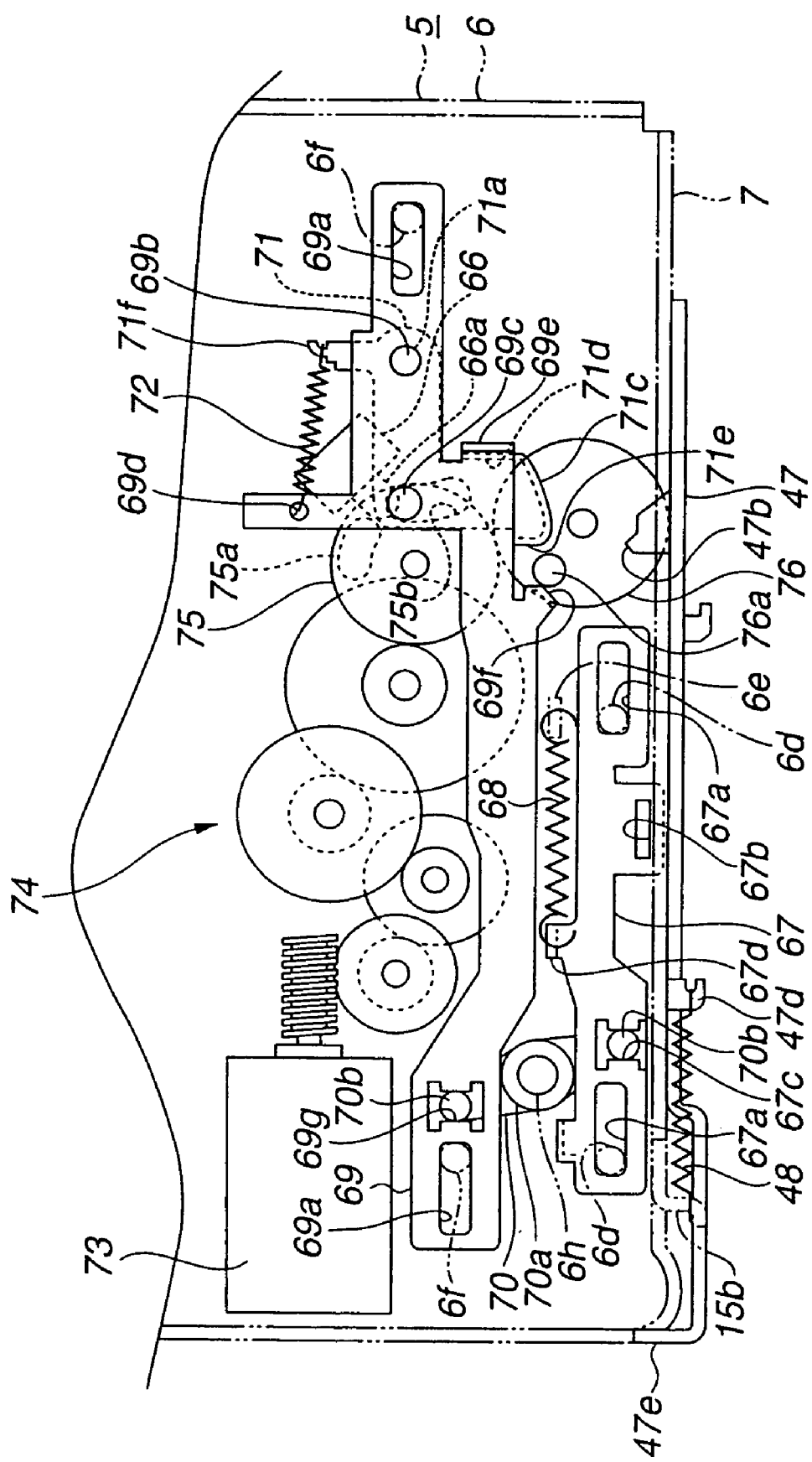
FIG. 63 is an enlarged plan view showing, of the constituent elements carried by the lower chassis surface, the state in which the detection by a rotation detection switch has been made and the rotation of the driving motor ceases.
Figure 64:
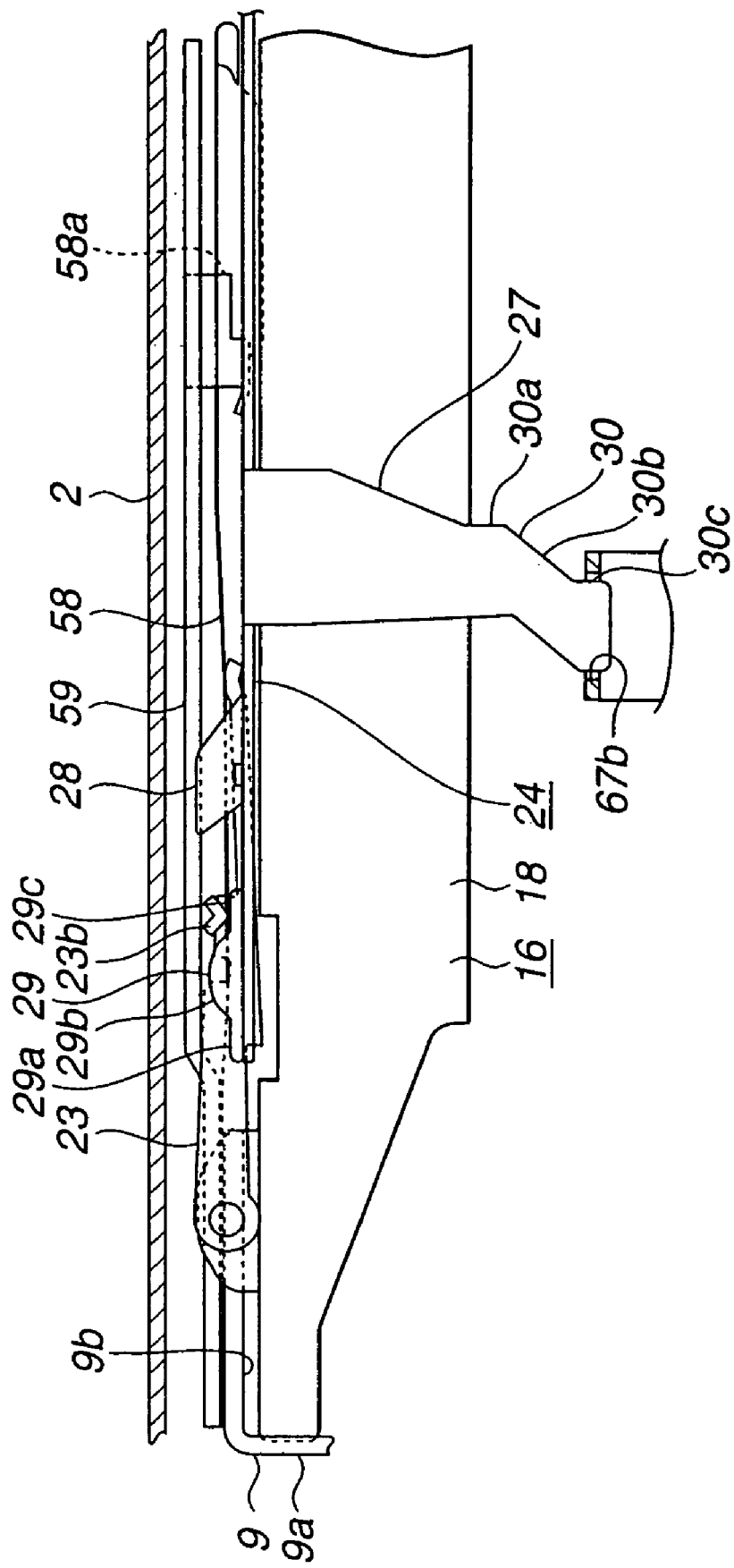
FIG. 64 is an enlarged side view, partially shown in section, and showing the state in which manual ejection has been performed in the recording mode, as the as the position relationships between the cam lever and the magnetic head.

The driving gear 76 continues to be rotated and the thrusting boss 76a is disengaged from the mating operating piece 47b of the joint lever 47 into engagement with the mating operating edge 71c of the operating lever 71 (see FIG. 61). Since the mating operating piece 47b of the joint lever 47 is disengaged from the thrusting boss 76a, the joint lever 47 is moved to the rear movement stroke end under the bias of the tension coil spring 48 (see FIG. 62).

When the thrusting boss 76a of the driving gear 76 is engaged with the operated edge 71c of the operating lever 71, the operating lever 71 is rotated, with rotation of the driving gear 76, against the bias of the tension spring 72, such that the thrusting boss 76a is bought int sliding contact with the mating operating edge 71c (see FIG. 61).

As the driving gear 76 further continues its rotation, the thrusting boss 76a is disengaged from the mating operating edge 71c of the operating lever 71. The operating lever 71 is rotated under the bias of the tension spring 72 to return to a state in which the controlled edge 71d is contacted with the support piece 69e of the limit lever 69 (see FIG. 63). The switching gear 75 is also run in rotation by rotation of the driving motor 73. When the operating boss 75a acts on the mating operating portion 66a of the rotation detection switch 66, a stop signal is input to the driving motor 73 to stop the rotation of the driving motor 73 (see FIG. 63). The driving gear 76 is returned to its reference position.

The disc cartridge 120, ejected from the holder 16, is partially protruded via the insertion/ejection opening 2a of the outer casing 2. The protruded portion may be gripped and extracted to take out the disc cartridge 120.

When taking out the disc cartridge 120, the unlock piece 22 provided on the side plate portion 19 of the holder 16 is moved rearwards in the groove 101b of the disc cartridge 120 by relative movement. The shutter 123 is again locked by a lock mechanism.

With the disc recording and/or reproducing apparatus 1 of the present invention, described above, the driving gear 76, run in rotation by the driving power transmitted from the driving motor 73, is rotated in the first direction to lower the magnetic head 58a to set up a state enabling the recording operation of information signals. The driving gear 76 is run in rotation in the second direction opposite to the first direction to perform the ejecting operation of the disc cartridge 120. Thus, when both the head movement mechanism and the ejection mechanism are operated by the driving motor 73, there is no necessity of continuously moving one of the driving lever 67 and the joint lever 47 in the same direction to actuate the head movement mechanism and the ejection mechanism, the movement stroke of the driving lever 67 and that of the joint lever 47 may be correspondingly reduced to enable the size of the disc recording and/or reproducing apparatus to be reduced.

The disc recording and/or reproducing apparatus 1 of the present invention is provided with the operating lever 71 which operates the limit lever 69, using the thrusting boss 76a operating as the driving power transmitting portion, when the driving motor 73 is rotated in one direction, and which is receded from the trajectory of the thrusting boss 76a when the driving motor 73 is rotated in the other direction. Consequently, the operating lever 71 does not obstruct rotation of the driving gear 76 when the driving motor 73 is rotated in the opposite direction to actuate the ejection mechanism, so that the operation of the disc recording and/or reproducing apparatus 1 may be optimum.

In addition, with the disc recording and/or reproducing apparatus 1, since there is provided the rotation detection switch 66 which detects the end of the operation of the ejection mechanism and the end of the operation of the head movement mechanism, it is unnecessary to provide a dedicated switch detecting the state of completion of the operation, from one mechanism to another, thus enabling the number of component parts to be reduced.

The manual ejection operation for the disc cartridge 120 is now explained. The manual ejection operation in the disc recording and/or reproducing apparatus 1 may be classed into an ejection operation in the stop mode in which the recording or reproduction for the disc-shaped recording medium 122 has come to a close, an ejection operation in the replay mode and an ejection operation in the recording mode. It is when for example the driving motor 73 has ceased its operation due to battery down that the manual ejection operation is needed.

In the operation in any of these three modes, the joint lever 47 is moved forwards by manual operation to eject the disc cartridge 120. The forward movement of the joint lever 47 may be achieved by for example inserting a pin into an insertion opening, not shown, formed in the back side of the outer casing 2, to thrust the thrusting portion 47e from rear side.

Figure 44:
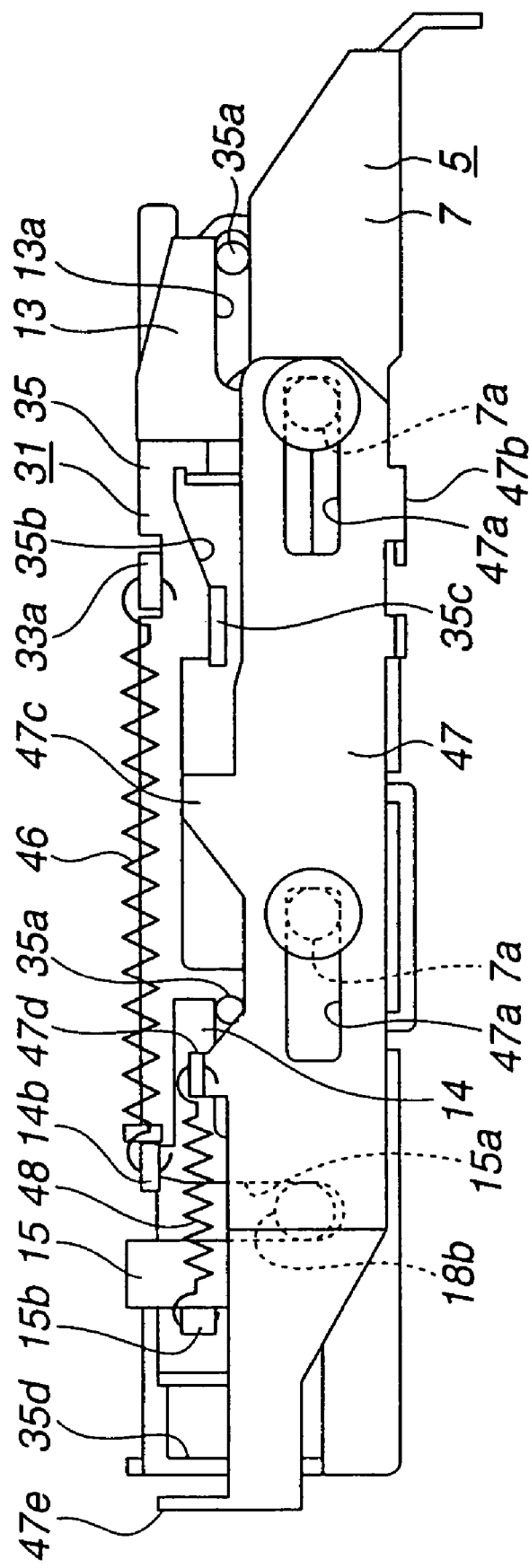
FIG. 44 is a side view showing the initial state prior to operation of the respective portions or units.
Figure 45:
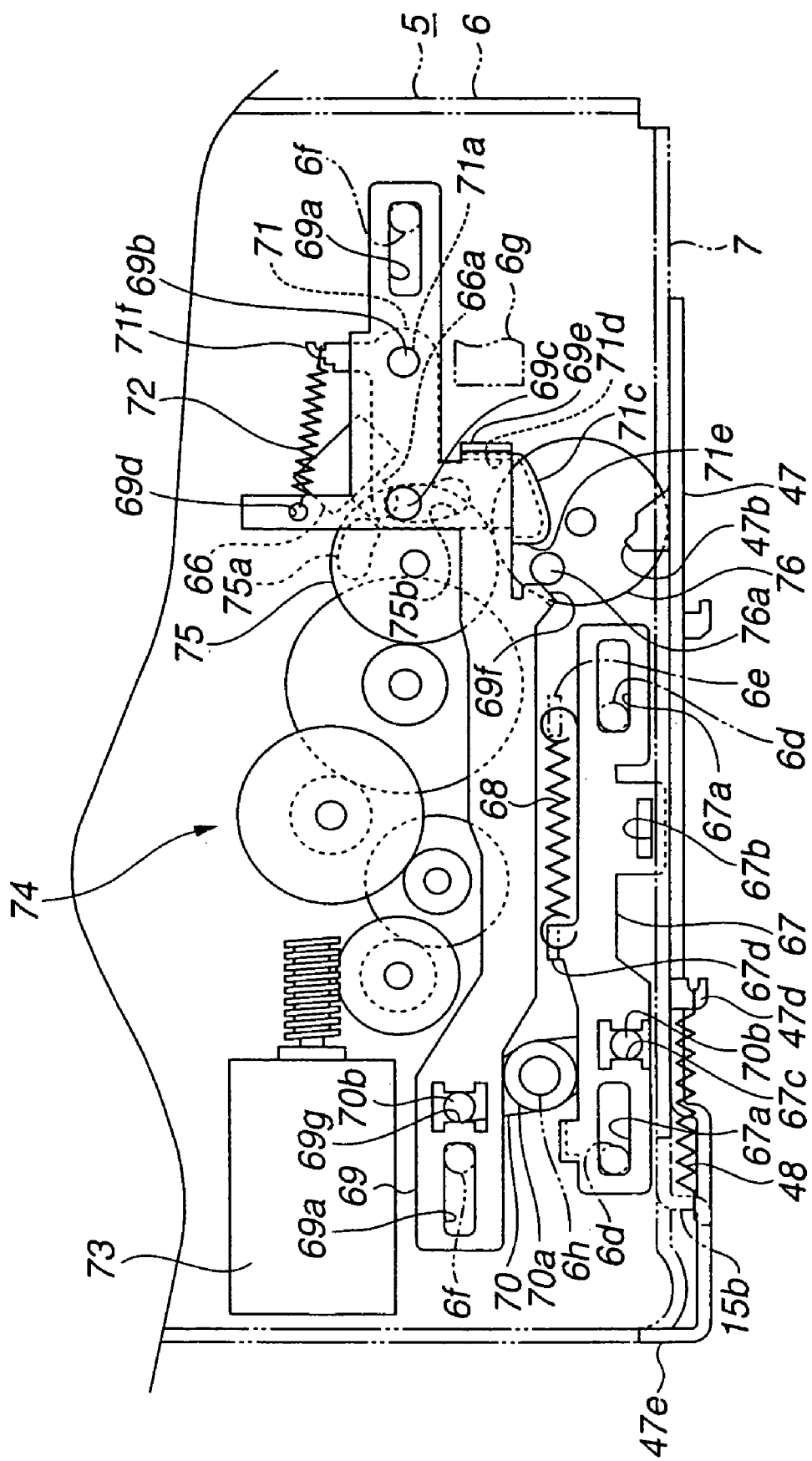
FIG. 45 is a plan view showing, of the constituent elements carried by the lower chassis surface, the initial state prior to operation of respective portions or units of the disc recording and/or reproducing apparatus.

First, the operation of the manual ejection operation in the stop and replay modes and the ejecting operation during reproduction for the disc-shaped recording medium 122 are explained. These two operations are accomplished by moving the joint lever 47 forwards as the mating operating piece 23b of the head shift lever 23 is engaged in the second cam portion 29b of the cam lever 24, as shown in FIG. 44.

When the joint lever 47 is moved forwards, the thrust piece 35c of the slider 31 is thrust forwards by the thrusting piece 47c, such that the support portions 18a, 19a and the support pins 18b, 19b of the holder 16 perform relative movement from the lower horizontal portions 37c, 38c of the cam grooves 37, 38 through the inclined portions 37b, 38b to the upper horizontal portions 37a, 38a (see FIG. 43). Consequently, the holder 16 is elevated to unload the disc-shaped recording medium 122 from the disc table 49.

When the holder 16 is elevated, the lower side portion 30c of the cam lever 24 is engaged in the engagement opening 67b, such that the cam lever 24 is moved forwards relative to the holder 16 by a distance corresponding to the distance between the upper side portion 30a and the lower side portion 30c in the fore-and-aft direction. Thus, the head shift lever 23, the mating operating piece 23b of which has been engaged in the second cam portion 29b of the cam lever 24, now has the mating operating piece 23b engaged in the first cam portion 29b of the cam lever 24, with the head mounting arm 58 then being in substantially the horizontal position (see FIG. 46).

As the slider 31 is moved forwards, the spring member 45 is extended. When the control edge 41a is separated from the controlled piece 33c, the ejection lever 39 is rotated appreciably in the direction indicated by arrow R1, under the force of the spring member 45. The casing member 121 of the disc cartridge 100 is thrust forwards significantly by the operating portion 43 to eject the disc cartridge 120 from the holder 16 (see FIG. 60).

The disc cartridge 120, ejected from the holder 16, is partially protruded via the insertion/ejection opening 2a of the outer casing 2. The protruded portion may be gripped and extracted to take out the disc cartridge 120.

Figure 55:
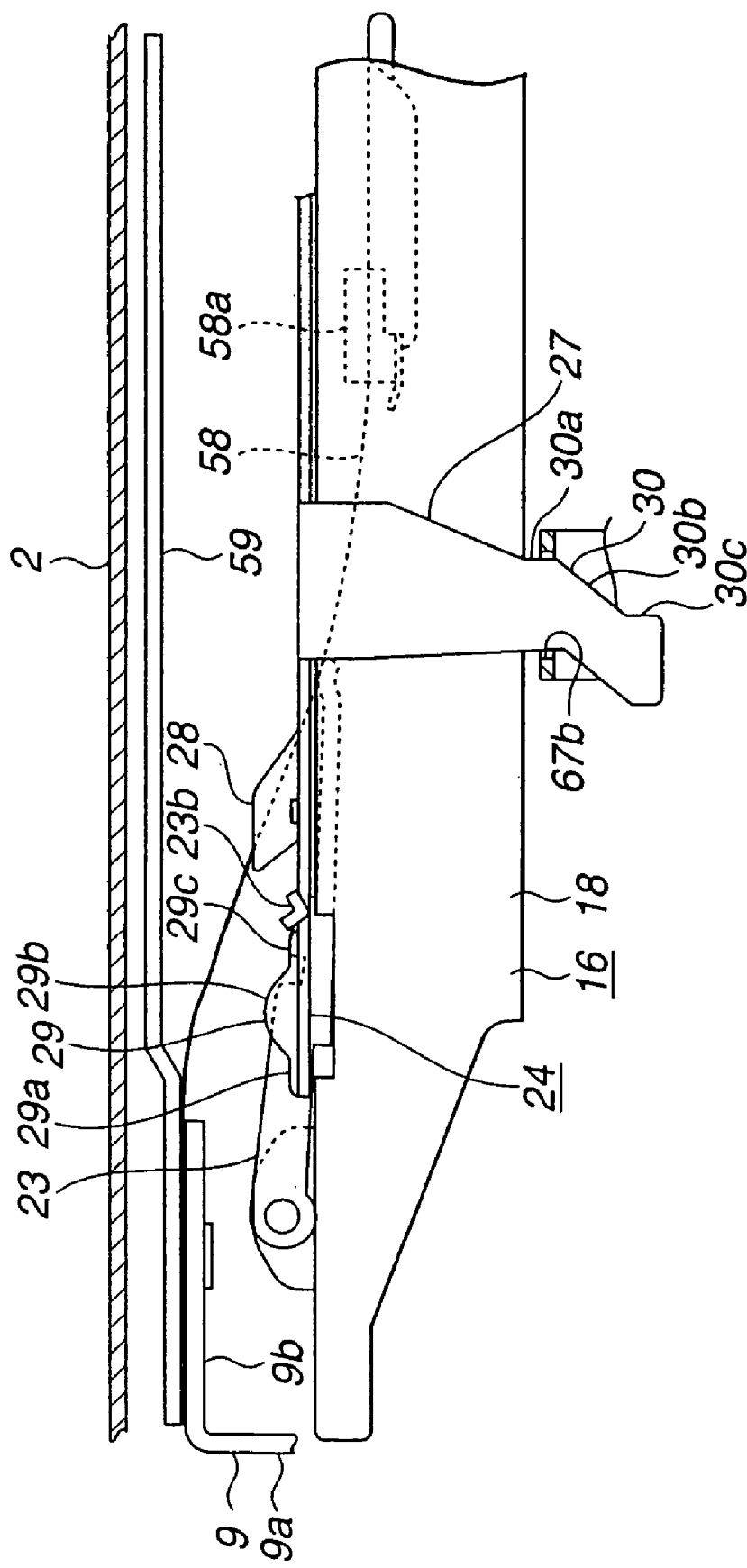
FIG. 55 is a side view showing the state in which the magnetic head has been inserted via a head inserting opening in the holder, as the position relationships between the cam lever and the magnetic head.
Figure 56:
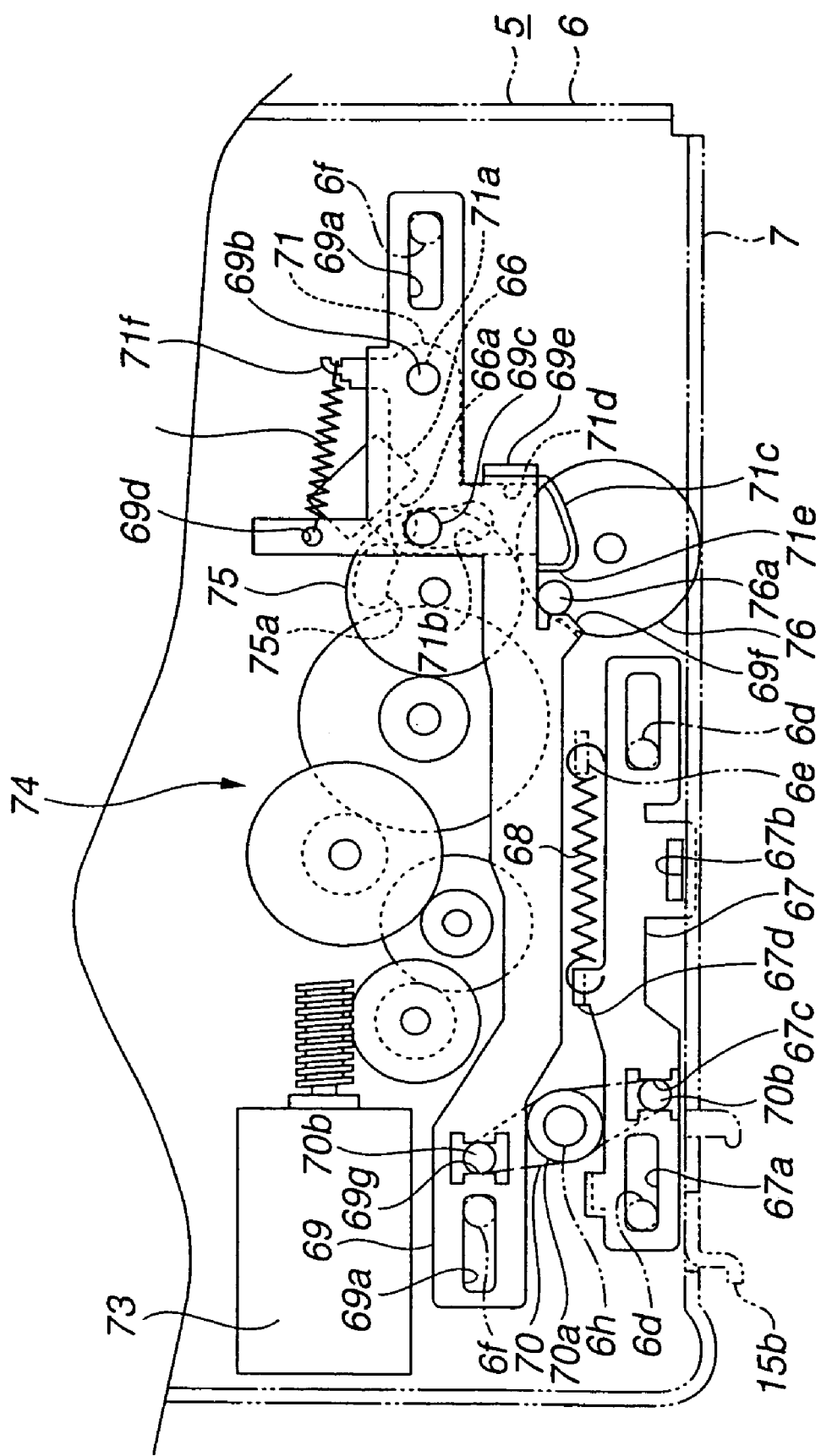
FIG. 56 is a plan view showing, of the constituent elements carried on the lower chassis surface, the state in which the driving gear has been rotated in a second direction, the limit lever has been moved to the rear movement stroke end and the driving lever has been moved to the forward movement stroke end.

The operation of manual ejection in the recording mode is now explained. This operation is carried out by causing forward movement of the joint lever 47, as the mating operating piece 23b of the head shift lever 23 is located ahead of the cam portion 30 of the cam lever 24, as shown in FIG. 55. When the joint lever 47 is moved forwards, the thrust piece 35c of the slider 31 is thrust forwards, by the thrusting piece 47c, so that the support portions 18a, 19a and the support pins 18b, 19b of the holder 16 perform relative movement from the lower horizontal portions 37c, 38c of the cam grooves 37, 38 through the inclined portions 37b, 38b to the upper horizontal portions 37a, 38a (see FIG. 43). Consequently, the holder 16 is elevated to unload the disc-shaped recording medium 122 from the disc table 49.

When the holder 16 is elevated, the lower side portion 30c of the cam lever 24 is engaged in the engagement opening 67b, such that the cam lever 24 is moved forwards relative to the holder 16 by a distance corresponding to the distance between the upper side portion 30a and the lower side portion 30c in the fore-and-aft direction. Thus, the head shift lever 23, the mating operating piece 23b of which has been engaged in the second cam portion 29b of the cam lever 24, now has the mating operating piece 23b engaged in the third cam portion 29c of the cam lever 24, with the head mounting arm 58 then being in substantially the horizontal state (see FIG. 64). As the head mounting arm 58 is at substantially the horizontal position, the magnetic head 58a is uplifted from the head inserting opening 17b of the holder 16. The magnetic head 58a is moved upwards from the head inserting opening 17b of the holder 16 and is held at a third retreat position directly overlying the top plate portion 17 of the holder 16. The disc cartridge 120 may now be ejectable without contacting with the magnetic head 58a (see FIG. 64). This third retreat position, as the relative position of the holder 16 with respect to the top plate portion 17, is substantially the same as the first and second retreat positions described above. With forward movement of the slider 31, the spring member 45 is extended. When the control edge 41a is separated from the controlled piece 33c, the ejection lever 39 is rotated appreciably in the direction indicated by arrow R1, under the spring force of the spring member 45. The casing member 121 of the disc cartridge 120 is thrust forwards by the operating portion 43 to eject the disc cartridge 120 from the holder 16 (see FIG. 60). The disc cartridge 120 ejected from the holder 16 is partially protruded from the insertion/ejection opening 2a of the outer casing 2, so that the disc cartridge 120 can be taken out by gripping and pulling the protruded portion outwards.

Thus, in the recording mode, the cam lever 24 is moved forwards to retreat the magnetic head 58a to above the disc cartridge 120 being ejected and to hold the magnetic head 58a at the third retreat position to achieve the ejecting operation without damaging the magnetic head 58a.

With the disc recording and/or reproducing apparatus 1, according to the present invention, the magnetic head 58a is held at the first, second or third retreat position, for which the position relationships of the holder to the top plate portion 17 are substantially the same, except during the recording operation, when the disc cartridge 120 is held on the holder 16. Consequently, the spacing of movement of the magnetic head 58a between the upper surface of the outer casing 2 and the top plate portion 17 can be minimized to allow to reduce the thickness of the disc recording and/or reproducing apparatus 1.

Moreover, with the disc recording and/or reproducing apparatus 1, according to the present invention, the cam lever 24 is provided with the inclined portion 30b slidably engaged in the engagement opening 67b of the driving lever 67 and, when the cam lever 24 is uplifted or lowered with the uplifting or descent of the holder 16, the engaging position of the inclined portion 30b in the engagement opening 67b is changed to cause the cam lever 24 to be moved in the fore-and-aft direction with respect to the holder 16. Thus, it is sufficient to provide the inclined portion 30b for causing movement of the cam lever 24 relative to the holder 16 to simplify the structure or mechanism for ejection to realize positive ejection without increasing the cost.

In the disc recording and/or reproducing apparatus 1 according to the present invention, the recording head used is the magnetic head 58a. This, however, is merely illustrative, and any of recording heads consistent with the recording system for a recording medium, such as an optical head or a magneto-optical disc, may be used as the recording head.

The shape or structure of the various components, indicated in the above-described embodiments, are given only by way of examples in practicing the invention, and should not be construed in the sense of limiting the present invention.

INDUSTRIAL APPLICABILITY

With the disc recording and/or reproducing apparatus according to the present invention, in which the spring member is provided between the ejection lever and the slider and the ejection lever is biased by this spring member in a direction of ejecting the recording medium from the holder, and in which the slider is also biased in the direction of introducing the recording medium, the mechanism of ejecting the recording medium may be simplified to reduce the number of component parts of the overall apparatus.

Moreover, with the disc recording and/or reproducing apparatus according to the present invention, in which the relative positions of the head, contacted with and separated away from the recording medium, and the holder, with respect to the contacting or separating direction, is substantially constant for the first retreat position receded from the recording medium held by the holder, the second retreat position receded from the recording medium during reproduction of the information signals and for the third retreat position receded from the recording medium being ejected from the holder, the spacing of movement of the magnetic head between the outer casing and the holder may be minimized to reduce the thickness of the overall apparatus.

In addition, with the disc recording and/or reproducing apparatus according to the present invention, in which the ejection mechanism or the head movement mechanism is operated depending on the direction of rotation of the driving gear, rotated in one or the opposite direction by the driving motor, the ejection mechanism and the head movement mechanism can be simplified to reduce the size of the apparatus.

Furthermore, with the disc recording and/or reproducing apparatus according to the present invention, in which, when the disc housed in the disc cartridge is loaded on the disc table, the shutter provided on the disc cartridge opened by the shutter opening/closing mechanism is retained by the retention mechanism, the shutter may undergo vibrations during the disc reproducing or recording operation only to a lesser extent for assuring stabilized recording and/or reproduction of information signals.

The invention claimed is:

1. A recording medium driving device comprising:
   a loading unit for having a recording medium loaded thereon;
   a holder for holding said recording medium, said holder being movable between an insertion/ejection position inserting/ejecting said recording medium and a loading position loading said recording medium on said loading unit;
   an ejection lever for ejecting said recording medium from said holder at said inserting/ejecting position;
   a slider movable in a direction of inserting said recording medium into said holder and in a direction of ejecting said recording medium from said holder, said slider when moved in said inserting direction causing said holder to be moved from said inserting/ejecting position towards said loading position, and said slider when moved in said ejecting direction causing said holder to be moved from said loading position to said insertion/ejection position;
   a head for recording information signals on said recording medium;
   a head shift lever for causing said head to be moved in directions of contacting with and separating from said recording medium, respectively; and
   a cam lever carried by said holder for movement in said inserting direction and in said ejecting direction, said cam lever operating said head shift lever;
   said head being retreated to a first retreat position receded from said recording medium held by said holder, when said recording medium is ejected from said holder positioned at said insertion/ejection position under a driving force of a driving motor;
   said head being retreated to a second retreat position receded from said recording medium when information signals are reproduced from said recording medium at said loading position;
   said holder being moved to said insertion/ejection position when said recording medium is ejected from said holder by a manual operation by a user during recording of information signals on said recording medium in said loading unit, said head being retreated to a third retreat position receded from said recording medium ejected from said holder; wherein
   in said first, second and third retreat positions, a relative position between said head and said holder relative to the contacting or separating direction is substantially the same.

2. The recording medium driving device according to claim 1 wherein said first and third retreat positions are substantially the same position relative to the direction of movement of said holder of the recording medium driving device.

3. The recording medium driving device according to claim 1 wherein, when the information signals are reproduced in said loading unit from said recording medium, and the recording medium is ejected by the manual operation by the user, the holder is moved to said insertion/ejection position, and said head is receded to said first retreat position from said recording medium ejected from said holder.

4. The recording medium driving device according to claim 1 wherein said cam lever includes:
   a first cam portion for operating said head shift lever to cause said head to be receded to said first retreat position receded from said recording medium held by said holder when said recording medium is ejected from said holder at said insertion/ejection position, under said driving force of said driving motor;
   a second cam portion for operating said head shift lever so that, when the information signals are reproduced at said loading unit from said recording medium, said head will be receded to said second retreat position receded from said recording medium; and
   a third cam portion for operating said head shift lever so that, when said recording medium is ejected by a manual operation of the user when information signals are being recorded on said recording medium in said loading unit, said holder will be moved to said insertion/ejection position, said head being receded to said third retreat position in which said head is receded from said recording medium.

5. The recording medium driving device according to claim 1 wherein
   said cam lever includes a cam portion having an inclined portion; and further comprising:
   a driving lever including a support portion engaged with said driving inclined portion, said lever being moved in said inserting direction and in said ejecting direction to cause said cam lever to be moved in said inserting direction and in said ejecting direction relative to said holder;
   said cam lever being moved in said inserting direction and in said ejecting direction relative to said holder by a position of said inclined portion relative to said support portion being changed as said holder is moved.

* * * * *